(12) United States Patent
Fein et al.

(10) Patent No.: US 9,111,384 B2
(45) Date of Patent: *Aug. 18, 2015

(54) SYSTEMS AND METHODS FOR OBTAINING AND USING AUGMENTATION DATA AND FOR SHARING USAGE DATA

(71) Applicant: Elwha LLC, Bellevue, WA (US)

(72) Inventors: Gene Fein, Westlake, CA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 175 days.

This patent is subject to a terminal disclaimer.

(21) Appl. No.: 13/711,095

(22) Filed: Dec. 11, 2012

(65) Prior Publication Data

US 2014/0098132 A1    Apr. 10, 2014

Related U.S. Application Data

(63) Continuation of application No. 13/709,465, filed on Dec. 10, 2012, which is a continuation-in-part of application No. 13/690,003, filed on Nov. 30, 2012, which is a continuation of application No. 13/689,372, (Continued)

(51) Int. Cl.
*G06T 19/00*    (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS

| | | | |
|---|---|---|---|
| 6,625,299 B1 | 9/2003 | Meisner et al. |
| 6,774,898 B1 | 8/2004 | Katayama et al. |
| 6,891,563 B2 | 5/2005 | Schofield et al. |
| 7,119,829 B2 | 10/2006 | Leonard et al. |

(Continued)

FOREIGN PATENT DOCUMENTS

| | | |
|---|---|---|
| EP | 1117074 A2 | 7/2001 |
| KR | 10-2012-0066552 A | 6/2012 |
| WO | WO 2012/108721 A2 | 8/2012 |

OTHER PUBLICATIONS

Doobybrain; "GE's Augmented Reality Demo"; YouTube; uploaded Feb. 4, 2009; pp. 1-2; located at: http://www.youtube.com/watch?v=00FGtH5nkxM.

(Continued)

*Primary Examiner* — David Zarka
*Assistant Examiner* — Jason Pringle-Parker

(57) ABSTRACT

Computationally implemented methods and systems include receiving augmentation data associated with one or more first augmentations, the one or more first augmentations having been included in a first augmented view of a first actual scene that was remotely displayed at a remote augmented reality (AR) device, displaying one or more second augmentations in a second augmented view of a second actual scene, the displaying of the one or more second augmentations being in response, at least in part, to the augmentation data, and transmitting to the remote AR device usage data that indicates usage information related at least to usage or non-usage of the received augmentation data. In addition to the foregoing, other aspects are described in the claims, drawings, and text.

48 Claims, 34 Drawing Sheets

Related U.S. Application Data filed on Nov. 29, 2012, which is a continuation-in-part of application No. 13/673,070, filed on Nov. 9, 2012, which is a continuation of application No. 13/672,575, filed on Nov. 8, 2012, which is a continuation-in-part of application No. 13/648,012, filed on Oct. 9, 2012, which is a continuation of application No. 13/646,147, filed on Oct. 5, 2012.

(56) References Cited

U.S. PATENT DOCUMENTS

| | | | |
|---|---|---|---|
| 7,690,975 | B2 | 4/2010 | Watanabe et al. |
| 8,116,526 | B2 | 2/2012 | Sroka et al. |
| 8,184,070 | B1 | 5/2012 | Taubman |
| 8,188,880 | B1 | 5/2012 | Chi et al. |
| 8,203,605 | B1 | 6/2012 | Starner |
| 8,402,356 | B2 | 3/2013 | Martinez et al. |
| 8,751,948 | B2 | 6/2014 | Wetzer et al. |
| 2001/0030654 | A1 | 10/2001 | Iki |
| 2002/0044152 | A1 | 4/2002 | Abbott, III et al. |
| 2002/0144259 | A1 | 10/2002 | Gutta et al. |
| 2003/0037068 | A1 | 2/2003 | Thomas et al. |
| 2003/0210832 | A1 | 11/2003 | Benton |
| 2004/0113885 | A1 | 6/2004 | Genc et al. |
| 2005/0206583 | A1 | 9/2005 | Lemelson et al. |
| 2008/0071559 | A1 | 3/2008 | Arrasvuori |
| 2008/0253737 | A1 | 10/2008 | Kimura et al. |
| 2008/0270947 | A1 | 10/2008 | Elber et al. |
| 2009/0049004 | A1 | 2/2009 | Nurminen et al. |
| 2009/0167787 | A1 | 7/2009 | Bathiche et al. |
| 2009/0182499 | A1 | 7/2009 | Bravo |
| 2009/0237328 | A1* | 9/2009 | Gyorfi et al. ............ 345/9 |
| 2009/0300535 | A1 | 12/2009 | Skourup et al. |
| 2009/0322671 | A1 | 12/2009 | Scott et al. |
| 2010/0104185 | A1 | 4/2010 | Johnson et al. |
| 2010/0164990 | A1* | 7/2010 | Van Doorn ............ 345/633 |
| 2010/0208033 | A1 | 8/2010 | Edge et al. |
| 2010/0214284 | A1 | 8/2010 | Rieffel et al. |
| 2010/0226535 | A1 | 9/2010 | Kimchi et al. |
| 2010/0238161 | A1 | 9/2010 | Varga et al. |
| 2010/0295921 | A1 | 11/2010 | Guthrie et al. |
| 2010/0328344 | A1 | 12/2010 | Mattila et al. |
| 2011/0055049 | A1 | 3/2011 | Harper et al. |
| 2011/0074658 | A1 | 3/2011 | Sato |
| 2011/0134108 | A1 | 6/2011 | Hertenstein |
| 2011/0141254 | A1 | 6/2011 | Roebke et al. |
| 2011/0164163 | A1* | 7/2011 | Bilbrey et al. ........ 348/333.01 |
| 2011/0214082 | A1 | 9/2011 | Osterhout et al. |
| 2011/0227820 | A1 | 9/2011 | Haddick et al. |
| 2011/0231781 | A1 | 9/2011 | Betzler et al. |
| 2011/0238751 | A1 | 9/2011 | Belimpasakis et al. |
| 2011/0242134 | A1 | 10/2011 | Miller et al. |
| 2011/0292220 | A1 | 12/2011 | Georgis et al. |
| 2012/0025975 | A1 | 2/2012 | Richey et al. |
| 2012/0038669 | A1 | 2/2012 | Lee et al. |
| 2012/0062596 | A1 | 3/2012 | Bedi et al. |
| 2012/0105473 | A1 | 5/2012 | Bar-Zeev et al. |
| 2012/0105475 | A1 | 5/2012 | Tseng |
| 2012/0113092 | A1 | 5/2012 | Bar-Zeev et al. |
| 2012/0113140 | A1 | 5/2012 | Hilliges et al. |
| 2012/0113274 | A1 | 5/2012 | Adhikari et al. |
| 2012/0116920 | A1 | 5/2012 | Adhikari et al. |
| 2012/0120101 | A1 | 5/2012 | Adhikari et al. |
| 2012/0120113 | A1 | 5/2012 | Hueso |
| 2012/0133650 | A1 | 5/2012 | Lee |
| 2012/0147328 | A1 | 6/2012 | Yahav |
| 2012/0154638 | A1 | 6/2012 | Chou |
| 2012/0166435 | A1 | 6/2012 | Graham et al. |
| 2012/0176410 | A1 | 7/2012 | Meier et al. |
| 2012/0194549 | A1 | 8/2012 | Osterhout et al. |
| 2012/0198339 | A1 | 8/2012 | Williams et al. |
| 2012/0206323 | A1 | 8/2012 | Osterhout et al. |
| 2012/0223966 | A1 | 9/2012 | Lim |
| 2012/0244907 | A1 | 9/2012 | Athsani et al. |
| 2012/0246027 | A1 | 9/2012 | Martin |
| 2012/0249416 | A1 | 10/2012 | Maciocci et al. |
| 2012/0249588 | A1 | 10/2012 | Tison et al. |
| 2012/0249591 | A1 | 10/2012 | Maciocci et al. |
| 2012/0268491 | A1 | 10/2012 | Sugden et al. |
| 2012/0269494 | A1 | 10/2012 | Satyanarayana et al. |
| 2012/0293548 | A1 | 11/2012 | Perez et al. |
| 2012/0299962 | A1 | 11/2012 | White et al. |
| 2012/0304111 | A1 | 11/2012 | Queru |
| 2012/0306920 | A1 | 12/2012 | Bathiche et al. |
| 2012/0327119 | A1 | 12/2012 | Woo et al. |
| 2012/0329432 | A1 | 12/2012 | Gupta et al. |
| 2013/0044128 | A1 | 2/2013 | Liu et al. |
| 2013/0050258 | A1 | 2/2013 | Liu et al. |
| 2013/0054622 | A1 | 2/2013 | Karmarkar et al. |
| 2013/0057577 | A1 | 3/2013 | Jeong |
| 2013/0076788 | A1 | 3/2013 | Ben Zvi |
| 2013/0083003 | A1 | 4/2013 | Perez et al. |
| 2013/0083009 | A1 | 4/2013 | Geisner et al. |
| 2013/0085345 | A1 | 4/2013 | Geisner et al. |
| 2013/0125027 | A1 | 5/2013 | Abovitz |
| 2013/0147836 | A1 | 6/2013 | Small et al. |
| 2013/0162632 | A1 | 6/2013 | Varga et al. |
| 2013/0194164 | A1 | 8/2013 | Sugden et al. |
| 2013/0218721 | A1 | 8/2013 | Borhan et al. |
| 2013/0278631 | A1 | 10/2013 | Border et al. |
| 2013/0342571 | A1 | 12/2013 | Kinnebrew et al. |
| 2014/0002357 | A1 | 1/2014 | Pombo et al. |
| 2014/0063055 | A1 | 3/2014 | Osterhout et al. |
| 2014/0092130 | A1 | 4/2014 | Anderson et al. |
| 2014/0237366 | A1 | 8/2014 | Poulos et al. |

OTHER PUBLICATIONS

Inbar, Ori; "Top 10 Augmented Reality Demos That Will Revolutionize Video Games"; Games Alfresco; posted on Mar. 3, 2008, printed on Sep. 27, 2012; pp. 1-19; located at: http://gamesalfresco.com/2008/03/03/top-10-augmented-reality-demos-that-will-revolutionize-video-games/.

"Qualcomm Augmented Reality Sample Apps"; Qualcomm; bearing a date of May 18, 2011, printed on Sep. 27, 2012; pp. 1-2; Qualcomm Incorporated; located at: http://www.qualcomm.com/media/videos/qualcomm-augmented-reality-sample-apps?search=augmented%20reality&channel=11.

Shinymedia; "DEMO: World's First Augmented Reality Glasses—Vuzix Wrap 920 AR"; YouTube; uploaded Oct. 27, 2010; pp. 1-2; located at: http://www.youtube.com/watch?v=xfiZQW0k2Ro.

Taoistflyer; "Google Glasses (How It Works)"; YouTube; uploaded Apr. 7, 2012; pp. 1-2; located at: http://www.youtube.com/watch?v=Nc4ox89bofk&feature=related.

Total Immersion Home Page; bearing a date of 2012, printed on Sep. 27, 2012; pp. 1-2; Total Immersion; located at: http://www.t-immersion.com/.

Toucharcade; "Augmented Reality Demo"; YouTube; uploaded Mar. 26, 2009; pp. 1-2; located at: http://www.youtube.com/watch?v=QoZRHLmUKtM.

Vuzix—View the Future Today Home Page; bearing a date of Sep. 18, 2012, printed on Sep. 27, 2012; p. 1; Vuzix; located at: http://www.vuzix.com/home/.

PCT International Search Report; International App. No. PCT/US2014/025579; Jul. 29, 2014; pp. 1-4.

PCT International Search Report; International App. No. PCT/US2014/016022; Jun. 6, 2014; pp. 1-3.

Broll et al.; "An Infrastructure for Realizing Custom-Tailored Augmented Reality User Interfaces"; IEEE Transactions on Visualization and Computer Graphics; Nov./Dec. 2005; pp. 722-733; vol. 11, No. 6; IEEE Computer Society.

Irawati et al.; "VARU Framework: Enabling Rapid Prototyping of VR, AR and Ubiquitous Applications"; IEEE Virtual Reality Conference, Reno, NV; Mar. 8-12, 2008; pp. 201-208.

PCT International Search Report; International App. No. PCT/US2014/025639; Jul. 17, 2014; pp. 1-4.

PCT International Search Report; International App. No. PCT/US2014/025604; Jul. 11, 2014; pp. 1-3.

PCT International Search Report; International App. No. PCT/US2014/025669; Jul. 9, 2014; pp. 1-3.

\* cited by examiner

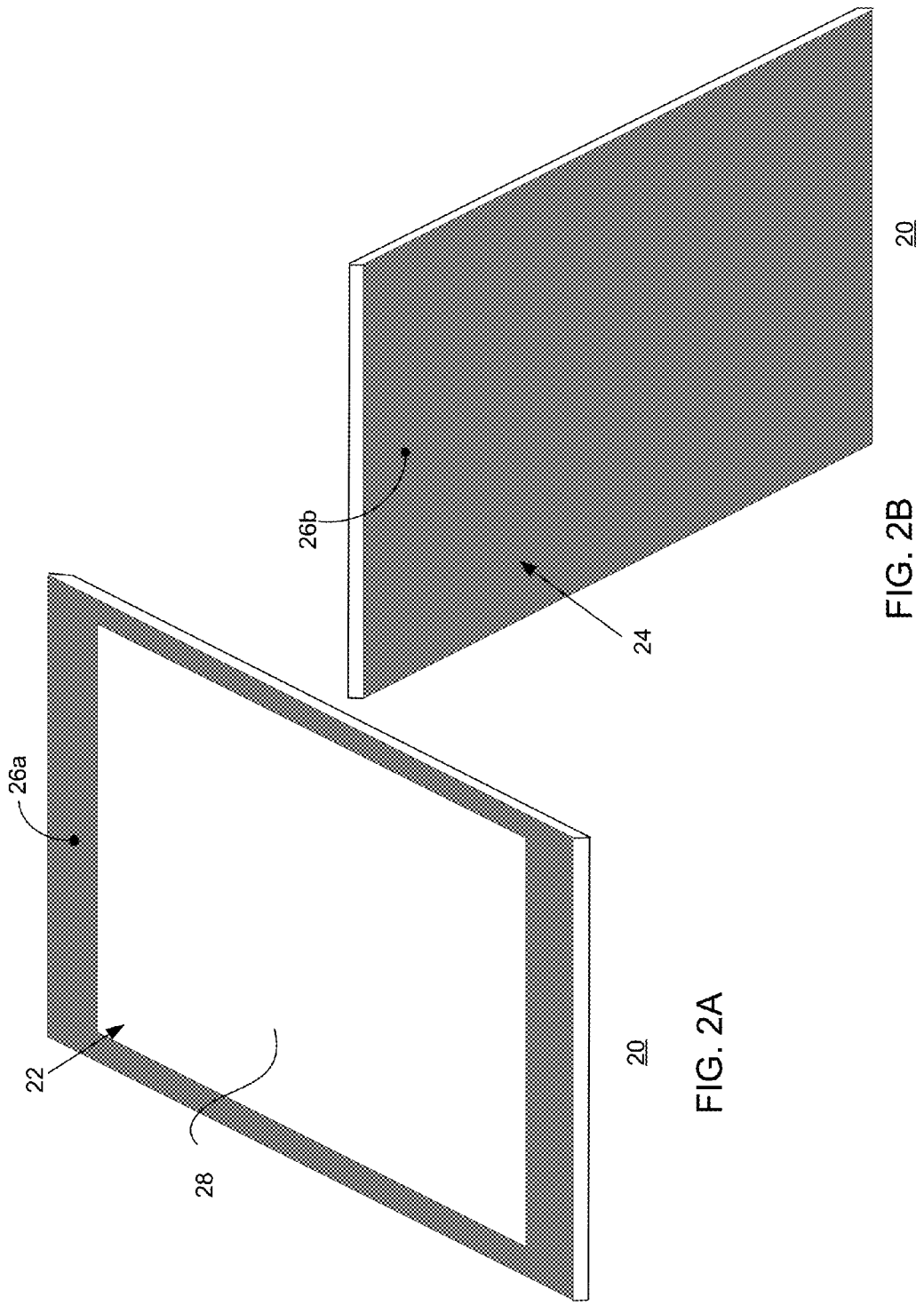

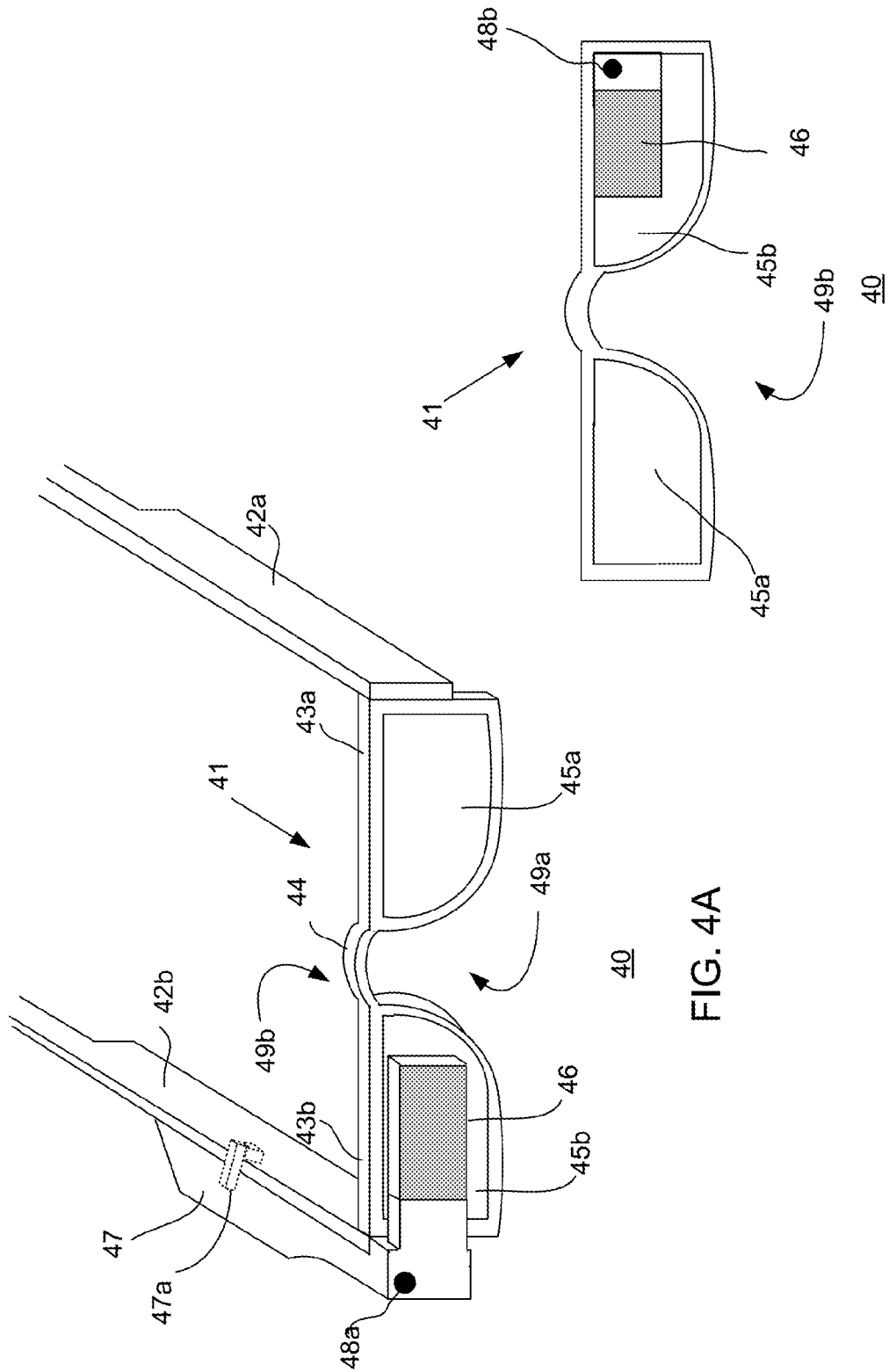

Actual View 60c

Augmented View 60d

Actual View 60g

Augmented View 60h

Augmented View 60j

Augmented View 60k

Augmented View 60m

Augmented View 60n

Actual View 60p

Augmented View 60q

Augmented View 60r

Augmented View 60s

Augmented View 60t

Augmented View 60u

106\* Usage Data Relaying Module

- 836 Network Relaying Module
- 838 Augmentaion Relaying Module
- 840 Difference Indicating Data Relaying Module
  - 842 Modification Indicating Data Relaying Module
  - 844 Degree of Correspondence Indicating Data Relaying Module
  - 846 Degree of Difference Indicating Data Relaying Module
  - 848 Augmentation Change Indicating Data Relaying Module

FIG. 8C

110 User Interface
- 852 Display Monitor[s]
- 854 Visual Capturing Device[s]
- 856 Audio Speaker[s]
- 858 Audio Input Device[s]
- 860 Keyboard/Keypad[s]

FIG. 8D

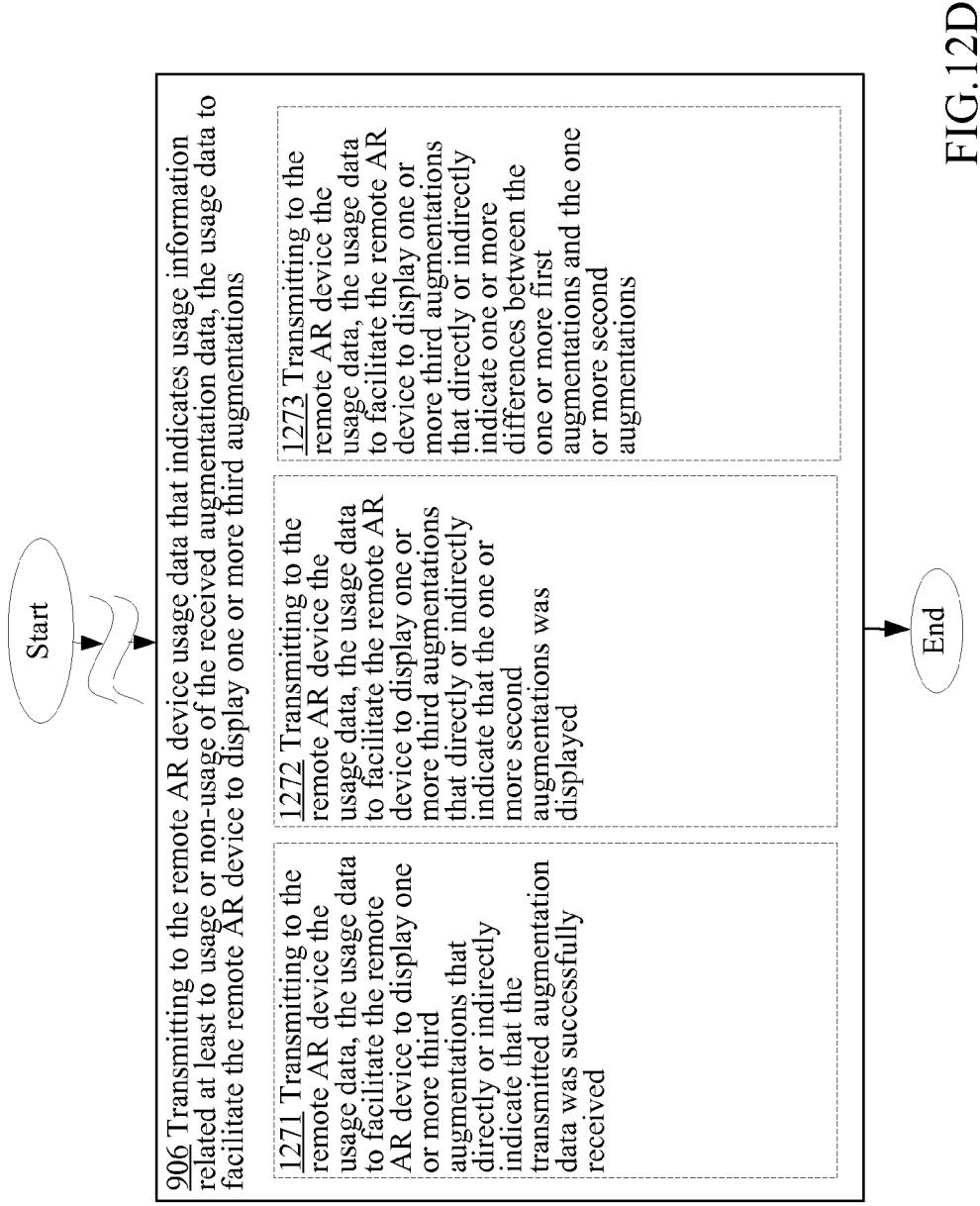

SYSTEMS AND METHODS FOR OBTAINING AND USING AUGMENTATION DATA AND FOR SHARING USAGE DATA

PRIORITY APPLICATIONS

For purposes of the USPTO extra-statutory requirements, the present application constitutes a continuation of U.S. patent application Ser. No. 13/709,465, entitled SYSTEMS AND METHODS FOR OBTAINING AND USING AUGMENTATION DATA AND FOR SHARING USAGE DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 10, Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/690,003, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 30, Nov. 2012, which is currently co-pending or is an application of which a currently co-pending application is entitled to the benefit of the filing date, and which is a continuation of U.S. patent application Ser. No. 13/689,372, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 29, Nov. 2012.

For purposes of the USPTO extra-statutory requirements, the present application constitutes a continuation-in-part of U.S. patent application Ser. No. 13/673,070, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9, Nov. 2012, which is currently co-pending or is an application of which a currently co-pending application is entitled to the benefit of the filing date, and which is a continuation of U.S. patent application Ser. No. 13/672,575, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 8, Nov. 2012.

For purposes of the USPTO extra-statutory requirements, the present application constitutes a continuation-in-part of U.S. patent application Ser. No. 13/648,012, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9, Oct. 2012, which is currently co-pending or is an application of which a currently co-pending application is entitled to the benefit of the filing date, and which is a continuation of U.S. patent application Ser. No. 13/646,147, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 5, Oct. 2012.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s). If the listings of applications provided above are inconsistent with the listings provided via an ADS, it is the intent of the Applicant to claim priority to each application that appears in the Priority Applications section of the ADS and to each application that appears in the Priority Applications section of this application. All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to receiving augmentation data associated with one or more first augmentations, the one or more first augmentations having been included in a first augmented view of a first actual scene that was remotely displayed at a remote augmented reality (AR) device, displaying one or more second augmentations in a second augmented view of a second actual scene, the displaying of the one or more second augmentations being in response, at least in part, to the augmentation data, and transmitting to the remote AR device usage data that indicates usage information related at least to usage or non-usage of the received augmentation data, the usage data to facilitate the remote AR device to display one or more third augmentations. In some implementations, at least one of the receiving augmentation data associated with one or more first augmentations, the one or more first augmentations having been included in a first augmented view of a first actual scene that was remotely displayed at a remote augmented reality (AR) device, displaying one or more second augmentations in a second augmented view of a second actual scene, the displaying of the one or more second augmentations being in response, at least in part, to the augmentation data, or transmitting to the remote AR device usage data that indicates usage information related at least to usage or non-usage of the received augmentation data, the usage data to facilitate the remote AR device to display one or more third augmentations being performed by a machine, article of manufacture, or composition of matter. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving augmentation data associated with one or more first augmentations, the one or more first augmentations having been included in a first augmented view of a first actual scene that was remotely displayed at a remote augmented reality (AR) device, means for displaying one or more second augmentations in a second augmented view of a second actual scene, the displaying of the one or more second augmentations being in response, at least in part, to the augmentation data, and means for transmitting to the remote AR device usage data that indicates usage information related at least to usage or non-usage of the received augmentation data, the usage data to facilitate the remote AR device to display one or more third augmentations. In addition to the foregoing, other system aspects are described in the claims, drawings, and text forming a part of the disclosure set forth herein.

In one or more various aspects, a system includes, but is not limited to, circuitry for receiving augmentation data associated with one or more first augmentations, the one or more first augmentations having been included in a first augmented view of a first actual scene that was remotely displayed at a remote augmented reality (AR) device, circuitry for displaying one or more second augmentations in a second augmented view of a second actual scene, the displaying of the one or more second augmentations being in response, at least in part, to the augmentation data, and circuitry for transmitting to the remote AR device usage data that indicates usage information related at least to usage or non-usage of the received augmentation data, the usage data to facilitate the remote AR device to display one or more third augmentations. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving augmentation data associated with one or more first augmentations, the one or more first augmentations having been included in a first augmented view of a first actual scene that was remotely displayed at a remote augmented reality (AR) device, displaying one or more second augmentations in a second augmented view of a second actual scene, the displaying of the one or more second augmentations being in response, at least in part, to the augmentation data, and transmitting to the remote AR device usage data that indicates usage information related at least to usage or non-usage of the received augmentation data, the usage data to facilitate the remote AR device to display one or more third augmentations. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 2A and 2B show the front and back views of an augmented reality (AR) device that is in the form of a tablet computer 20.

FIGS. 4A and 4B show different views of an augmented reality (AR) device that is in the form of a goggle 40.

FIG. 8C shows the usage data relaying module 106* of FIGS. 7A and 7B (e.g., the usage data relaying module 106' of FIG. 7A or the usage data relaying module 106" of FIG. 7B) in accordance with various implementations.

FIG. 8D shows another perspective of the user interface 110 of FIGS. 7A and 7B.

FIG. 12D is a high-level logic flowchart of a process depicting alternate implementations of the usage data transmitting operation 906 of FIG. 9.

DETAILED DESCRIPTION

Figure 1A:
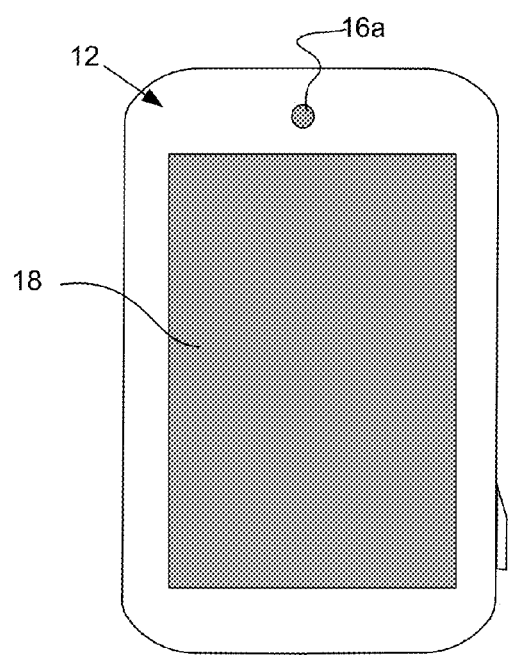
FIGS. 1A and 1B show the front and back views of an augmented reality (AR) device that is in the form of a smartphone 10.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

The evolution of personal computing technology over the past 40 years has been simply breathtaking, evolving from clunky large personal desktop computing devices with poor resolution television monitors and limited functionality to sleek and powerful mobile computing devices such as tablet computers and smartphones. As the personal computing technology continues to evolve a number of promising and exciting new technologies have emerged that are rapidly being developed for widespread personal use. One of the most promising new technologies is Augmented Reality (or simply "AR").

Wikipedia™ defines Augmented Reality as "a live, direct or indirect, view of a physical, real-world environment whose elements are augmented by computer-generated sensory input such as sound, video, graphics or GPS data." In order to facilitate understanding of the various concepts, processes, and systems to be discussed herein, certain basic terms and phrases will now be introduced and elucidated. For example, in the following the terms "augmentation," "augmented view," "actual view," "scene from a real environment," or variations thereof, are repeatedly recited. For purposes of the following, the phrase "scene" or "scene from a real environment" will be in reference to an actual or true (visual) scene from an actual physical environment (as opposed to a virtual environment or world) in the proximate vicinity of an AR device and/or the user of the AR device (herein "AR device user"). For purposes of the following description, the phrase "actual view" is in reference to a true or unmodified (or substantially true or unmodified) view of a scene from the real environment. The phrase "augmented view," in contrast, is in reference to a view of an actual scene from the real environment that has been augmented (e.g., modified) and that may be presented (e.g., displayed or transmitted) through an AR system. An "augmentation" is any modification, revision, or addition that may be included in an augmented view of a scene from the real environment and that may not be present in the actual view of the scene from the real environment.

There are at least two types of computing devices that can be used to implement AR technology: "specifically-designed" AR systems and "nonspecifically-designed" AR systems. Nonspecifically-designed AR systems are general purpose computing systems or devices that can be configured to implement AR functionalities by executing, for example, AR software applications. Examples of such devices include, for example, personal mobile computing/communication devices such as tablet computers and smartphones. In contrast, specifically-designed AR systems are systems or devices that have been specifically designed to implement AR functionalities. Specifically-designed AR systems may come in a variety of forms but are most commonly in the form of a head-mounted display (HMD) such as in the form of eyeglasses, goggles, helmet, and so forth. These devices are sometimes referred to as "wearable computing devices." Typically these wearable computing devices will include one or more features that allow a user to wear the device on his/or her head (e.g., a coupling device for coupling the AR device to the user's head). Such features include, for example, a strap, a pair of earpieces or temple pieces (e.g., the parts of goggles or glasses that are attached to the frame of, for example, a glasses and that extend out to the ears of the user holding the eyeglasses frame to the face of the user—see example 42a or 42b of FIG. 4A, or in the case of a helmet-type AR device the helmet structure itself). Alternatively, a wearable computing device may be made wearable by having a feature (e.g., one or more clips, straps such as a Velcro strap, magnets, and/or hooks) that allows it to be attached or clipped onto the frame of a pair glasses or goggles thus allowing the AR device to be coupled to the user's head.

All of these devices (e.g., specifically-designed AR systems and nonspecifically-designed AR systems) will generally have certain common components including one or more cameras (e.g., digital, web, and/or HD cameras), one or more displays (e.g., LCD displays or see-through displays), and logic for processing data generated by the one or more cameras and/or for generating and merging computer generated data or images with actual views or images of scenes from real world environment to generate augmented views of the scenes of the real world environment. Although most if not all current AR systems will contain these same basic components (e.g., camera, display, etc.), they can, however, take on a wide range of form factors as briefly described above (e.g., tablet computer, goggles, and so forth).

Figure 1B:
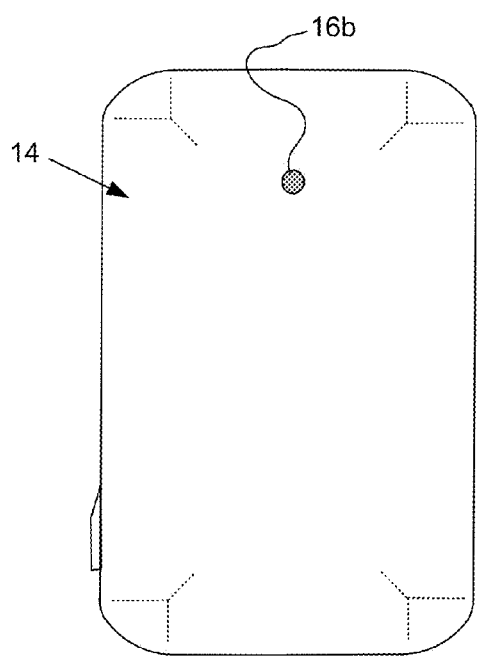

FIGS. 1A and 1B, 2A and 2B, 3A and 3B, and 4A and 4B illustrate some of the form factors that AR devices can take on. For example, FIG. 1A depicts the front-side 12 (e.g., the side of a personal computing/communication device that a display is located or disposed on), respectively, of a nonspecifically-designed AR system that is in the form of a smartphone 10 and that can be configured or designed to implement one or more AR functionalities. FIG. 1B shows the backside 14 (e.g., the side of a personal computing/communication device that is opposite of the front-side 12 personal computing/communication device) of the exemplary smartphone 10 of FIG. 1A. The exemplary smartphone 10 may include a display 18, such as a touchscreen or liquid crystal display (LCD), on the front-side 12 of the smartphone 10. The smartphone 10 of FIGS. 1A and 1B is also depicted as having lens 16a for a forward-facing camera on the front-side 12 and lens 16b for a rear-facing camera on the back-side 14 of the smartphone 10. When employed to provide one or more augmented views of one or more scenes of real world environments, the display 18 may be used in order to display the augmented views. In some cases, the forward-facing camera associated with lens 16a may be used in order to track the gaze or focus of one or more eyes of a user. The rear-facing camera that is associated with lens 16b, on the other hand, may be used to capture (e.g., sense and/or record) actual scenes of real world environments in order to generate augmented views of those actual scenes. The generated augmented views may then be displayed through display 18.

FIGS. 2A and 2B illustrates the front-side 22 (e.g., the side of a personal computing/communication device that a display is located or disposed on) and the backside 24 (e.g., the side of the computing/communication device that is opposite of the front-side of the computing/communication device), respectively, of a nonspecifically-designed AR system that is in the form of a tablet computer 20 and that can be configured or designed to implement one or more AR functionalities. In FIGS. 2A and 2B, the tablet computer 20 is depicted as having a display 28, such as a touchscreen, on the front-side 22 of the tablet computer 20. The tablet computer 20 is also depicted as having lens 26a for a forward-facing camera on the front-side 22 and lens 26b for a rear-facing camera on the back-side 24 of the tablet computer 20.

In some cases, the forward-facing camera associated with lens 26a may be used in order to track the gaze or focus of one or more eyes of a user. The rear-facing camera associated with lens 26b on the back-side 24 of the tablet computer 20 may be used to capture (e.g., sense and/or record) actual scenes of real world environments in order to generate augmented views of those actual scenes. Note that in some cases, a single camera may be coupled to both lens 26a and lens 26b, thus the single camera can act as both a forward-facing and rear-facing camera. The generated augmented views may then be displayed through display 28. References to "real environment" or "real world environment" herein may be in reference to true or actual physical environments rather than to a virtual environment or virtual world.

Figures 3A, 3B:
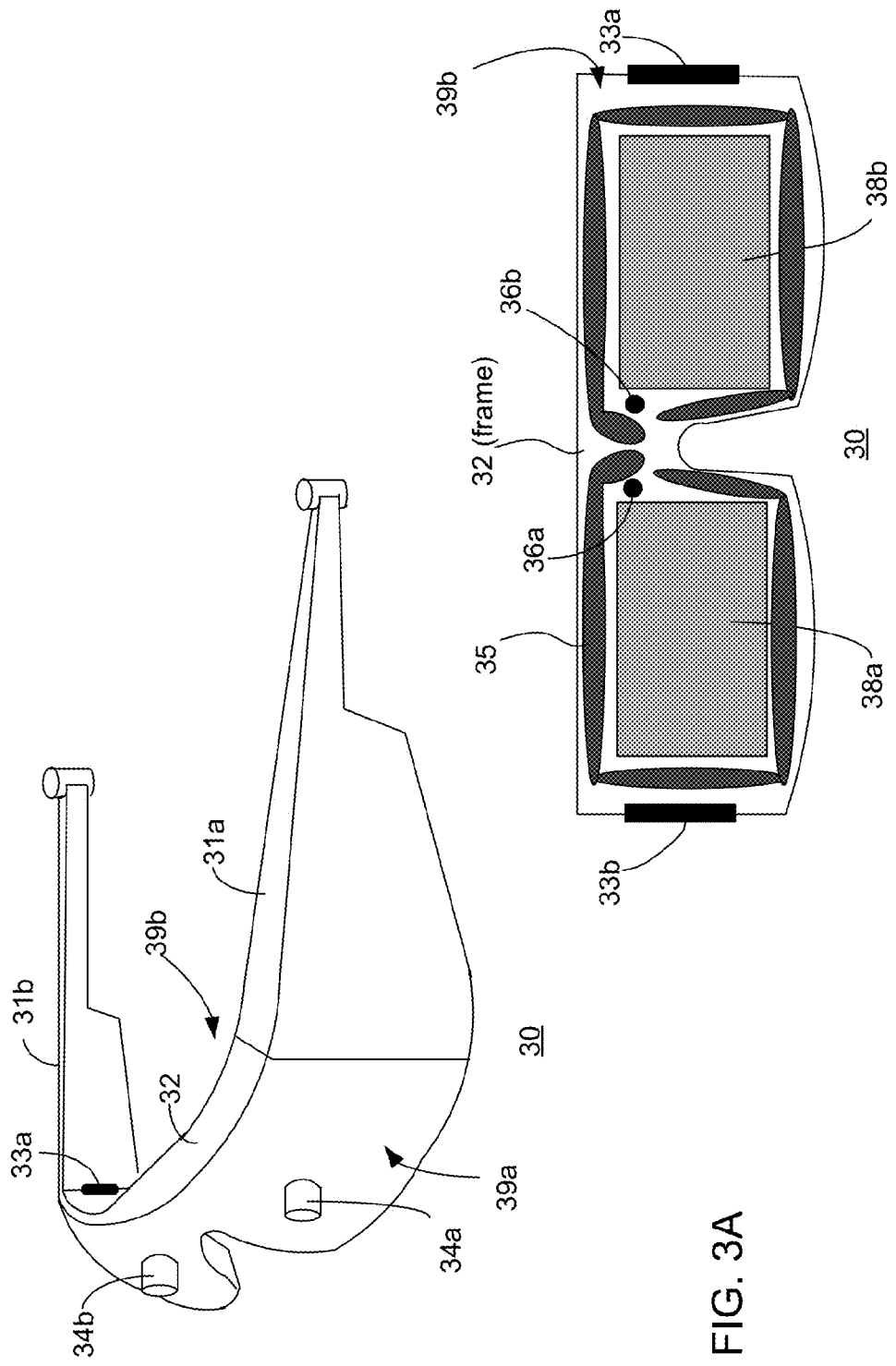
FIGS. 3A and 3B show different views of an augmented reality (AR) device that is in the form of a goggle 30.

FIGS. 3A and 3B illustrate a specifically-designed AR system in the form of video goggles 30 that can implement one or more AR functionalities. In particular, FIG. 3A illustrates a perspective view of the video goggle 30, which includes, among other things, a frame piece 32, a left temple 31a, and a right temple 31b. Disposed on the front-side 39a of the frame piece 32 are two forwarding looking lenses 34a and 34b for a pair of corresponding forward-looking cameras for capturing (e.g., recording, scanning, sensing, etc.) actual scenes of real world environments in order to generate augmented views of those actual scenes. FIG. 3B illustrates a view of the backside 39b of the frame piece 32 of the exemplary video goggles 30 of FIG. 3A. The backside 39b of the frame piece 32 is depicted as including a left display 38a and a right display 38b, a rim 35 surrounding the left display 38a and the right display 38b, a left lens 36a for a left camera and a right lens 36b for a right camera, and a left hinge 33b and a right hinge 33a. The rim 35 that may surround the left display 38a and the right display 38b may be a soft, semi-soft, or hard rim that in some cases may act as a cushion, as well as a barrier to prevent excess light from entering a user's field of view (thus allowing the user to better view the left and right displays 38a and 38b).

The forward-looking cameras associated with the forward-looking lens 34a and 34b may be used to capture (e.g., sense and/or record) actual scenes of real world environments in order to generate augmented views of those actual scenes. These augmented views that are generated may then be displayed through displays 38a and 38b. Note that in alternative implementations, the video goggle 30 may only employ a single forward-looking lens for a single forward-looking camera rather than employing two forward-looking lenses 34a and 34b for two forward-looking cameras as illustrated in FIG. 3A. In such implementations, the single forward-looking lens may be disposed at the mid-point or bridge part of the frame piece 32 above where a user's nose would be positioned. The output associated with the corresponding single forward-looking camera would then be displayed through both displays 38a and 38b.

The video goggles 30 may also include inward-looking lenses 36a and 36b as depicted in FIG. 3B for two inward-looking cameras (not shown) on the backside 39b of the frame piece 32 and disposed between the displays 38a and 38b and rim 35. The inward-looking cameras may be employed in order to track the movements as well as the gaze and focus of one or more eyes of a user. Note that alternatively, the video goggles 30 may include fewer or more inward-looking cameras and inward-looking lenses. Further, there is no requirement that a corresponding camera is needed for each inward-looking lens as it may be possible to employ, for example, a single camera for viewing through multiple lenses.

The frame piece 32, the left temple 31a, and the right temple 31b may house various electronics that are designed for, for example, processing data provided by the various cameras (e.g., forward-looking as well as backward looking cameras), and for generating augmented views of scenes from real world environment that may be displayed through displays 38a and 38b. The types of electronics that may be included with the video goggles 30 may include, for example, the same or similar types of electronics (e.g., microprocessors, controllers, network interface card, memory, etc.) that are often found in mobile computing/communication devices such as the smartphone 10 or the tablet computer 20 described earlier. The left temple 31a and the right temple 31b are features that allow the AR system to be worn on a user's head.

Turning now to FIGS. 4A and 4B, which illustrate a specifically-designed AR system that is in the form of electronic glasses 40 that can implement one or more AR functionalities. In particular, FIG. 4A illustrates a perspective view of the electronic glasses 40, which includes, among other things, a frame piece 41 (which further includes a left rim piece 43a, a right rim piece 43b, and a bridge 44), a left temple 42a, a right temple 42b, a left lens 45a, a right lens 45b, a see-through display 46, and electronics housing 47 (e.g. note that in some cases, the electronics housing 47 may include an optional clip 47a for coupling the electronics housing 47 to the right temple 42b). The frame piece 41 having a front-side 49a and a backside 49b opposite of the front-side 49a. Disposed at the end of the electronics housing 47 is a forward-looking lens 48a for a corresponding forward-looking camera for capturing (e.g., recording, scanning, sensing, etc.) actual scenes of real world environments in order to generate augmented views of those actual scenes. In some alternative implementations, the forward-looking lens 48a may be alternatively located at bridge 44 of the frame piece 41 or at some other location. Note that the left lens 45a and the right lens 45b are optional and are not necessary for implementing AR functionalities.

In FIG. 4A, the see-through display 46 is depicted as covering only a portion of the right lens 45b and being depicted as being attached to the end of the electronics housing 47. Thus, the see-through display 46 may be used to display and overlay computer generated data and/or images onto portions of views of actual scenes of the real world environment that a user might see through right lens 45b. Note again that since the see-through display 46 covers only a portion of the right lens 45b, only a portion of the view that a user may see through the right lens 45b may be augmented (e.g., modified). In some other alternative implementations, the see-through display 46 may alternatively cover the entire right lens 45b so that the entire view of the user through the right lens 45b may be augmented if needed. Although the electronic glasses 40 in FIGS. 4A and 4B is depicted as having only one see-through display 46 over the right lens 45b, in alternative implementations, a second see-through display may be disposed over the left lens 45a. The left temple 42a and the right temple 42b are features that allow the AR system to be worn on a user's head.

FIG. 4B depicts a view of the backside 49b of the frame piece 41 of the electronic glasses 40 depicted in FIG. 4A. In FIG. 4B, the see-through display 46 can be seen through the clear right lens 45b. Further illustrated in FIG. 4B is an inward-looking lens 48b that can be seen through the clear right lens 45b and which is for a corresponding inward-looking camera. As illustrated the inward-looking lens 48b is disposed on the electronics housing 47 near the see-through display 46. The inward-looking cameras may be employed in order to track the movements as well as the gaze and focus of the right eye of a user. The placement of the inward-looking lens 48b is a design choice and may be located elsewhere so long as it has a view to the right eye of a user. In alternative implementations, a second inward-looking lens for a second inward-looking camera may be included in order to track and monitor the movements as well as the gaze and focus of the left eye of the user. In the exemplary electronic glasses 40 illustrated in FIG. 4A, all of the major components are depicted as being located on the right-side of the electronic glasses 40. Alternatively, these components (e.g., electronic housing 47, see-through display 46, and so forth) may be alternatively or additionally located on the left-side of the electronic glasses 40.

The electronics housing 47 may house various electronics including electronics that are designed for, for example, processing data provided by the various cameras (e.g., forward-looking as well as backward looking cameras), and for generating augmented views of scenes from real world environment that may be displayed through see-through display 46. The types of electronics that may be included with the electronic glasses 40 may include, for example, the types of electronics (e.g., microprocessors, controllers, network interface card, memory, camera, battery, etc.) that are often found in mobile computing/communication devices such as the smartphone 10 or the tablet computer 20 described earlier.

In some cases, the electronic housing 47 (and its contents including one or more cameras) and the see-through display 46 may be a separate unit that can be clipped onto a prescription or non-prescription eyeglasses. In such an embodiment, the electronic housing 47 may include one or more features (e.g. one or more clips, magnets, straps, and so forth) that allows the housing to be worn by a user by allowing the electronic housing 47 to be attached to a pair of eye-glasses or goggles.

There are many types of augmentations that may be provided through AR systems including, for example, an augmentation that is in the form of text that may be added to an augmented view of a scene from the real physical environment, an augmentation that is in the form of 2 or 3-dimensional item (which may or may not be an animated item that moves) that is added to an augmented view, and/or an augmentation that simply modifies, emphasizes, deletes, or deemphasizes an existing real world item (e.g., intensity of light, color of a car, removal of undesirable elements in the corresponding real field of view such as rubbish on the ground, etc.) in the augmented view. In some cases, informational augmentations in the form of, for example, textual augmentations may be included in an augmented view of a scene from the real environment in order to display information related to, for example, the scene from the real environment or a visual item included in the scene from the real environment. For example, if an AR device is being used to view the front of a retail store, then the AR device may be designed to include into the augmented view of the retail store sales and discount information related to the retail store.

As the development of AR technology moves forward and evolves, and as the use of AR devices becomes more prevalent, the ability to share augmentations between AR device users (e.g., between AR devices) may become highly desirable and in some cases, necessary. That is, it is contemplated that in the future there will be many situations whereby not all AR devices and AR device users will have equal access to augmentations that may be available for inclusions into augmented views of real world environments. In fact, it is contemplated that augmentations displayed by AR devices may originally be provided from a variety of sources that may not be equally accessible by all AR users.

For example, in some cases an augmentation, such as an informational augmentation that provides information related to a particular visual item (e.g., a store front, a merchandise item, an athletic event, items inside a restaurant or school, and so forth) that may be visible through an AR device, may be provided by a third party source (e.g., a retail store, a school, a sports arena, and so forth) that may be associated with the visual item (or its location) viewed through AR devices. For instance, if an AR user, who is using an AR device, enters a particular shopping mall, then an informational augmentation providing retail information related to that mall may be provided to the AR user through his or her AR device. Such informational augmentation may be downloaded to the AR device only when the AR device detects that it is in the proximate vicinity of the mall or when the AR device visually detects one or more visual cues (e.g., visual markers or visual items) associated with the mall that prompts the AR device to acquire the appropriate information augmentation from one or more sources (e.g., wireless routers or servers) affiliated with the mall.

In contrast, other AR device users who are not in the vicinity of the mall or who do not have visual access to the one or more visual cues associated with the mall may not have access to such informational augmentations even though such augmentations may be useful to the other AR device users (e.g., the other AR device users may be interested in what is on sale at the mall and may be viewing advertisements for the mall). Such augmentations may be particularly useful when the other AR device user or users are in communication with the first AR user who is at the mall. That is, it may be helpful to facilitate communication between multiple AR device users when all of the AR device users have access to the same augmentations and/or when one or all AR device users have an understanding as to what augmentations are the other AR device user or users seeing through their AR device or devices. Thus, the ability to be able to share augmentation information, as well as to be able to coordinate presentation of augmentations and information related to the display of the augmentations, in real-time in some cases, may be greatly beneficial.

In accordance with various embodiments, computationally implemented methods, systems, circuitry, articles of manufacture, and computer program products are described herein that are designed to, among other things, acquire by a first augmented reality (AR) device augmentation data that is associated with one or more first augmentations that was remotely displayed by a second AR device; visually present by the first AR device one or more second augmentations, the visual presenting by the first AR device of the one or more second augmentations being based, at least in part, on the received augmentation data; and relay back to the second AR device usage data that indicates usage information related at least to usage or non-usage by the first AR device of to the received augmentation data.

In some implementations, the computationally implemented methods, systems, circuitry, articles of manufacture, and computer program products may actually be designed to, among other things, receive augmentation data associated with one or more first augmentations, the one or more first augmentations having been included in a first augmented view of a first actual scene that was remotely displayed at a remote augmented reality (AR) device, display one or more second augmentations in a second augmented view of a second actual scene, the displaying of the one or more second augmentations being in response, at least in part, to the augmentation data, and transmit to the remote AR device usage data that indicates usage information related at least to usage or non-usage of the received augmentation data.

Figure 7A:
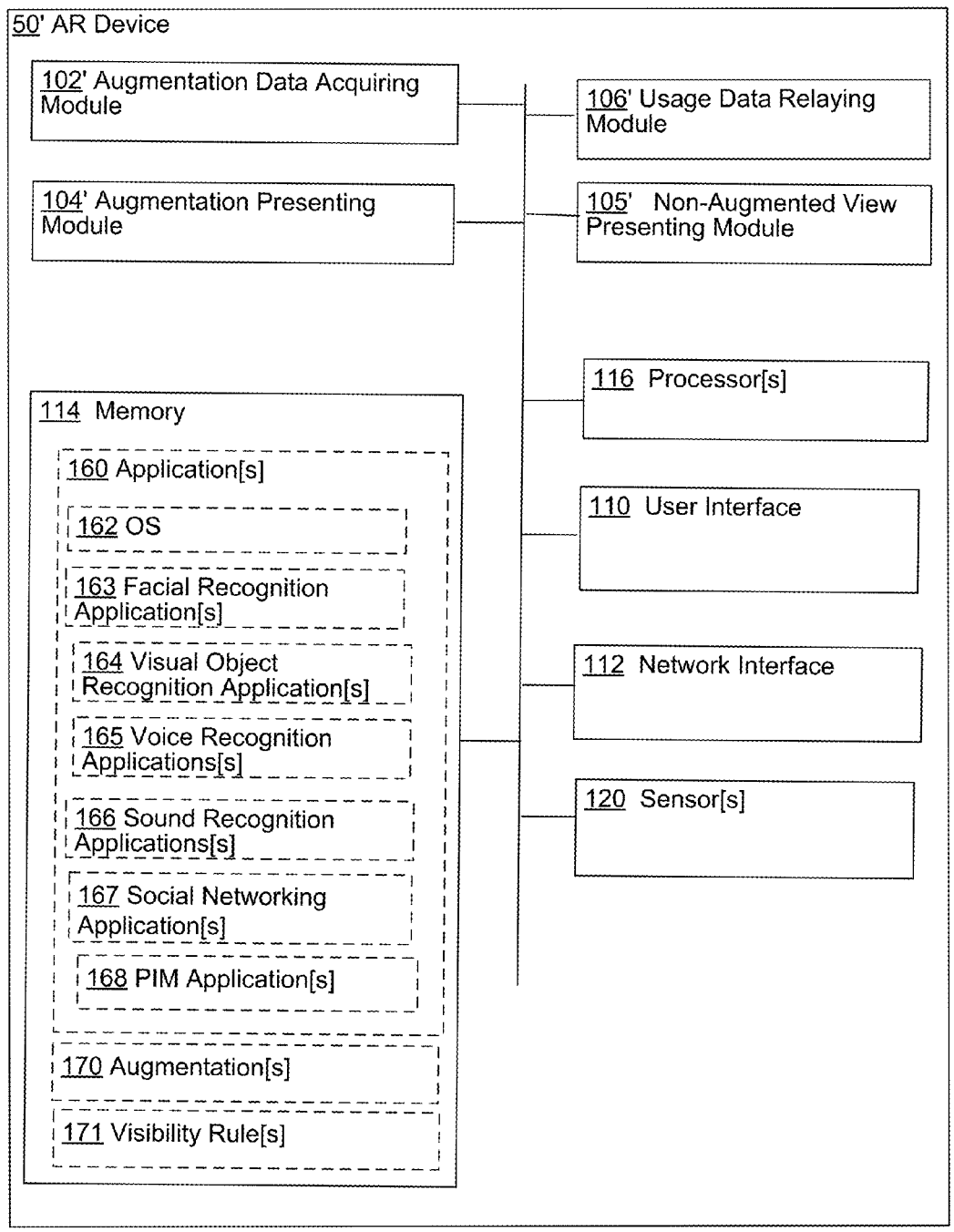
FIG. 7A shows a block diagram of particular implementation of the AR device 70* illustrated in FIGS. 5A and 5B.
Figure 7B:
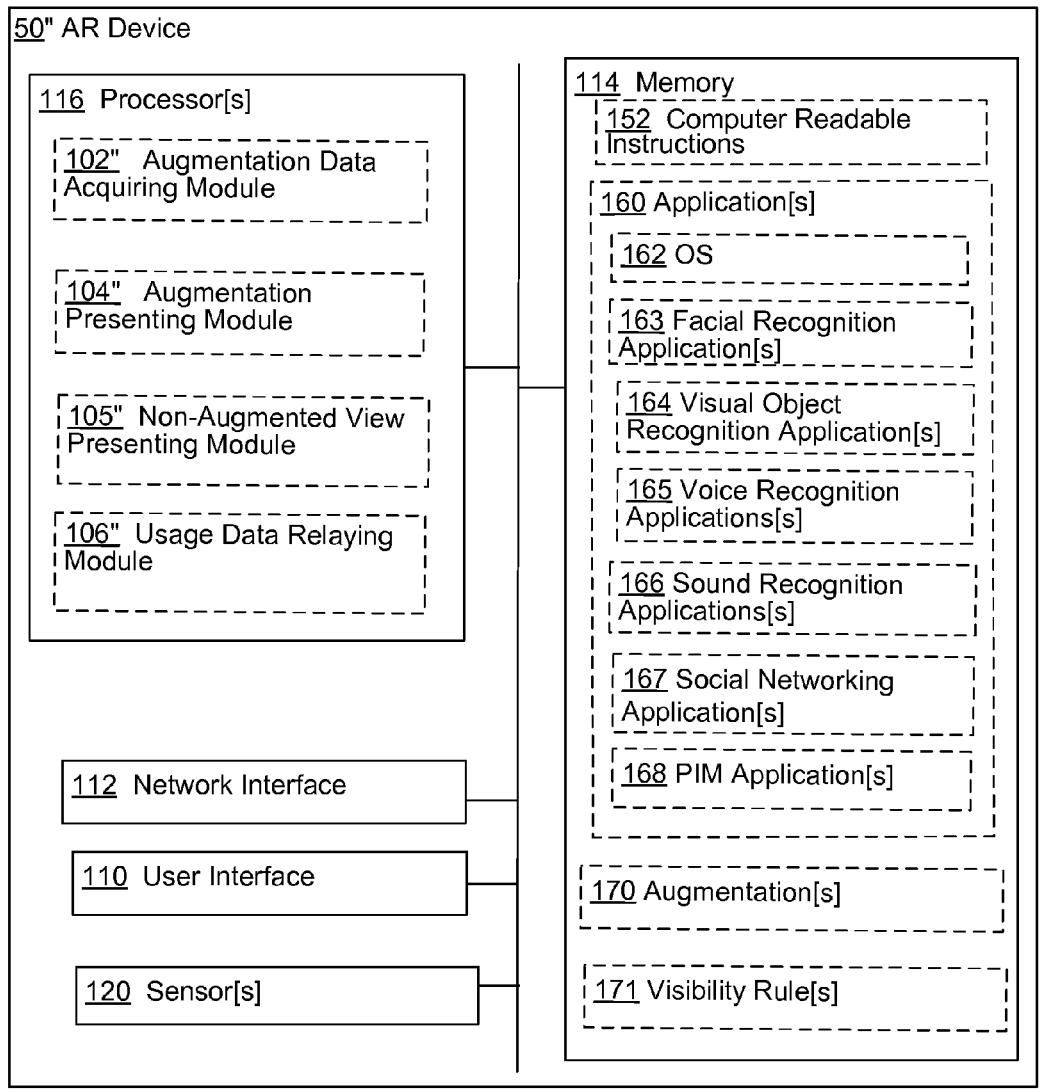
FIG. 7B shows a block diagram of yet another implementation of the AR device 70* illustrated in FIGS. 5A and 5B.

In various embodiments, the methods, systems, circuitry, articles of manufacture, and computer program products in accordance with various embodiments may be implemented by the AR device 50* of FIG. 7A or 7B. Note that for purposes of the following, "*" represents a wildcard. Thus, references in the following to the AR device 50* of FIG. 7A or 7B may be in reference to the AR device 50' of FIG. 7A or to the AR device 50" of FIG. 7B. Note further that the AR device 50* of FIG. 7A or 7B may have a variety of form factors including, for example, any one of the form factors illustrated in FIGS. 1A, 1B, 2A, 2B, 3A, 3B, 4A, and 4B.

Figure 5A:
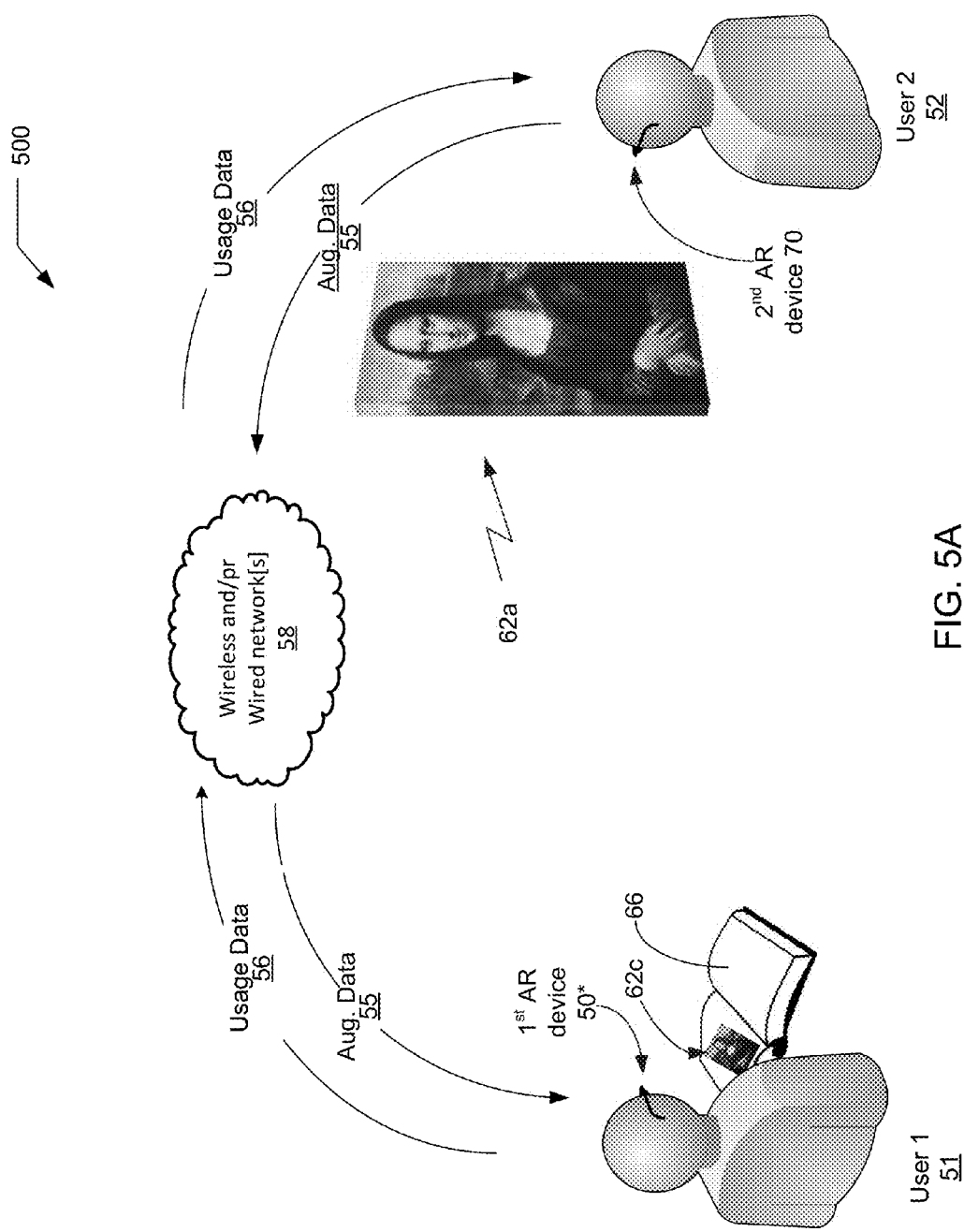
FIG. 5A shows an example environment 500 in which a first user 51 who is using a first augmented reality (AR) device 50* exchanges augmentation data 55 and usage data 56 with a second user 52 who is using a second AR device 70.
Figure 5B:
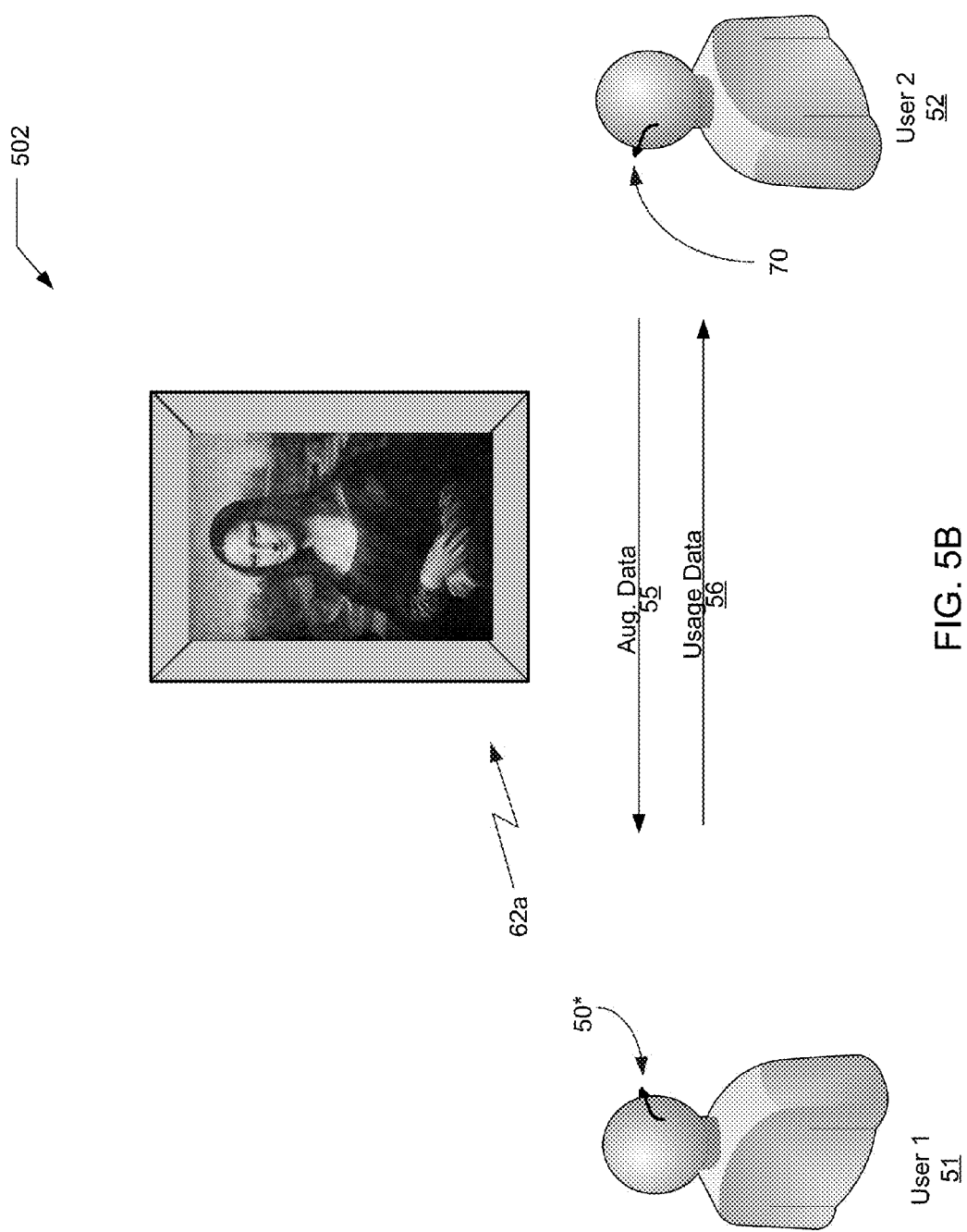
FIG. 5B shows another example environment 502 in which a first user 51 who is using an augmented reality (AR) device 50* exchanges augmentation data 55 and usage data 56 with a second user 52 who is using a second AR device 70.

In order to further facilitate understanding of the various operations, processes, and systems to be described herein, certain concepts and terms will now be introduced with references to FIGS. 5A and 5B, 6A, 6B, 6C, 6D, 6E, 6F, 6G, 6H, 6J, 6K, 6M, 6N, 6P, 6Q, 6R, 6S, 6T, and 6U. In particular, FIGS. 5A and 5B illustrate two exemplary environments that show how a first AR device user 51 (hereinafter "first user 51" or simply "user 51") using a first AR device 50* may exchange various augmentation data and/or augmentation-related data with a second AR device user 52 (hereinafter "second user 52" or simply "user 52") using a second AR device 70 in accordance with various embodiments. In contrast, FIGS. 6A, 6B, 6C, 6D, 6E, 6F, 6G, 6H, 6J, 6K, 6M, 6N, 6P, 6Q, 6R, 6S, 6T, and 6U illustrates example actual views and augmented views of scenes from the real environment that may be displayed through the first AR device 50* or the second AR device 70 of FIGS. 5A and 5B in accordance with various embodiments. Note that the first AR device 50* and the second AR device 70 have been depicted as having the shape of glasses (as illustrated in FIGS. 4A and 4B) only for the sake of convenience. Thus, in alternative implementations, the first AR device 50* and/or the second AR device 70 may have other form factors (e.g., a smartphone, a tablet computer, a goggle, a helmet, and so forth)

Referring particularly now to FIG. 5A which illustrates an example environment 500 in which a first user 51 (using a first augmented reality (AR) device 50* or simply "AR device 50*") acquires augmentation data 55 from a second user 52 (who is using a second AR device 70 or simply "AR device 70") and relaying to the second AR device 70 usage data 56 that provides information related to the usage or non-usage of the augmentation data 55 by the first AR device 50*. In particular, FIG. 5A illustrates an example scenario in which the second user 52 is viewing a first visual item 62a in the form of a painting (i.e., the Mona Lisa) at a first location (e.g., a museum in New York). In the example scenario, the second user 52 is depicted as viewing (see actual view 60a of FIG. 6A, which is an exemplary actual or unmodified view of the first visual item 62a as seen through the AR device 70) the first visual item 62a using an AR device 70 and may see through the first AR device 70 an augmented view 60b (see FIG. 6B) of the first visual item 62a. The augmented view 60b that the second user 52 may see through the AR device 70 may include one or more first augmentations including a first augmentation 64a (see FIG. 6B) that is informational and that provides information related to the first visual item 62a. Note that in the example illustrated in FIG. 6B, the first augmentation 64a to be included in augmented view 60b of the actual scene (e.g., actual view 60a of FIG. 6A) is "affiliated with" the first visual item 62a since the first augmentation 64a is associated with and depends on, for its inclusion in the augmented view 60b, the presence of the first visual item 62a in the corresponding actual scene (e.g., actual view 60a of FIG. 6A).

The first augmented reality (AR) device 50* (or simply "AR device 50*"), which may include a wireless transceiver as part of, for example, the network interface 112 illustrated in FIGS. 7A and 7B, may acquire augmentation data 55 from the second AR device 70 of the second user 52. The first AR device 50* may be used by the first user 51 in order to view an augmented view of an art book 66 that contains a second visual item 62c (e.g., an image of the Mona Lisa in the art book 66)—note that in this example, the second visual item 62c viewed through the first AR device 50* is essentially the same as the first visual item 62a viewed through the second AR device 70. In the example environment 500 illustrated in FIG. 5A, the second user 52 may be viewing the first visual item 62a at a first location such as a museum, while the first user 50* may be viewing the second visual item 62c (e.g., an image of the Mona Lisa in an art book 66) at a second location (e.g., user's home). In order to coordinate the augmentations being presented by both the AR device 70 and the AR device 50*, augmentation data 55 may be relayed (e.g., transmitted or sent) to the first AR device 50 from the second AR device 70 via one or more wireless and/or wired networks 58 (e.g., a cellular telephone or data network, a wireless local area network (WLAN), a wireless wide area network or WAN, a public switched telephone network (PTSN), a personal area network (PAN), and/or other types of networks). The augmentation data 55 that may be acquired by the first AR device 50* may include, for example, content information, formatting information including, for example, one or more visibility rules (e.g., rules that define when or how an augmentation may be presented through an augmented view), and/or other types of information associated with the one or more first augmentations (e.g., augmentation 64a of FIG. 6B) presented through the AR device 70. More details regarding the augmentation data 55 will be described in greater detail in the processes and operations to be described herein.

Based, at least in part, on the augmentation data 55 acquired from the second AR device 70, the first AR device 50* may or may not visually present, for example, a second augmented view 60h (see FIG. 6H) that includes one or more second augmentations (e.g., augmentation 64e—see FIG. 6H) as the first user 51 views the second visual item 62c (e.g., the image of the Mona Lisa in art book 66) through the first AR device 50*. Note that the formatting and the presentation of the one or more second augmentations (e.g., augmentation 64e—see FIG. 6H) by the first AR device 50* may, in addition to being based on the augmentation data 55 (including one or more visibility rules) provided by the second AR device 70, be based on its own visibility rules (e.g., the visibility rules of the first AR device 50*) or visibility rules provided by other sources.

In order to further coordinate (e.g., synchronize or harmonize) the augmented and non-augmented views provided through the first AR device 50* with the augmented and non-augmented views provided through the second AR device 70, the first AR device 50* may relay (e.g., transmit) to the second AR device 70 usage data 56, which may include a variety of data including, for example, data that may indicate that the augmentation data 55 has been successfully received by the first AR device 50*, data that indicate that one or more second augmentations (e.g., augmentation 64e of FIG. 6H) was displayed by the first AR device 50*, and/or other types of data related to the presentation and/or usage of augmentations or augmentation data. A more detailed discussion related to the usage data 56 will be provided with respect to the processes and operations to be described herein.

Turning now to FIG. 5B, which illustrates another exemplary environment 502 in which the first AR device 50* is sharing augmentation data 55 and usage data 56 with the second AR device 70 similar to the exemplary environment 500 of FIG. 5A. However, unlike in the exemplary environment 500 illustrated in FIG. 5A, in the exemplary environment 502 illustrated in FIG. 5B, the first user 51 and the second user 52 are spatially very close to each other and are using their respective AR devices (e.g., AR device 50* and AR device 70) to view the same visual item 62a. That is, there are many circumstances in which multiple AR devices may have differing access to various augmentations even though the AR devices may are being used in the same location for similar purposes (e.g., for example one AR device 70 may have stored augmentation data in its memory 114 that may not be stored in the memory of another AR device 50*). In such circumstances, it may still be desirable to be able to share augmentation data 55 and usage data 56 between the different AR devices (e.g., the AR device 50* and the AR device 70).

Note that in the following, the words "remote" or "remotely" will be repeatedly used with respect to various operations to be described herein. In particular, the words "remote" or "remotely" will generally be used herein with respect to various operations performed by, for example, a second AR device 70 and in contrast to a "local" or "locally" executed operations as performed by, for example, a first AR device 50*. Thus, the words "remote" or "remotely" does not indicate or suggest any required spatial distance for performing an operation but instead is merely indicating that the corresponding "remote" operation is being performed at, for example, a second AR device 70 as opposed to being performed "locally" at, for example, a first AR device 50*. Although not illustrated in FIG. 5B, in some implementations, the first AR device 50* and the second AR device 70 may be communicate with each other via one or more wireless and/or wired networks 58 as was illustrated in FIG. 5A. Alternatively, the AR device 50* and the AR device 70 may be in direct communication with each other.

Turning now to FIGS. 6A, 6B, 6C, 6D, 6E, 6F, 6G, 6H, 6J, 6K, 6M, 6N, 6P, 6Q, 6R, 6S, 6T, and 6U that illustrate exemplary actual views and augmented views of various scenes from the real environment that may be provided by the first AR device 50* and the second AR device 70 illustrated in FIG. 5. The exemplary actual views and the exemplary augmented views illustrated in these figures are provided in order to facilitate understanding of various concepts that will be described in connection with the various operations and processes to be discussed herein. In particular, FIGS. 6A, 6B, 6C, 6D, 6E, and 6F illustrate example actual views and augmented views that may be presented by the second AR device 70 of FIGS. 5A and 5B. In contrast, FIGS. 6G, 6H, 6J, 6K, 6M, 6N, 6P, 6Q, 6R, 6S, 6T, and 6U illustrate example actual views and augmented views that may be presented by the first AR device 50* of FIGS. 5A and 5B (e.g., the AR device 50' of FIG. 7A or the AR device 50" of FIG. 7B). Note that the shapes (e.g., rectangular shapes) of the actual and augmented views that are illustrated in 6A, 6B, 6C, 6D, 6E, 6F, 6G, 6H, 6J, 6K, 6M, 6N, 6P, 6Q, 6R, 6S, 6T, and 6U are not meant to be accurate depictions of the shapes of the actual and augmented views that may be obtained through, for example, the AR device 50* or the AR device 70 of FIGS. 5A and 5B. Instead, the actual and augmented views illustrated in FIGS. 6A, 6B, 6C, 6D, 6E, 6F, 6G, 6H, 6J, 6K, 6M, 6N, 6P, 6Q, 6R, 6S, 6T, and 6U were made to have simple rectangular shapes for ease illustration and explanation. Note that for ease of illustration and explanation, the following discussions of the various actual and augmented views illustrated in FIGS. 6A, 6B, 6C, 6D, 6E, 6F, 6G, 6H, 6J, 6K, 6M, 6N, 6P, 6Q, 6R, 6S, 6T, and 6U will be provided by referencing the exemplary environment 500 illustrated in FIG. 5A. However, those of ordinary skill in the art will recognize that the various concepts to be introduced in the following will also be applicable to the exemplary environment 502 illustrated in FIG. 5B.

Figure 6A:
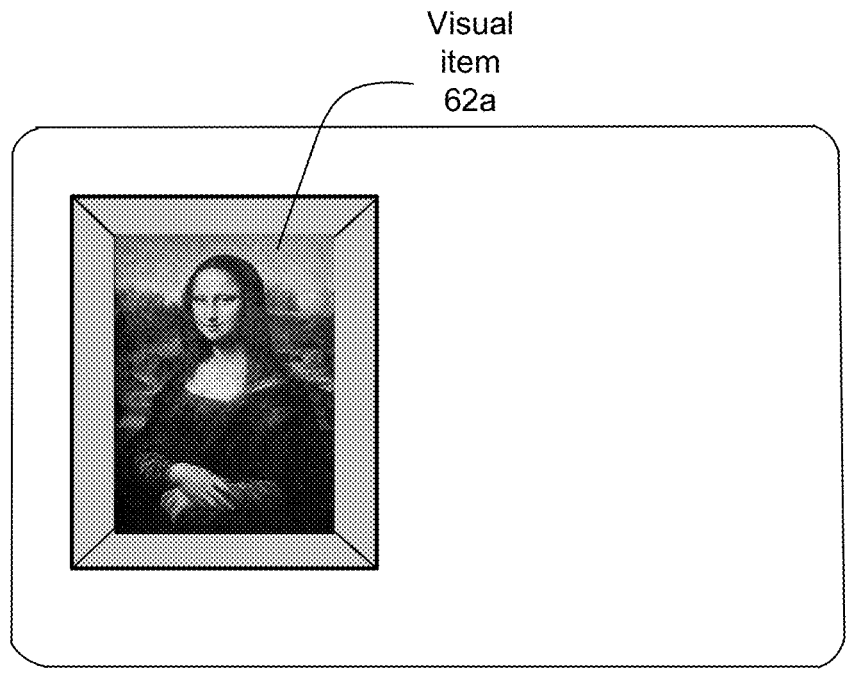
FIGS. 6A, 6B, 6C, 6D, 6E, 6F, 6G, 6H, 6J, 6K, 6M, 6N, 6P, 6Q, 6R, 6S, 6T, and 6U show exemplary actual and augmented views of various scenes from the real environment.
Figure 6B:
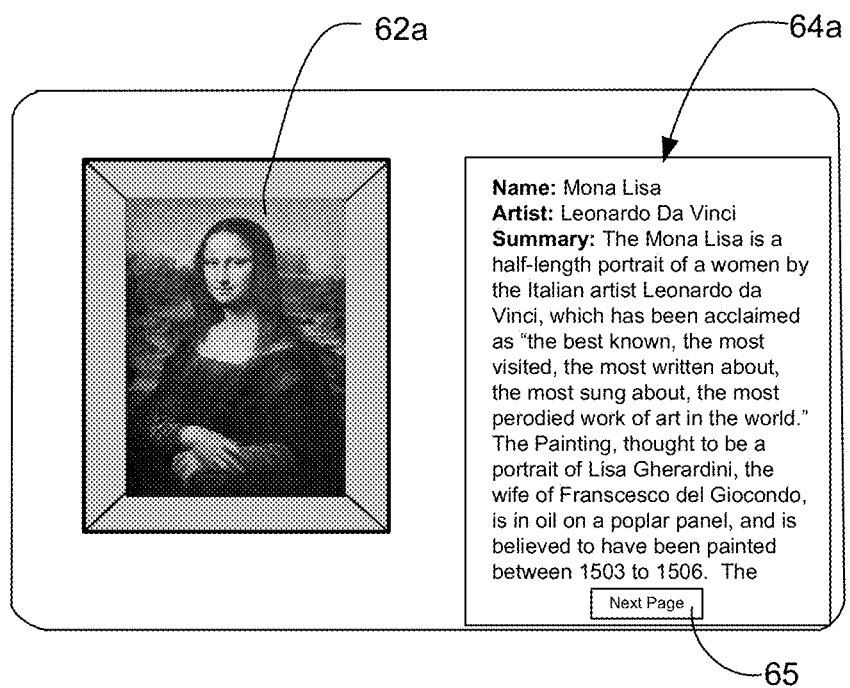

Referring particularly now to FIG. 6A, which illustrates an exemplary actual view 60a of a scene from the real environment as captured by, for example, the second AR device 70 of FIG. 5A. The actual view 60a, as captured by the second AR device 70 includes a first visual item 62a (or simply "visual item 62a"). In various embodiments, the AR device 70 may obtain an augmentation 64a (e.g., data for generating the augmentation 64a) from one or more third party sources (e.g., wireless network servers) associated with the museum displaying the visual item 62a, (e.g., the Mona Lisa painting). Based on the obtained augmentation 64a, the AR device 70 may present the first augmented view 60b (which includes augmentation 64a) as illustrated in FIG. 6B.

In some cases, the acquisition of the augmentation 64a by the AR device 70 from the one or more third party sources may have been prompted by the detection of one or more visual cues (e.g., detection of the visual item 62a or other visual items such as a marker placed in the vicinity of the visual item 62a). In alternative embodiments, the acquisition of the augmentation 64a by the AR device 70 may have been prompted by the location that is associated with the visual item 62a or the location associated with the actual scene associated with the visual item 62a. In still other embodiments, the acquisition of the augmentation 64a by the AR device 70 may have been prompted by the reception of wireless signals (e.g., as generated by a wireless router or server located at the museum) that directly or indirectly indicates the availability of the augmentation 64a for downloading. In still other cases, augmentation 64a may have been stored in the memory of the AR device 70 and may have been factory installed.

Note that in various embodiments the augmentation 64a that is included in the augmented view 60b that may be presented by the AR device 70 may be placed at a specific predefined location within the augmented view 60b based on one or more visibility rules. For example, the AR device 70 may comply with one or more visibility rules that requires the augmentation 64a to be placed in the proximate vicinity (e.g., adjacent) to the visual item 62a in the augmented view 60b. In FIG. 6B, the example augmentation 64a to be included in the augmented view 60b is an informational augmentation that includes information (e.g., name of painting, name of artist, and background summary) related to the visual item 62a. Note that included with the augmentations 64a is a tab 65 (e.g., a functional augmentation) for scrolling through the background summary. Such a tab 65 may be selected or activated using a variety of techniques (e.g., using eye focus or gaze tracking application, a voice command system, and so forth).

Figure 6C:
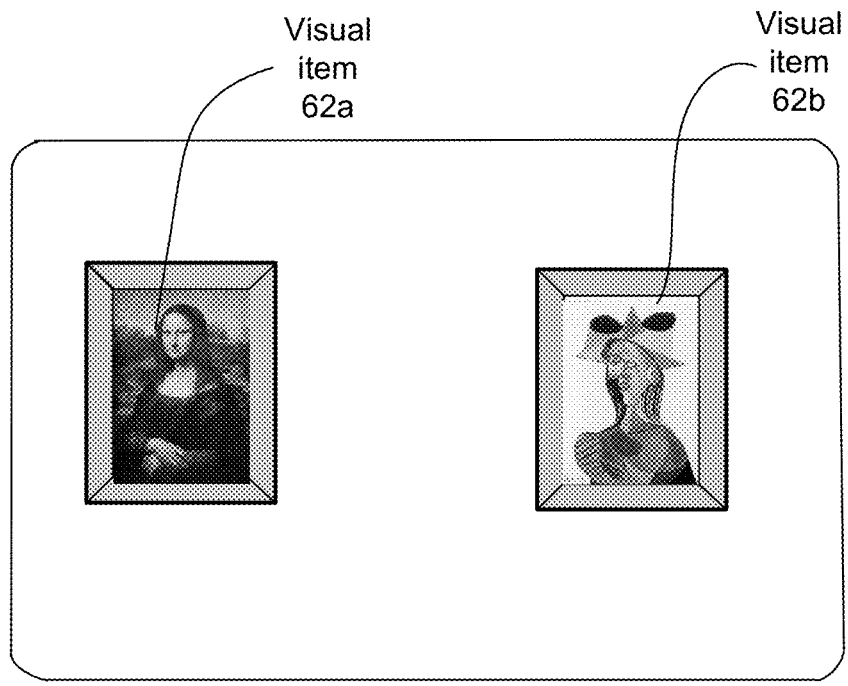

Turning now to FIG. 6C, which illustrates another exemplary actual view 60c that the user 52 may see through the AR device 70 (e.g., that the user 52 may see if the AR device 70 is setup to display unmodified views—no augmentations) if the user 52 takes several steps back away from the visual item 62a. As a result of the user 52 stepping further away from the visual item 62a (e.g., the Mona Lisa painting), another visual item 62b (e.g., a Picasso painting) appears in the actual view 60c (e.g., field of view) of the AR device 70.

Figure 6D:
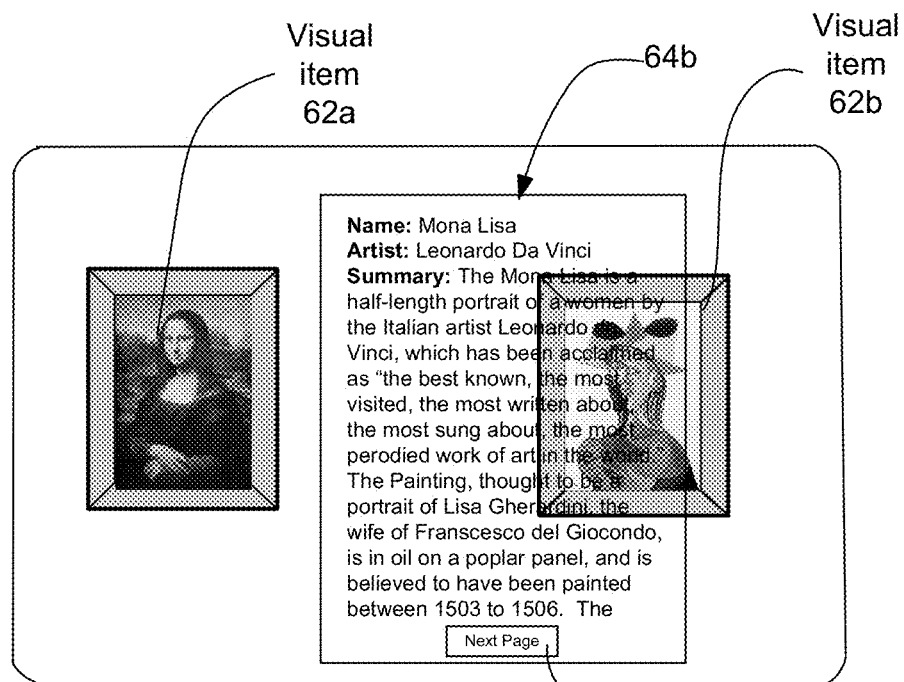

Referring now to FIG. 6D, which is an exemplary augmented view 60d of actual view 60c (e.g., actual scene from the real environment) illustrated in FIG. 6C. The augmented view 60d includes an augmentation 64b that was inserted and formatted in the augmented view 60d based, for example, on one or more visibility rules (e.g., directives or commands as to how and when one or more augmentations are to be presented) that the AR device 70 is executing. The augmentation 64b is an informational augmentation that provides background information related to the visual item 62a and that includes a tab 65 (e.g., a functional augmentation) for retrieving and displaying more information upon user request (e.g., the user 52 can select or activate tab 65 by eye focus, by voice command, and/or by other input means). The placement of the augmentation 64b adjacent to the visual item 62a in the augmented view 60b may be based on the one or more visibility rules that is being executed by the AR device 70 and that is requiring the augmentation 64b to be placed adjacent to the visual item 62a in the augmented view 60.

Note that since augmentation 64b overlays visual item 62b, the one or more visibility rules that the AR device 70 executes may require the augmentation 64b to be semi-transparent in order to minimize visual obstruction of the visual item 62b. That is, the one or more visibility rules that the AR device 70 may be complying with may designate one or more visual items (e.g., visual item 62b) as being one or more priority visual items that have visual priority over augmentations. That is, the one or more visibility rules being executed by the AR device 70 may require an augmentation 64b to be at least semi-transparent whenever, for example, the insertion of the augmentation 64 into an augmented view 60d (see FIG. 6D) will cause a view of one or more priority visual items (e.g. visual item 62b) to be fully or partially obstructed. Note that augmentation 64b may be "affiliated" with visual item 62a since augmentation 64b may depend on, for its insertion or placement in the augmented view 60d, the presence of the visual item 62a in the actual view 60c.

Figure 6E:
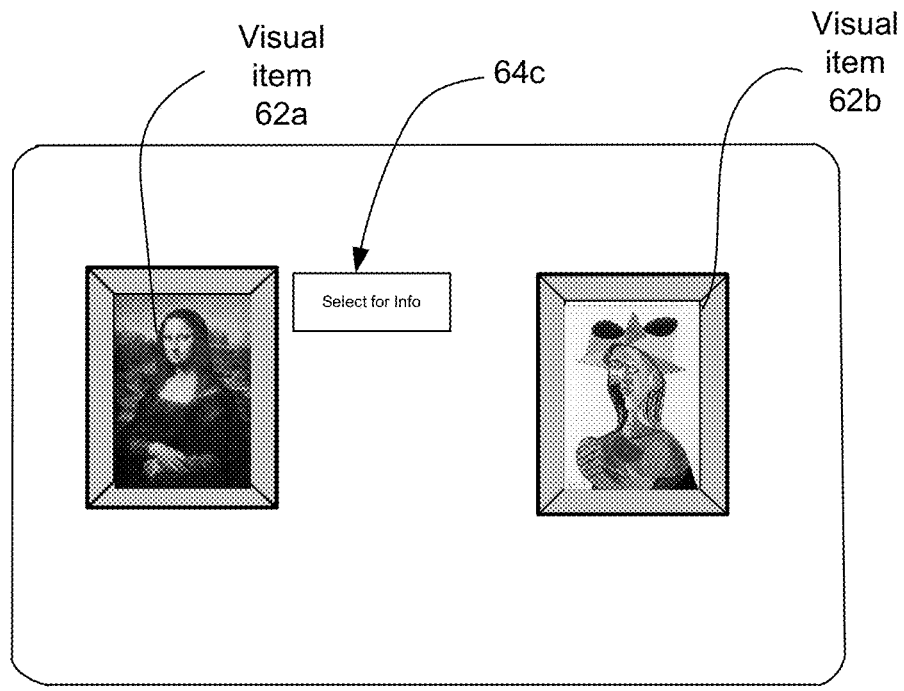

FIG. 6E illustrates another type of augmentation 64c that may be displayed (e.g., visually presented) by the AR device 70. The augmentation 64c is a functional augmentation that provides minimal content information and that may be selected or activated by a user 52 (e.g., voice command or eye stare or gaze) in order to retrieve and display another more informational augmentation (e.g. augmentation 64b of FIG. 6D). The inclusion of such an augmentation 64c in the augmented view 60e rather than augmentation 64b may be based on the one or more visibility rules being executed by the AR device 70. In some cases the one or more visibility rules may require, as a default, that such an augmentation 64c be included into the augmented view 60e whenever the affiliated visual item 62a is detected as being present in the actual view 60e (e.g., actual scene). Alternatively, the one or more visibility rules may require that such an augmentation 64c may only be inserted into the augmented view 60e only when a priority visual item 62b would be visually obstructed in the augmented view 60e if a more informational augmentation (e.g., augmentation 64a) is inserted into the augmented view 60e.

Figure 6F:
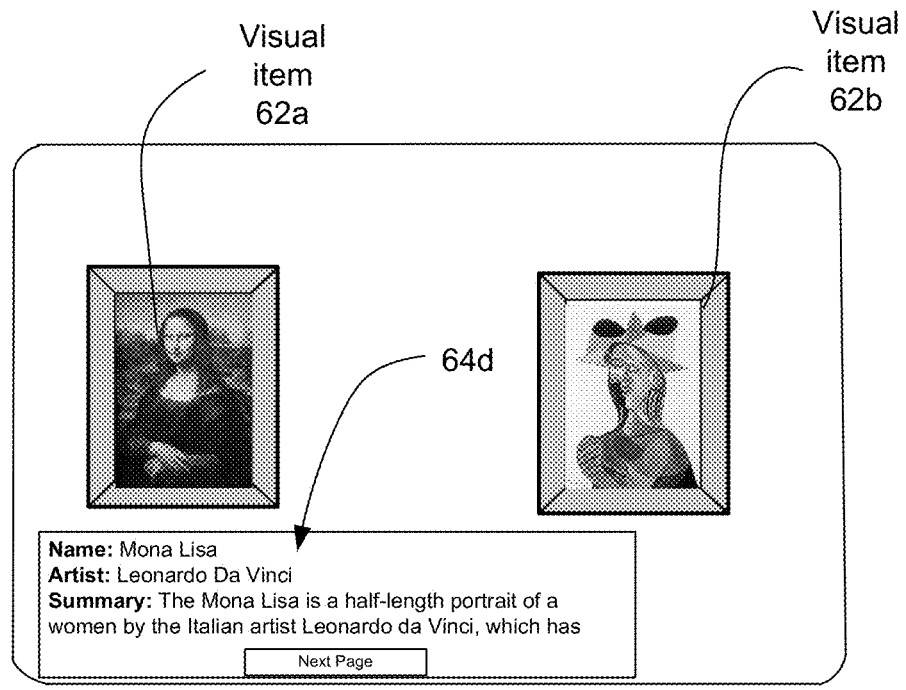

Referring now to FIG. 6F, which illustrates another exemplary augmented view 60f with another type of augmentation 64d. The augmentation 64d may be shaped and may be placed in a particular location of the augmented view 60f in order to prevent the view of the visual item 62b from being visually obstructed. That is, the one or more visibility rules that the AR device 70 may be executing may require that rather than making an augmentation 64d semi-transparent (as was the case in FIG. 6D) or make the augmentation 64d have a small footprint (as was the case in FIG. 6E), the AR device 70 may configure and place the augmentation 64d in the augmented view 60f in such a way as to not obstruct the view of the visual item 62b (e.g., priority visual item) in the augmented view 60f.

As described previously, the first AR device 50* of FIGS. 5A and 5B (as well as FIGS. 7A and 7B) may be designed to acquire (e.g., receive) augmentation data 55 from the second AR device 70 via, in some cases, one or more wireless and/or wired networks 58. The augmentation data 55 that may be relayed to the first AR device 50* may include information related to the generation and display of one or more augmentations (e.g., augmentation 64a, 64b, 64c, and/or 64d) that were presented by the first AR device 50* including, for example, content information, formatting information including one or more visibility rules, and/or other information related to the generation and/or presentation of one or more augmentations (e.g., augmentation 64a, 64b, 64c, and/ or 64d) by the first AR device 70. As briefly described above, the first user 51 of FIG. 5A is located far away from the second user 52 and is viewing an art book 66 that includes another visual item 62d (e.g., an image of the Mona Lisa). Note that although FIG. 5A appears to illustrate that he first user 51 and the second user 52 are separated by great distances, there is no requirement that the first user 51 and the second 52 be some minimal distance away from each other. Thus, the phrase "remote" as opposed to the phrase "local," as used herein, merely indicate that certain operations may be performed "locally" by a first AR device (e.g., AR device 50*) while other operations are performed "remotely" at a second AR device (e.g., AR device 70) as illustrated in FIG. 5B.

Figure 6G:
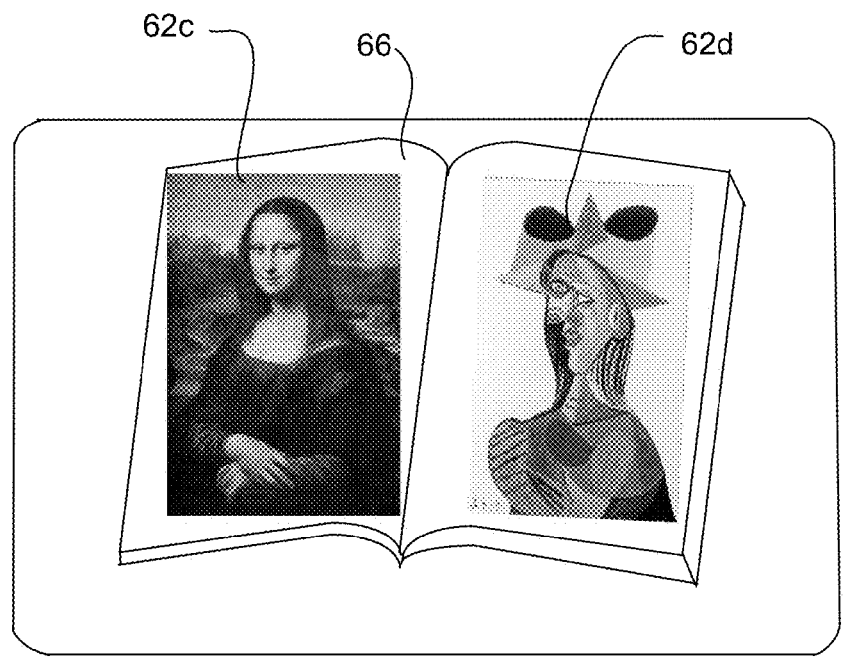
Figure 6H:
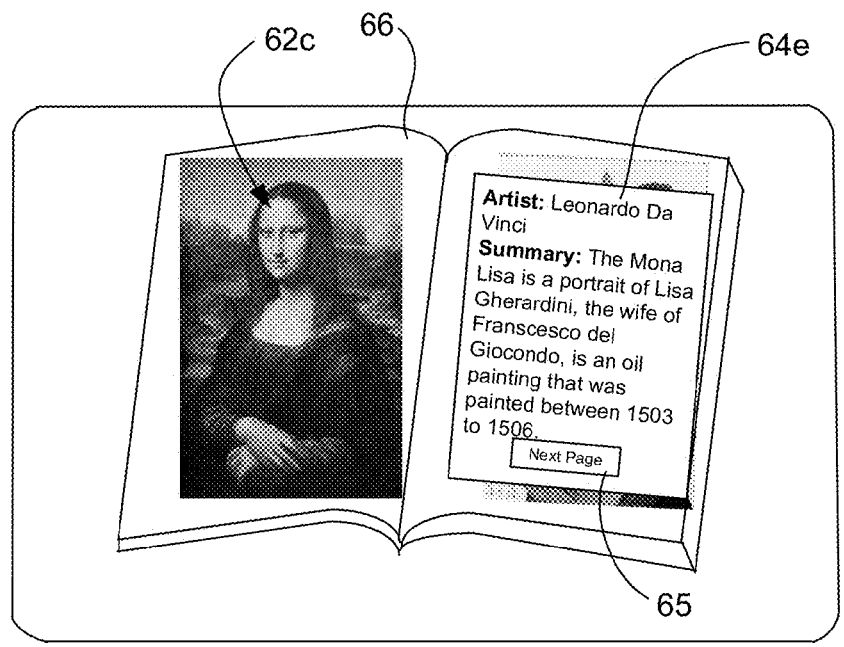

FIG. 6G illustrates an exemplary actual view 60g (e.g., unmodified or non-augmented view) of the open art book 66 of FIG. 5A as viewed through the AR device 50*. The actual view 60g includes art book 66 with its pages open, a visual item 62c (e.g., an image of the Mona Lisa that mirrors the visual item 62a (e.g., the Mona Lisa painting) of FIGS. 6A, 6B, 6C, 6D, 6E, and 6F), and another visual item 62d (e.g., an image of a Picasso) that mirrors the visual item 62b of FIGS. 6C, 6D, 6E, and 6F. Based, at least in part, on the received augmentation data 55 received from the second AR device 70 the first AR device 50* may display or present an augmented view 60h, as illustrated in FIG. 6H. The augmented view 60h that may be presented by the AR device 50* includes the open art book 66 and the visual item 62c (e.g., image of the Mona Lisa) that was part of the actual view 60g of FIG. 6G. In addition to the art book 66 and the visual item 62c, an augmentation 64e has been included into the augmented view 60h.

The content, formatting, and presentation of the augmentation 64e that is included into the augmented view 60h may be based, at least in part, on the augmentation data 55 received by the second AR device 50. The augmentation 64e, as illustrated, is a modified version (e.g., a shorten version with less information—no name for the painting and shortened shorter summary section) of the augmentation 64a (see FIG. 6B) presented by the first AR device 50*. The augmentation 64e includes a functional tag 65 for retrieving additional content information. The augmentation 64e, and similar to the augmentation 64a of FIG. 6B, may be affiliated with a visual item (e.g., visual item 62c). That is, augmentation 64e may depend on, for its insertion into the augmented view 60h, presence of a visual item 62c in the corresponding actual view 60q (see FIG. 6G).

In various embodiments, the specific formatting and content of the augmentation 64e to be presented by the second AR device 50*, in addition to being dependent on the received augmentation data 55, may in some cases be dependent on one or more visibility rules of the second AR device 50*. As will be further described and illustrated herein, many other types of augmentations (see, for example augmentations 64f, 64g, 64h, 64i, 64k, 64m, 64n, 64p, and 64q of FIGS. 6J, 6K, 6M, 6N, 6Q, 6R, 6S, 6T, and 6U) may be presented by the first AR device 50* based on the augmentation data 55 and the environmental context (e.g., user activities such as whether the user is at work, driving an automobile, shopping, visiting a museum, and so forth) in which the augmentations are being presented, and in some cases, based on its own visibility rules (e.g., rules that govern when and how an augmentation should be presented). Note that, and as will be described in greater detail herein, the environmental context that an augmentation (e.g., augmentation 64e, 64f, 64g, 64h, 64i, 64k, 64m, 64n, 64p, or 64q of FIGS. 6H, 6J, 6K, 6M, 6N, 6Q, 6R, 6S, 6T, and 6U) may be presented by the first AR device 50* may be inferred based on a variety of sensor input and/or user input data (e.g., data provided by optical sensors such as cameras for detecting one or more visible identifiable objects, data obtained from audio sensors for identifying particular sounds, data obtained through social networking channels that may indicate user activities, data from GPS devices, and so forth).

Figure 6J:
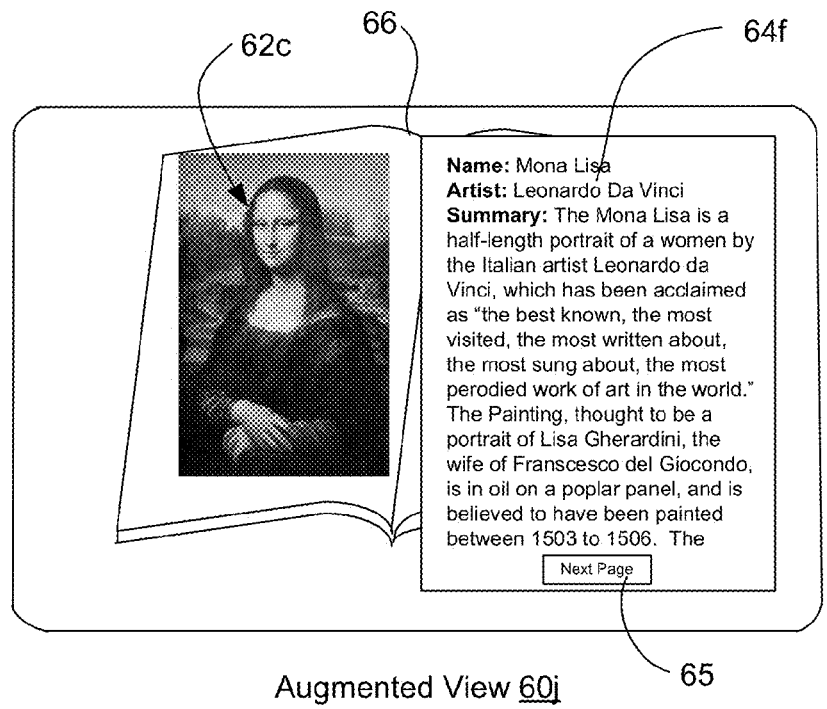

FIG. 6J illustrates another exemplary augmented view 60j including another augmentation 64f that may be presented by the AR device 50* of FIG. 7A or 7B (as well as FIG. 5A or 5B). The augmentation 64f depicted in FIG. 6J is an augmentation that fully replicates the information provided by augmentation 64a (see FIG. 6B) that was remotely displayed by the second AR device 70.

Figure 6K:
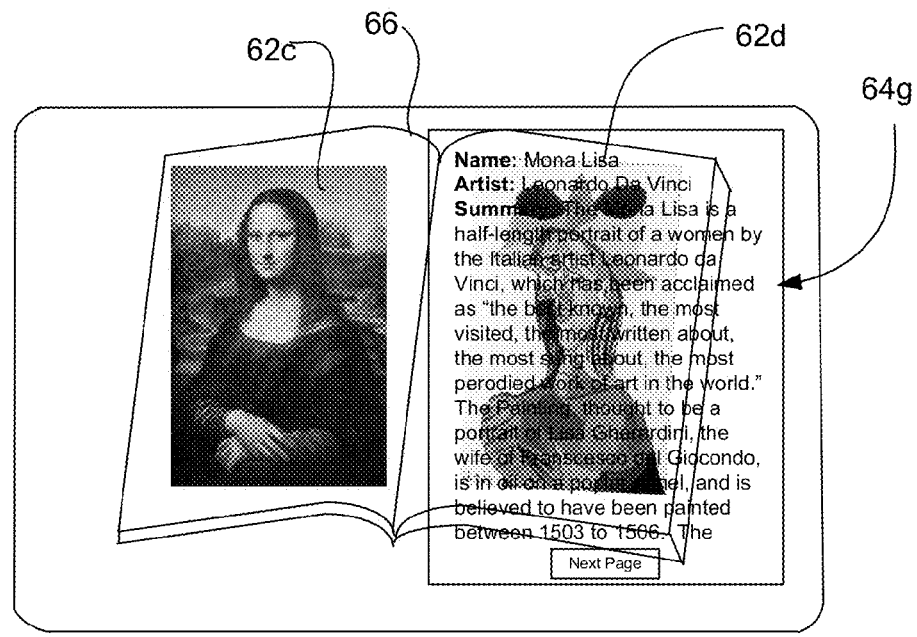

FIG. 6K illustrates yet another exemplary augmented view 60k that includes an augmentation 64g that may be presented by the AR device 50*. The augmentation 64j, as illustrated in FIG. 6K, is semi-transparent in order not to completely obfuscate or hide visual object 62d (e.g., image of the Picasso painting). The "transparentness" of augmentation 64j may be based on the one or more visibility rules provided by the augmentation data 55 that was received by the AR device 50*. Alternatively, the transparentness of augmentation 64j may be based on one or more visibility rules of the AR device 50* or based on visibility rules from a combination of different sources (e.g., from the AR device 50* and from the AR device 70).

Figure 6M:
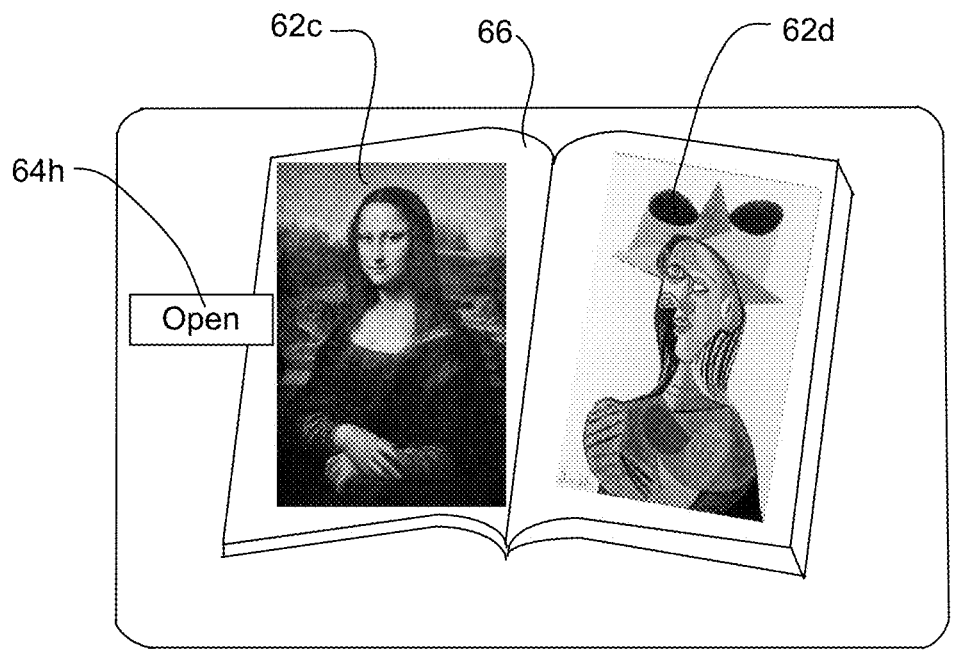

FIG. 6M illustrates still another exemplary augmented view 60m that includes an augmentation 64h that may be presented by the AR device 50*. In this example, the augmentation 64h is a functional augmentation that allows a user 51 to select or activate the functional augmentation 64h in order to retrieve and display a more informational augmentation. Augmentation 64h is similar to the functional augmentation 64c (see FIG. 6E) that may be displayed by the first AR device 70 and that provides very little content information prior to being activated or elected by the user 51. Note that the use of an augmentation 64h with a small footprint in the augmented view 60m means that the inserted augmentation 64h does not obfuscate the view of visual item 62d, which may, in fact, be identified as being a priority visual item by the one or more visibility rules that are executed by the AR device 50*.

Figure 6N:
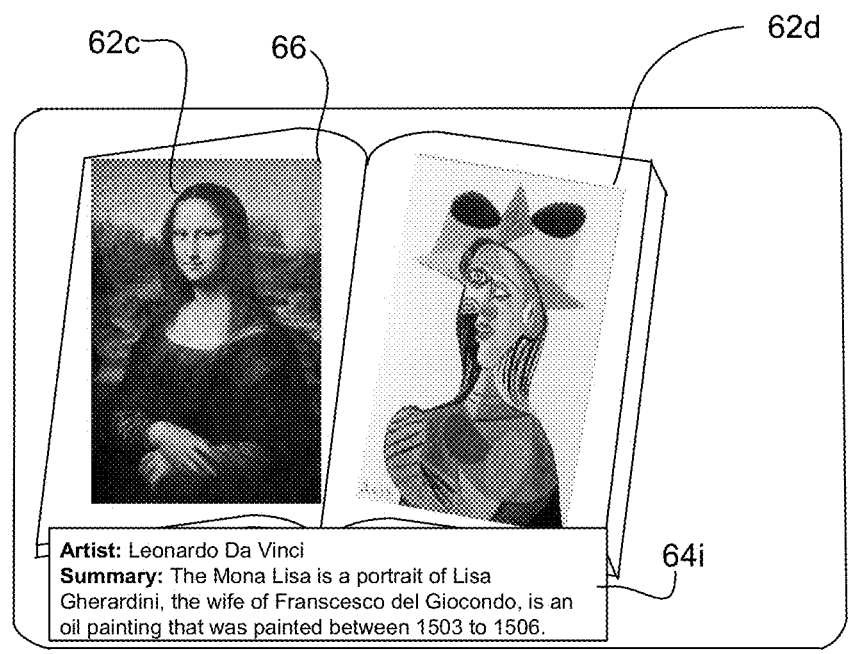

Turning now to FIG. 6N, which illustrates an exemplary augmented view 60n that includes augmentation 64i and that may be presented by the AR device 50*. In this case, augmentation 64i is shaped and placed in the augmented view 60n in a particular way as to not obstruct the view of visual item 62d. Note that augmentation 64i is similar to the augmentation 64d of FIG. 6F that may be presented by the second AR device 70. The specific formatting and the specific placement of the augmentation 64i in the augmented view 60n may be based on a number of factors including on one or more visibility rules provided by received augmentation data 55, one or more visibility rules locally provided by the AR device 50*, and/or environmental context in which the augmented view 60n will be displayed or presented.

Figure 6P:
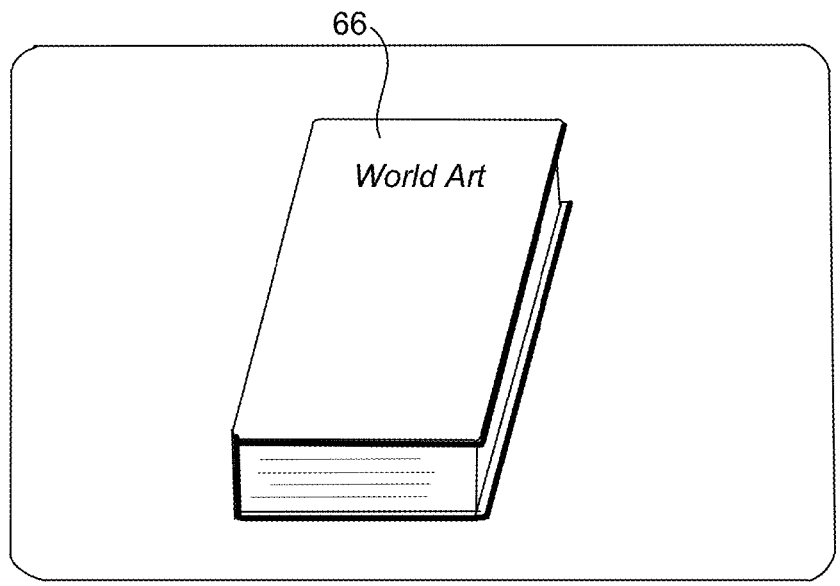
Figure 6Q:
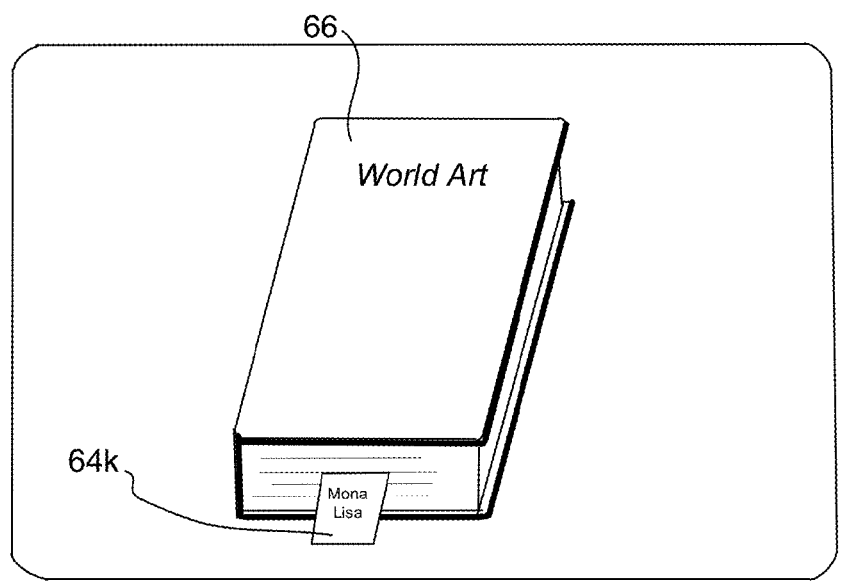

FIG. 6P illustrates an exemplary actual view 60p of the open art book 66 of FIGS. 6G, 6H, 6J, 6K, 6M, and 6N that has now been closed and that may displayed by the AR device 50*. FIG. 6Q, in contrast, illustrates an exemplary augmented view 60q of the actual view 60p that may be visually presented by the AR device 50*. The augmented view 60q includes a functional augmentation 64k that is shaped like a book or page marker and that may be activated or selected by a user 51 in order to retrieve and display another augmentation (e.g., augmentation 64f of FIG. 6J). That is, the AR device 50* based on one or more visibility rules (which may be its own visibility rules and/or visibility rules obtained from other sources such as from AR device 70) may visually recognize the outer cover the art book 66, and based on its recognition of the art book 66 and based on one or more visibility rules, may include into the augmented view 60q, the functional augmentation 64k. Since the art book 66 includes the image of the Mona Lisa (visual item 62c), the functional augmentation 64k may be made to be activated or selected in order to retrieve an informational augmentation (e.g., augmentation 64f of FIG. 6J) related to the visual item 62c included in the art book 66.

Figure 6R:
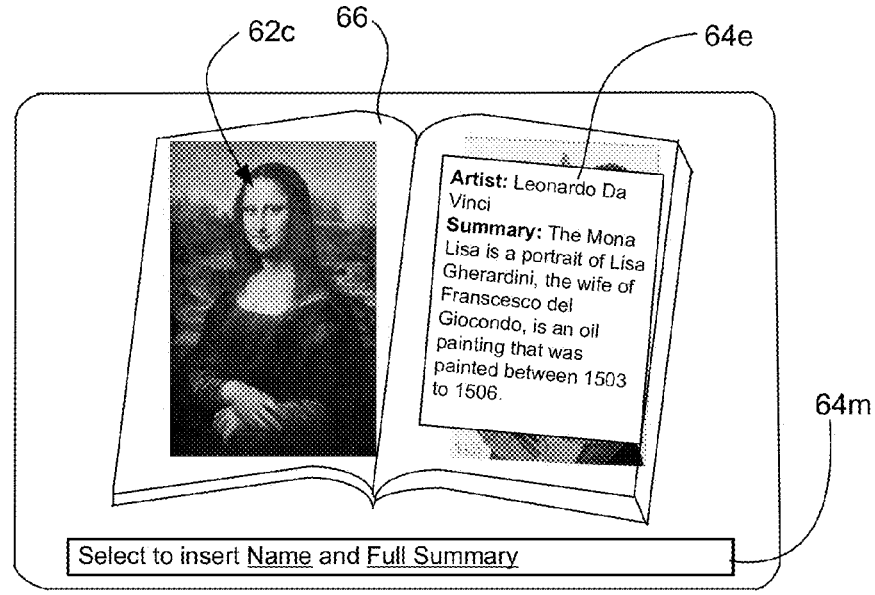

FIG. 6R illustrates another exemplary augmented view 60r that may be visually presented by the AR device 50*. Included in this augmented view 60r is a shortened augmentation 64e (which, for example, has reduced content information relative to what was shown by AR device 70 and which was previously illustrated in FIG. 6H) and a functional augmentation 64m for indicating and retrieving the missing information. That is, the functional augmentation 64m may be selected or activated by, for example, a user 51. In response to being selected or activated, the AR device 50* may provide additional content information related to, for example, visual item 62c (see FIG. 6G).

Figure 6S:
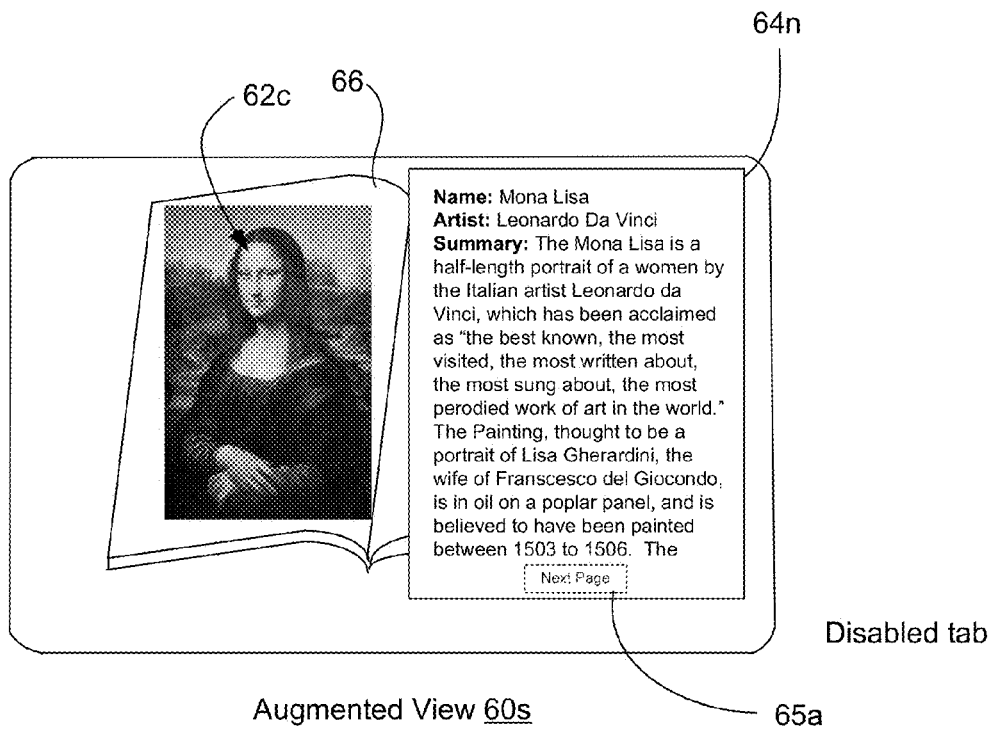

FIG. 6S illustrates an augmented view 60s that includes an augmentation 64n and that may be visually presented by the AR device 50*. In particular, augmentation 64n is a variation of the augmentation 64f illustrated in FIG. 6J except that augmentation 64n includes a functional tab 65a that has been disabled. The disability of the functional tab 65a may be indicated by making the functional tab 65a opaque or faded.

Figure 6T:
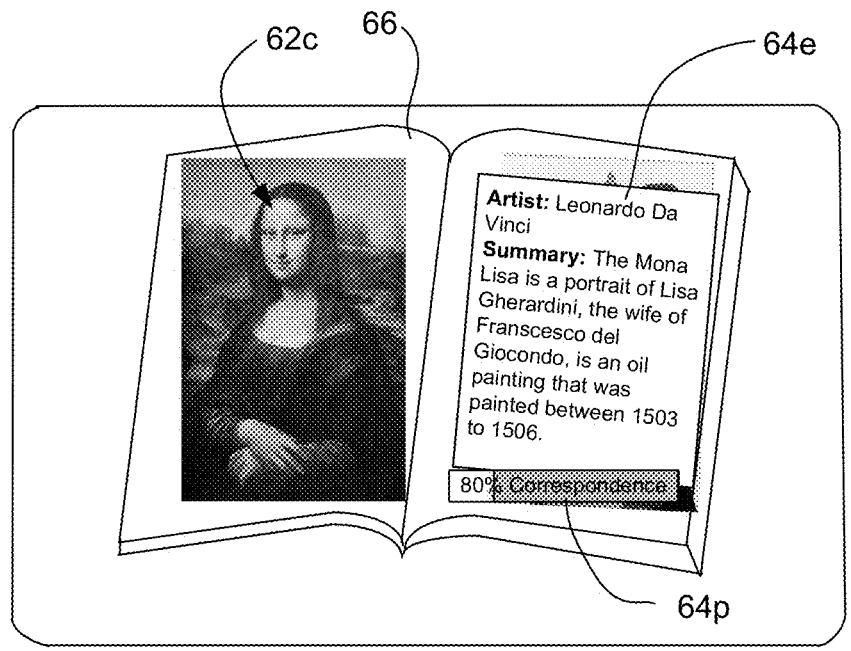

Turning now to FIG. 6T, which illustrates another exemplary augmented view 60t that may be visually presented by AR device 50*. Included in the augmented view 60t is augmentation 64p that indicate the degree of correspondence between the augmentation 64e presented by the AR device 50* and the corresponding augmentation (e.g., augmentation 64a of FIG. 6B) presented by the remote AR device 70. The degree of correspondence may be determined by the AR device 50* based, at least in part, on the augmentation data 55 provided by the AR device 70 and the actual augmentation 64e that was displayed by the AR device 50*.

Figure 6U:
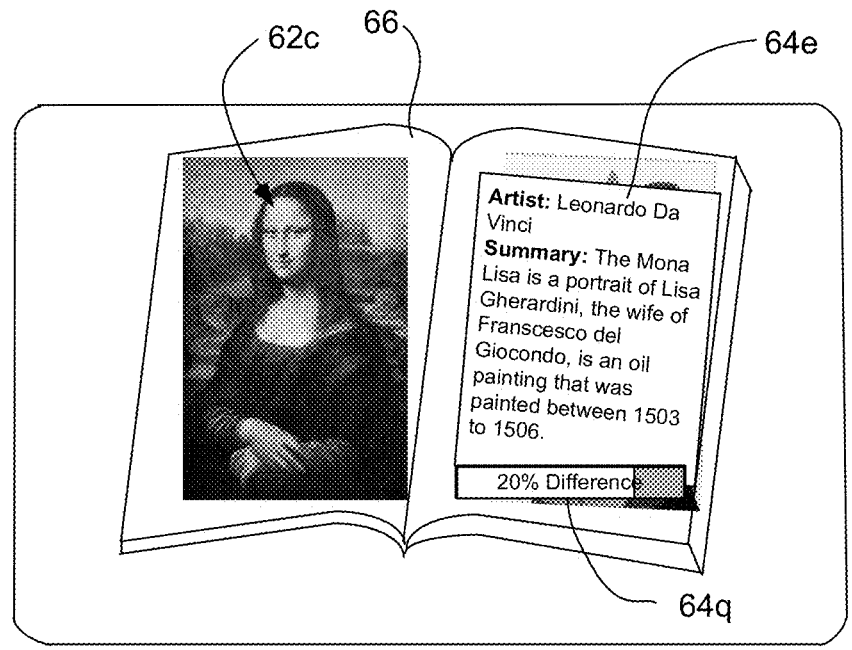

Referring now to FIG. 6U, which illustrates yet another exemplary augmented view 60u that may be visually presented by AR device 50*. Included in the augmented view 60u is augmentation 64q that indicate the degree of difference between the augmentation 64e presented by the AR device 50* and the corresponding augmentation (e.g., augmentation 64a of FIG. 6B) presented by the remote AR device 70. The degree of difference may be determined by the AR device 50* based, at least in part, on the augmentation data 55 provided by the AR device 70 and the actual augmentation 64e that was displayed by the AR device 50*. The various exemplary actual and augmented views illustrated in FIGS. 6A, 6B, 6C, 6D, 6E, 6F, 6G, 6H, 6J, 6K, 6M, 6N, 6P, 6Q, 6R, 6S, 6T, and 6U as well as the example environments illustrated in FIGS. 5A and 5B will be discussed in greater detail herein with respect to the processes and operations to be described below.

Referring now to FIGS. 7A and 7B, FIGS. 7A and 7B are two block diagrams representing two different implementations of an augmented reality (AR) device 50* that can execute the operations and processes to be described herein. In particular, and as will be further described herein, FIG. 7A illustrates an AR device 50' that is the "hardwired" or "hard" implementation of an AR device 50* that can implement the operations and processes to be described herein. The AR device 50' includes certain logic modules including an augmentation data acquiring module 102', an augmentation presenting module 104', a non-augmented view presenting module 105', and a usage data relaying module 106' that are implemented using purely hardware or circuitry components (e.g., application specific integrated circuit (or ASIC). In contrast, FIG. 7B illustrates an AR device 50" that is the "soft" implementation of the AR device 50 of FIG. 7A in which certain logic modules including an augmentation data acquiring module 102", an augmentation presenting module 104", a non-augmented view presenting module 105", and a usage data relaying module 106" are implemented using electronic circuitry (e.g., one or more processors including one or more microprocessors, controllers, etc.) executing one or more programming instructions (e.g., software).

The embodiments of the AR device 50* illustrated in FIGS. 7A and 7B are two extreme implementations of the AR device 50* in which all of the logic modules (e.g., the augmentation data acquiring module 102', the augmentation presenting module 104', the non-augmented view presenting module 105', and the usage data relaying module 106') are implemented using purely hardware solutions (e.g., circuitry such as ASIC) as illustrated in FIG. 7A or in which all of the logic modules (e.g., the augmentation data acquiring module 102", the augmentation presenting module 104", the non-augmented view presenting module 105", and the usage data relaying module 106") are implemented using software solutions (e.g., programmable instructions being executed by hardware such as one or more processors) as illustrated in FIG. 7B. Since, there are many ways of combining hardware, software, and/or firmware in order to implement the various logic modules (e.g., the augmentation data acquiring module 102*, the augmentation presenting module 104*, the non-augmented view presenting module 105*, and the usage data relaying module 106*), only the two extreme implementations (e.g., the purely hardware solution as illustrated in FIG. 7A and the software solution of FIG. 7B) are illustrated here. It should be noted here that with respect to the "soft" implementation illustrated in FIG. 7B, hardware in the form of circuitry such as one or more processors 116 are still needed in order to execute the software. Further details related to the two implementations of AR device 50* illustrated in FIGS. 7A and 7B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 7A, which illustrates a block diagram of an AR device 50' that includes an augmentation data acquiring module 102', an augmentation presenting module 104', a non-augmented view presenting module 105' (e.g., for displaying or presenting an non-augmented or unmodified views of scenes from the real environment), usage data relaying module 106', one or more processors 116 (e.g., one or more microprocessors), a memory 114 that may store one or more applications 160 (e.g., an operating system (OS) 162, one or more facial recognition applications 163, one or more visual object recognition applications 164 (e.g., for visually recognizing one or more items that are visible in a scene from the real physical environment), one or more voice recognition applications 165, one or more sound recognition applications 166 (e.g., an application for recognizing/identifying sounds other than voice such as the sound of a train passing or waves crashing along a shoreline), one or more social networking applications 167 such as Twitter or Facebook, one or more personal information manager (PIM) applications 168 such as Microsoft Outlook, and so forth), one or more augmentations 170, and/or one or more visibility rules 171, a user interface 110 (e.g., a display, a mouse, a microphone, etc.), a network interface 112 (e.g., a network interface card or "NIC"), and/or one or more sensors 120. Although not depicted, the memory 114 may also include communication applications such as an email application and/or an instant messaging (IM) application.

In various embodiments, the augmentation data acquiring module 102' of FIG. 7A is a logic module that may be designed to, among other things, acquire augmentation data associated with one or more first augmentations that was remotely displayed at a remote augmented reality (AR) device, the one or more augmentations having been displayed in a first augmented view of a first actual scene. In contrast, the augmentation presenting module 104' of FIG. 7A is a logic module that may be configured to present locally (e.g., present visually or by electronic transmission) one or more second augmentations in response, at least in part, to the received augmentation data. Finally, the usage relaying module 106' of FIG. 7A may be designed to relay back to the remote AR device usage data that indicates usage information related at least to usage or non-usage of the received augmentation data.

Turning now to FIG. 7B, which illustrates a block diagram of another AR device 50" that can implement the operations and processes to be described herein. As indicated earlier, the AR device 50" in FIG. 7B is merely the "soft" version of the AR device 50' of FIG. 7A because the various logic modules (e.g., the augmentation data acquiring module 102", the augmentation presenting module 104", the non-augmented view presenting module 105", and the usage data relaying module 106" are implemented using software and one or more processors 116 (e.g., one or more microprocessors or controllers) executing the software (e.g., computer readable instructions 152) rather than being implemented using purely hardware (e.g., ASIC) as was the case in the AR device 50' of FIG. 7A. Thus, the augmentation data acquiring module 102", the augmentation presenting module 104", the non-augmented view presenting module 105", and the usage data relaying module 106" of FIG. 7B may be designed to execute the same functions as the augmentation data acquiring module 102', the augmentation presenting module 104', the non-augmented view presenting module 105', and the usage data relaying module 106' of FIG. 7A. The AR device 50", as illustrated in FIG. 7B, has other components (e.g., user interface 110, network interface 112, and so forth) that are the same or similar to the other components included in the AR device 50' of FIG. 7A. Note that in the embodiment of the AR device 50* illustrated in FIG. 7B, the augmentation data acquiring module 102", the augmentation presenting module 104", the non-augmented view presenting module 105", and the usage data relaying module 106" may be implemented by the one or more processors 116 (or other types of circuitry such as field programmable gate arrays or FPGAs) executing one or more computer readable instructions 152 stored in memory 114.

In various embodiments, the memory 114 of the AR device 50' of FIG. 7A and the AR device 50" of FIG. 7B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 8A:
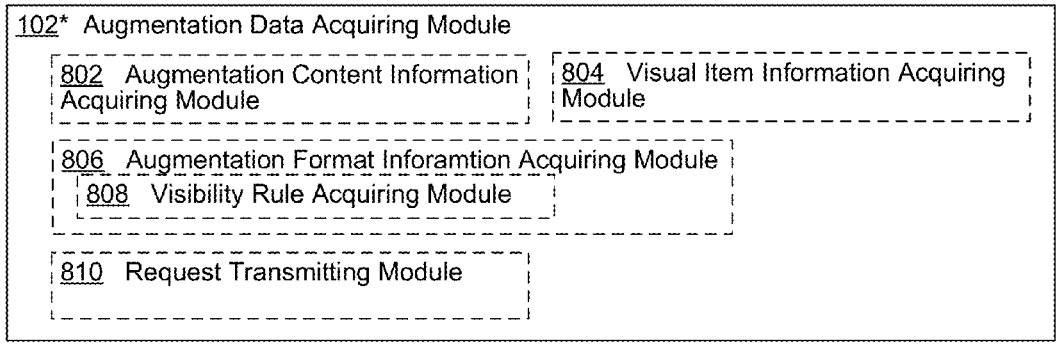
FIG. 8A shows another perspective of the augmentation data acquiring module 102* of FIGS. 7A and 7B (e.g., the augmentation data acquiring module 102' of FIG. 7A or the augmentation data acquiring module 102" of FIG. 7B) in accordance with various implementations.

Turning now to FIG. 8A illustrating a particular implementation of the augmentation data acquiring module 102* (e.g., the augmentation data acquiring module 102' or the augmentation data acquiring module 102") of FIGS. 7A and 7B. As illustrated, the augmentation data acquiring module 102* may include one or more sub-logic modules in various alternative implementations. For example, in various embodiments, the augmentation data acquiring module 102* may include an augmentation content information acquiring module 802, a visual item information acquiring module 804, an augmentation format information acquiring module 806 (which may further include a visibility rule acquiring module 808), and/or a request transmitting module 810. Specific details related to the augmentation data acquiring module 102* as well as the above-described sub-modules of the augmentation data acquiring module 102* will be provided below with respect to the operations and processes to be described herein.

Figure 8B:
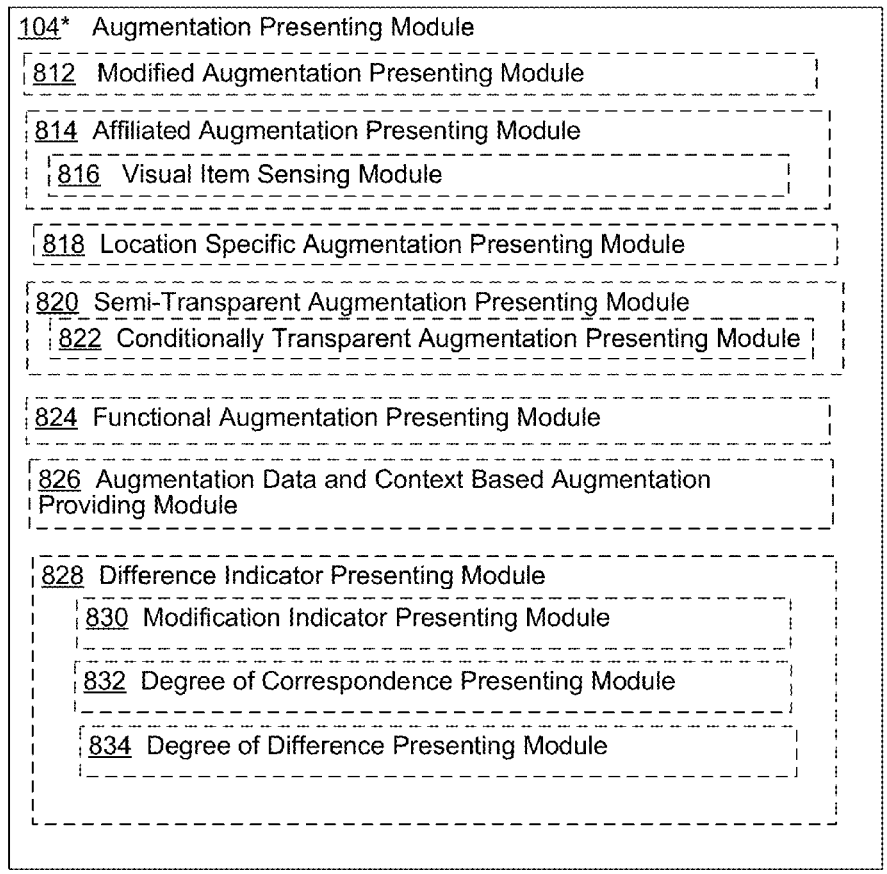
FIG. 8B shows the augmentation presenting module 104* of FIGS. 7A and 7B (e.g., the augmentation presenting module 104' of FIG. 7A or the augmentation presenting module 104" of FIG. 7B) in accordance with various implementations.

FIG. 8B illustrates a particular implementation of the augmentation presenting module 104* (e.g., the augmentation presenting module 104' or the augmentation presenting module 104") of FIG. 7A or 7B. As illustrated, the augmentation presenting module 104* may include one or more sub-logic modules in various alternative embodiments. For example, in various embodiments, the augmentation presenting module 104* may include a modified augmentation presenting module 812, an affiliated augmentation presenting module 814 (which may further include a visual item sensing module 816), a location specific augmentation presenting module 818, a semi-transparent augmentation presenting module 820 (which may further include a conditionally transparent augmentation presenting module 822), a functional augmentation presenting module 824, an augmentation data and context based augmentation providing module 826, and/or a difference indicator presenting module 828 (which may further include a modification indicator presenting module 830, a degree of correspondence presenting module 832, and/or a degree of difference presenting module 834). Specific details related to the augmentation presenting module 104* as well as the above-described sub-modules of the augmentation presenting module 104* will be provided below with respect to the operations and processes to be described herein.

Referring now to FIG. 8C illustrating a particular implementation of the usage data relaying module 106* (e.g., the usage data relaying module 106' or the usage data relaying module 106") of FIG. 7A or 7B. As illustrated, the usage data relaying module 106* may include one or more sub-logic modules in various alternative embodiments. For example, in various embodiments, the usage data relaying module 106* may include a network relaying module 836, an augmentation relaying module 838, and/or a difference indicating data relaying module 840 (which may further include a modification indicating data relaying module 842, a degree of correspondence indicating data relaying module 844, a degree of difference indicating data relaying module 846, and/or an augmentation change indicating data relaying module 848). Specific details related to the usage data relaying module 106* as well as the above-described sub-modules of the usage data relaying module 106* will be provided below with respect to the operations and processes to be described herein.

FIG. 8D illustrates the various types of user interface devices that may be part of the user interface 110 of the AR device 50* of FIG. 7A or 7B. In various embodiments, the user interface 110 may include one or more display monitors 852 (e.g., a touchscreen, a liquid crystal display (LCD) monitor, a see-through display, and/or other types of displays or display monitors), one or more visual capturing devices 854 (e.g., one or more video or web cameras, digital cameras, and/or other types of cameras), one or more audio speakers 856, one or more audio input devices 858 (e.g., one or more microphones), and/or one or more keyboard/keypads 860. Although not depicted, other types of user interfaces may be included with the user interface 110 in various alternative embodiments including, for example, a mouse or other types of user input/output devices.

Figure 8E:
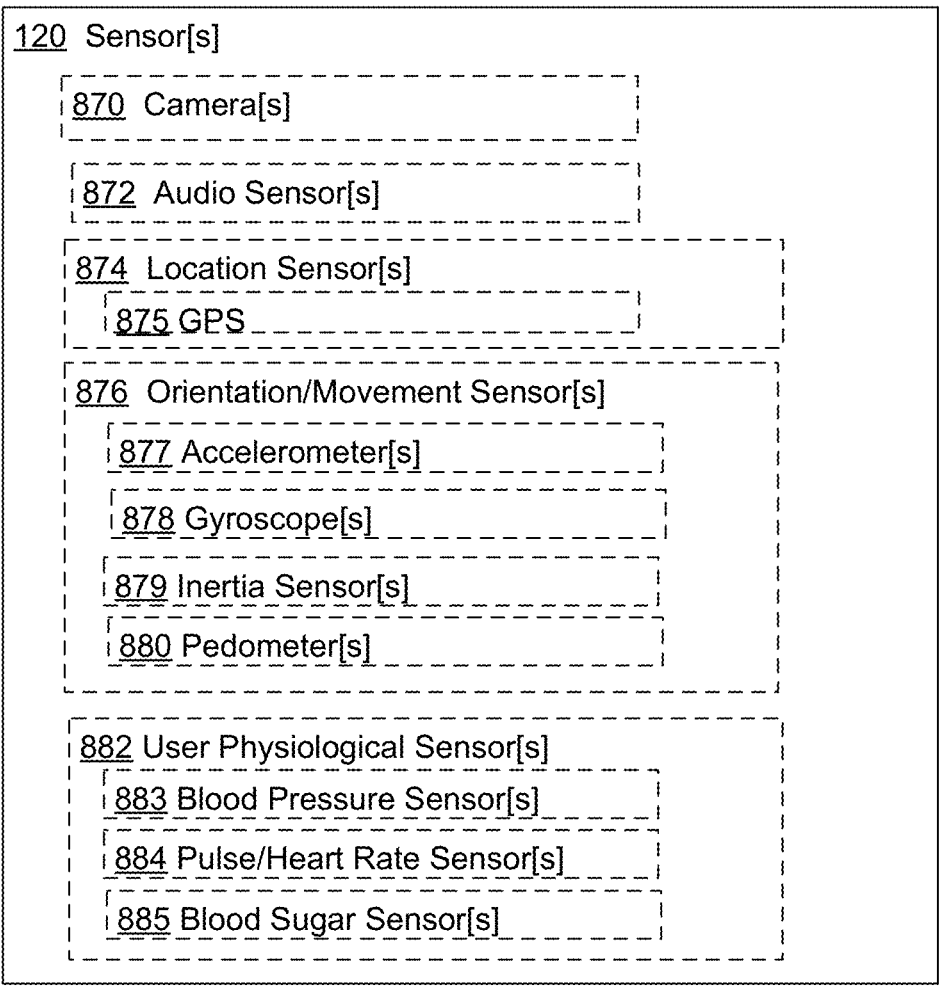
FIG. 8E shows another perspective of the one or more sensors 120 of FIGS. 7A and 7B.

FIG. 8E illustrates at least some of the various types of sensors 120 that may be included with the AR device 50* (e.g. the AR device 50' of FIG. 7A or the AR device 50" of FIG. 7B). As illustrated, the one or more sensors 120 that may be included with the AR device 50* may include one or more cameras 870 (note that the one or more cameras 870 may be the same as the one or more visual capturing devices 854 described above with respect to the user interface 110), one or more audio sensors 872 (see also audio input device[s] 858 described above), one or more location sensors 874 such as one or more global positioning systems (GPSs) 875, one or more orientation/movement sensors 876 (which may comprise one or more accelerometers 877, one or more gyroscopes 878, one or more inertia sensors 879, one or more pedometers 880), and/or one or more user physiological sensors 882 (e.g., one or more blood pressure sensors 883, one or more pulse/heart rate sensors 884, one or more blood sugar sensors 885). Note that with respect to the one or more location sensors 874, the one or more orientation/movement sensors 876, and/or one or more user physiological sensors 882, these sensor devices may include other types of sensors not depicted in FIG. 8C. For example the one or more location sensors 874 in some alternative implementations may include a location sensor that employs triangulation techniques and signals from cellular towers to determine location while the one or more user physiological sensors 882 may include in some alternative embodiments one or more galvanic skin sensors and/or other types of sensors.

Figure 9:
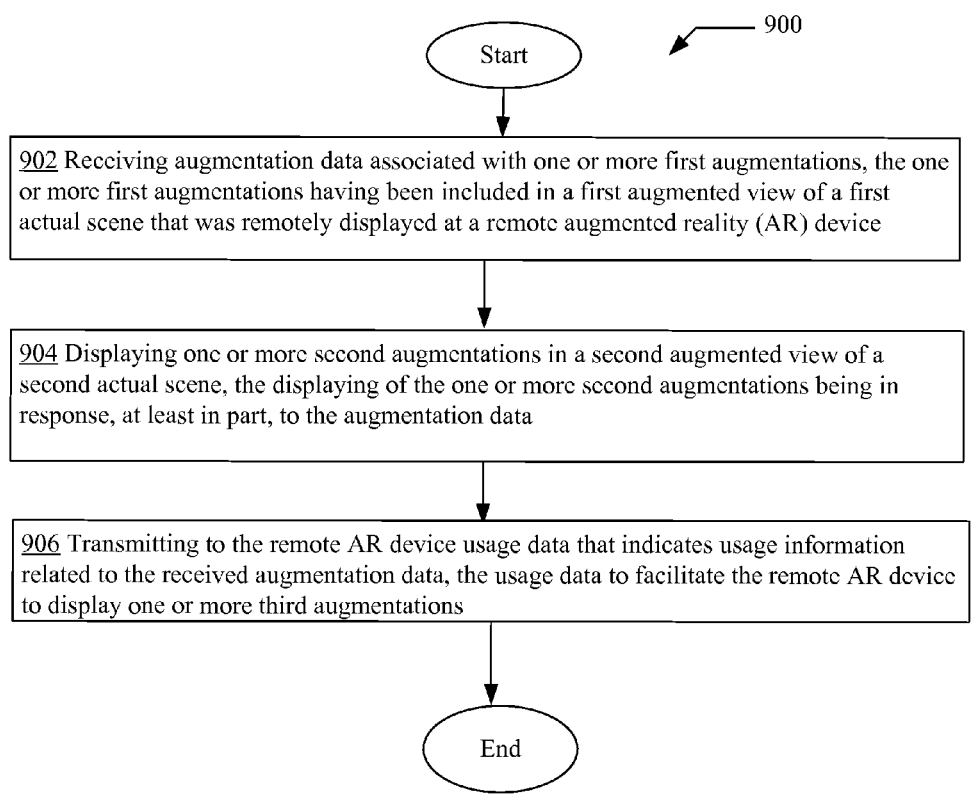
FIG. 9 is a high-level logic flowchart of a process, e.g., operational flow 900, according to some embodiments.

A more detailed discussion related to the AR device 50* (e.g., the AR device 50' of FIG. 7A or the AR device 50" of FIG. 7B) discussed above will now be provided with respect to the example processes and operations to be described herein. FIG. 9 illustrates an operational flow 900 representing example operations for sharing of data related to one or more augmentations that may be presented by, for example, at least one of two augmented reality (AR) devices that are sharing such data. The example processes may involve acquiring by a first AR device 50* augmentation data 55 related to one or more first augmentations (e.g., augmentation 64a of FIG. 6B) that were presented remotely by a second AR device 70, presenting by the first AR device 50* one or more second augmentations (e.g., augmentation 64e of FIG. 6H) in response, at least in part, to the acquired augmentation data 55; and relaying by the first AR device 50* to the second AR device 70 usage data 56 that relates at least to the usage or non-usage of the augmentation data 56 by the first AR device 50*.

In FIG. 9 and in the following figures that include various examples of operational flows, discussions and explanations will be provided with respect to the AR device 50* described above and as illustrated in FIGS. 1A, 1B, 2A, 2B, 3A, 3B, 4A, 4B, 7A, 7B, 8A, 8B, 8C, 8D, and 8E, and/or with respect to other examples (e.g., the example scenarios and example actual and augmented views as illustrated in FIGS. 5A, 5B, 6A, 6B, 6C, 6D, 6E, 6F, 6G, 6H, 6J, 6K, 6M, 6N, 6P, 6Q, 6R, 6S, 6T, and 6U) and contexts. However, it should be understood that the operational flows may be executed in a number of other environments and contexts, and/or in modified versions of FIGS. 1A, 1B, 2A, 2B, 3A, 3B, 4A, 4B, 5A, 5B, 6A, 6B, 6C, 6D, 6E, 6F, 6G, 6H, 6J, 6K, 6M, 6N, 6P, 6Q, 6R, 6S, 6T, 6U, 7A, 7B, 8A, 8B, 8C, 8D, and 8E. Also, although the various operational flows are presented in the sequence(s) illustrated, it should be understood that the various operations may be performed in other orders other than those which are illustrated, or may be performed concurrently.

Further, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 9 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

More particularly, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated FIG. 9 as well as the other operations to be described herein may be performed by at least one of a machine, an article of manufacture, or a composition of matter. In various embodiments, the operational flow 900 of FIG. 9 to be described below may be implemented by the AR device 50* of FIG. 5A or 5B (e.g., the AR device 50' of FIG. 7A or the AR device 50" of FIG. 7B).

In any event, after a start operation, the operational flow 900 of FIG. 9 may move to an augmentation data receiving operation 902 for receiving augmentation data associated with one or more first augmentations, the one or more first augmentations having been included in a first augmented view of a first actual scene that was remotely displayed at a remote augmented reality (AR) device. For instance, and as illustration, the augmentation data acquiring module 102* of the AR device 50* of FIG. 7A or 7B (e.g., the augmentation data acquiring module 102' of FIG. 7A or the augmentation data acquiring module 102" of FIG. 7B) receiving augmentation data 55 (e.g., see FIG. 5A or 5B) associated with one or more first augmentations (e.g., augmentation 64a of FIG. 6B as presented by, for example, AR device 70 of FIG. 5A or 5B), the one or more first augmentations 64a having been included in a first augmented view (e.g., augmented view 60b of FIG. 6B) of a first actual scene (e.g., actual view 60a of FIG. 6A) that was remotely displayed at a remote augmented reality (AR) device 70 (see FIG. 5A or 5B). Note that in various embodiments the phrase "remote" or "remotely" are used here to indicate, for example, that the display of the first augmented view 60b separately at a "second" AR device 70 rather than at the first AR device 50* where the augmentation data receiving operation 902 is to be executed. Further, the use of the phrase "remote" or "remotely" herein does not require or suggest that first AR device 50* and the second AR device 70 be at least some minimum distance away from each other. In fact, in some implementations, the first AR device 50* and the second AR device 70 may be adjacent to each other or may be spatially very close to each other (see, for example, the above discussion related to FIG. 5B). Also, note again that "*" is used herein as a wildcard. Thus, references to the AR device 50* may be in reference to the AR device 50' of FIG. 7A or to the AR device 50" of FIG. 7B.

As further illustrated in FIG. 9, operational flow 900 may also include an augmentation displaying operation 904 for displaying one or more second augmentations in a second augmented view of a second actual scene, the displaying of the one or more second augmentations being in response, at least in part, to the augmentation data. For instance, the augmentation presenting module 104* (e.g., the augmentation presenting module 104' of FIG. 7A or the augmentation presenting module 104" of FIG. 7B) of the AR device 50* displaying (e.g., visually presenting or showing locally through one or more display monitors 852—see FIG. 8D) one or more second augmentations (e.g., augmentation 64e of FIG. 6H) in a second augmented view (e.g., augmented view 60h of FIG. 6H) of a second actual scene (e.g., actual view 60g of FIG. 6G), the displaying of the one or more second augmentations 64e (see FIG. 6H) being in response (e.g., being prompted), at least in part, to the augmentation data 55 (see FIG. 5A).

In addition to the augmentation receiving operation 902 and the augmentation displaying operation 904, operational flow 900 may also include an usage data transmitting operation 906 for transmitting to the remote AR device usage data that indicates usage information related at least to usage or non-usage of the received augmentation data, the usage data to facilitate the remote AR device to display one or more third augmentationError! Reference source not found. For instance, the usage data relaying module 106* (e.g., the usage data relaying module 106' of FIG. 7A or the usage data relaying module 10james6" of FIG. 7B) of the AR device 50* transmitting (e.g., wirelessly relaying or relaying via one or more wireless and/or wired networks) to the remote AR device 70 (see FIGS. 5A or 5B) usage data 56 that indicates usage information related at least to usage or non-usage of the received augmentation data 55, the usage data 56 to facilitate the remote AR device 70 to display one or more third augmentations (which in some cases may directly or indirectly indicate the successful reception by the AR device 508 of the augmentation data). In doing so, augmented views that may be presented by, for example, two different AR devices (e.g., the AR device 50* and the AR device 70 of FIG. 5A or FIG. 5B) may be advantageously coordinated.

Figure 10A:
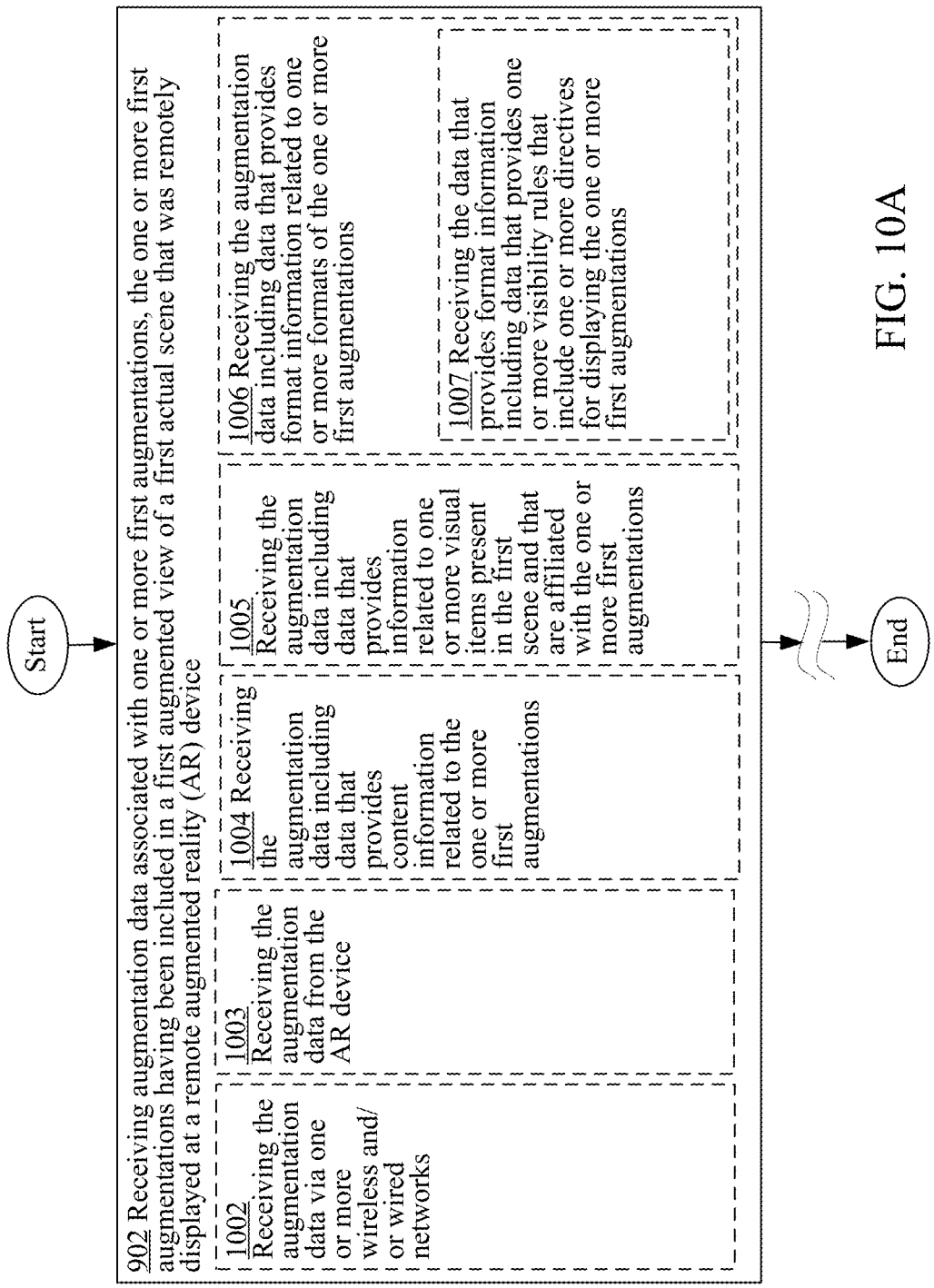
FIG. 10A is a high-level logic flowchart of a process depicting alternate implementations of the augmentation data receiving operation 902 of FIG. 9.

As will be described below, the augmentation data receiving operation 902, the augmentation displaying operation 904, and the usage data transmitting operation 906 of FIG. 9 may be executed in a variety of different ways in various alternative implementations. FIGS. 10A, 10B, 10C, and 10D, for example, illustrate at least some of the alternative ways that the augmentation data receiving operation 902 of FIG. 9 may be executed in various alternative implementations. For example, the augmentation data receiving operation 902 in some implementations may include an operation 1002 for receiving the augmentation data via one or more wireless and/or wired networks as illustrated in FIG. 10A. For instance, the augmentation data acquiring module 102* of the AR device 50* of FIG. 7A or 7B (as well as FIG. 5A) receiving the augmentation data 55 (see FIG. 5A or 5B) via one or more wireless and/or wired networks 58 (e.g., WLAN, WAN, WiMAX, PTSN, cellular data network, PAN, and/or other types of communication networks).

As further illustrated in FIG. 10A, the augmentation data receiving operation 902 may additionally or alternatively include one or more operations including an operation 1003 for receiving the augmentation data from the AR device. For instance, the augmentation data acquiring module 102* of the AR device 50* of FIG. 7A or 7B (or FIG. 5A or 5B) receiving the augmentation data 55 from the AR device 70 (see FIG. 5A or 5B).

In the same or alternative implementations, the augmentation data receiving operation 902 may additionally or alternatively include an operation 1004 for receiving the augmentation data including data that provides content information related to the one or more first augmentations. For instance, the augmentation data acquiring module 102* including the augmentation content information acquiring module 802 (see FIG. 8A) of the AR device 50* of FIG. 7A or 7B (as well as FIG. 5A or 5B) receiving the augmentation data 55 (see FIG. 5A or 5B) when the augmentation content information acquiring module 802 receives augmentation data 55 (see FIG. 5A or 5B) that provides content information (e.g., textual information related to the Mona Lisa included in the augmentation 64*a* of FIG. 6B) related to the one or more first augmentations (see, for example augmentation 64*a* of FIG. 6B).

In the same or alternative implementations, the augmentation data receiving operation 902 may additionally or alternatively include an operation 1005 for receiving the augmentation data including data that provides information related to one or more visual items present in the first scene and that are affiliated with the one or more first augmentations. For instance, the augmentation data acquiring module 102* including the visual item information acquiring module 804 (see FIG. 8A) of the AR device 50* of FIG. 7A or 7B (as well as FIG. 5A or 5B) receiving the augmentation data 55 when the visual item information acquiring module 804 receives (and in some cases process or interpret) data that provides information (e.g., background information) related to one or more visual items (e.g., visual item 62*a* of FIG. 6A) present in the first scene (e.g., actual scene 61*a* of FIG. 6A) and that are affiliated with the one or more first augmentations (e.g., augmentation 64 of FIG. 6B).

In the same or alternative implementations, the augmentation data receiving operation 902 may additionally or alternatively include an operation 1006 for receiving the augmentation data including data that provides format information related to one or more formats of the one or more first augmentations. For instance, the augmentation data acquiring module 102* including the augmentation format information acquiring module 806 (see FIG. 8A) of the AR device 50* of FIG. 7A or 7B (as well as FIG. 5A or 5B) receiving the augmentation data 55 when the augmentation format information acquiring module 806 receives (and in some cases process or interpret) data that provides format information related to one or more formats of the one or more first augmentations (e.g., augmentation 64*a* of FIG. 6B).

As further illustrated in FIG. 10A, operation 1006 in some cases may further include an operation 1007 for receiving the data that provides format information including data that provides one or more visibility rules that include one or more directives for displaying the one or more first augmentations. For instance, the augmentation format information acquiring module 806 including the visibility rule acquiring module 808 (see FIG. 8A) of the AR device 50* of FIG. 7A or 7B (as well as FIG. 5A or 5B) receiving (e.g., obtaining or acquiring wirelessly) the data that provides format information including data, as received by the visibility rule acquiring module 808, that provides one or more visibility rules that include one or more directives (e.g., instructions or commands) for displaying the one or more first augmentations (e.g., the augmentation 64*a* of FIG. 6B).

Note that in various embodiments the one or more visibility rules that may be received by the AR device 50* may be the one or more visibility rules that were the basis for generating the one or more first augmentations (augmentation 64*a* of FIG. 6B) that was generated and presented by the remote AR device (e.g., the AR device 70 of FIG. 5A or 5B). Thus, the following discussions related to the received one or more visibility rules, as received by, for example, the AR device 50* of FIG. 7A or 7B (as well as FIG. 5A or 5B) will primarily be referencing the actual and augmented views illustrated in FIGS. 6A, 6B, 6C, 6D, 6E, and 6F, which as described earlier are exemplary actual and the augmented views provided by the "remote" AR device 70 of FIGS. 5A and 5B Note that the AR device 70 of FIGS. 5A and 5B, for purposes of the following discussions, may be referred to as being a "remote" device simply because it is a separate and distinct device from the AR device 50*. Thus, the word "remote" as used herein does not imply or suggest that, for example, the AR device 70 is some distance away from the other AR device 50*. That is, and as somewhat illustrated in FIG. 5B, the AR device 50* and the "remote" AR device 70 may be spatially very close to each other or may be far away from each other.

Figure 10B:
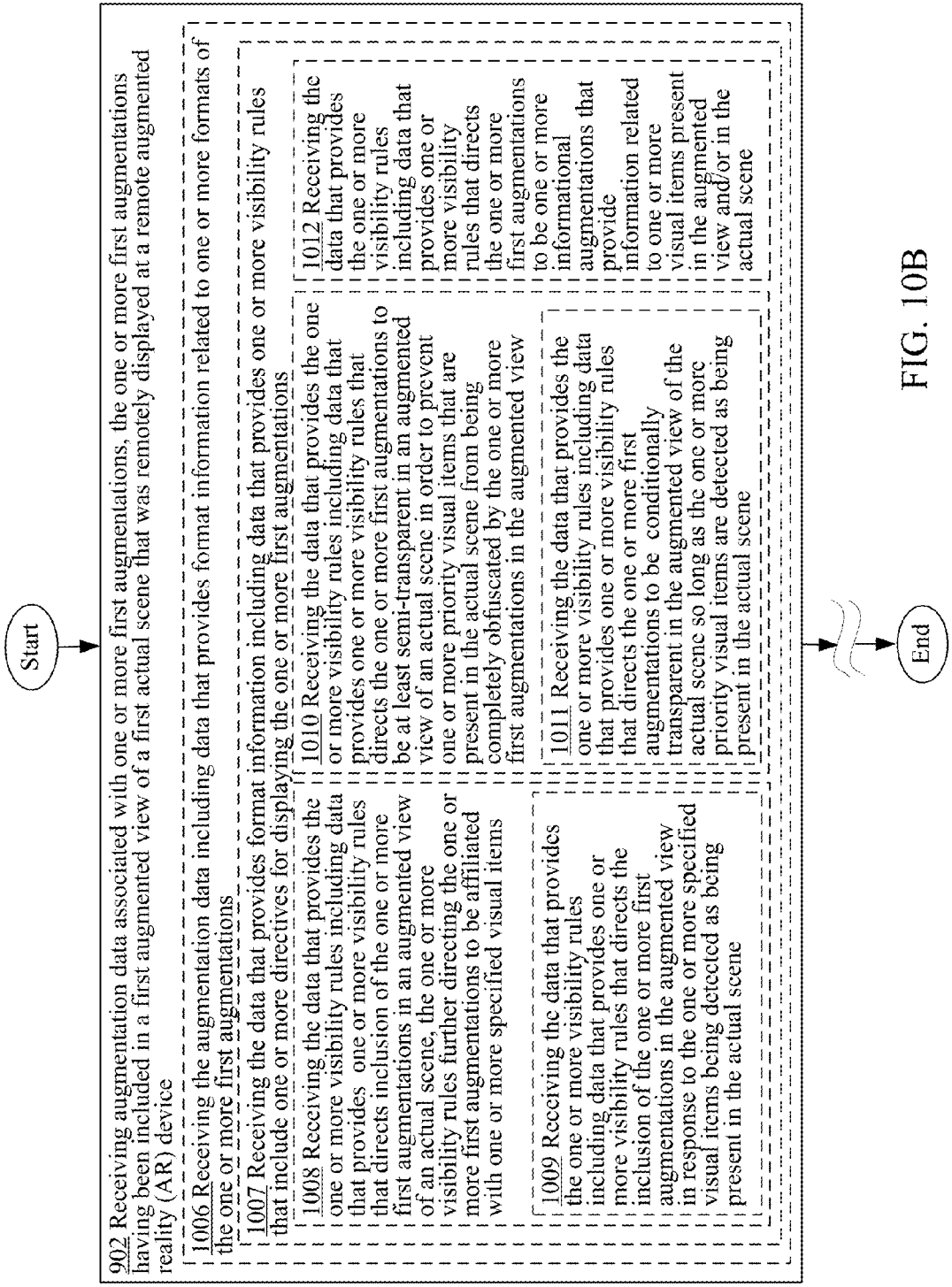
FIG. 10B is a high-level logic flowchart of a process depicting alternate implementations of the augmentation data receiving operation 902 of FIG. 9.

Turing now to FIG. 10B, operation 1007 may include one or more additional operations in various alternative implementations including in some cases an operation 1008 for receiving the data that provides the one or more visibility rules including data that provides one or more visibility rules that directs inclusion of the one or more first augmentations in an augmented view of an actual scene, the one or more visibility rules further directing the one or more first augmentations to be affiliated with one or more specified visual items. For instance, the visibility rule acquiring module 808 (see FIG. 8A) of the AR device 50* of FIG. 7A or 7B (as well as FIG. 5A or 5B) receiving the data (e.g., augmentation data 55 of FIG. 5A or 5B) that provides the one or more visibility rules including data that provides one or more visibility rules that directs inclusion of the one or more first augmentations (e.g., augmentation 64*a* of FIG. 6B) in an augmented view 60*b* (see FIG. 6B) of an actual scene (e.g., actual view 60*a* of FIG. 6A), the one or more visibility rules further directing (e.g., instructing) the one or more first augmentations 64*a* to be affiliated with one or more specified visual items (e.g., the visual item 62*a* of FIGS. 6A and 6B or the visual item 62*c* of FIGS. 6G and 6H, which is visually essentially the same as visual item 62*a*).

In some implementations, operation 1008 may further include an operation 1009 for receiving the data that provides the one or more visibility rules including data that provides one or more visibility rules that directs the inclusion of the one or more first augmentations in the augmented view in response to the one or more specified visual items being detected as being present in the actual scene. For instance, the visibility rule acquiring module 808 (see FIG. 8A) of the AR device 50* of FIG. 7A or 7B (as well as FIG. 5A or 5B) receiving the data (e.g., augmentation data 55) that provides the one or more visibility rules including data that provides one or more visibility rules that directs (e.g., instructs) the inclusion of the one or more first augmentations (e.g., augmentation 64*a* of FIG. 6B) in the augmented view (e.g., augmented view 60*b* of FIG. 6B) in response to the one or more specified visual items (e.g., visual item 62*a* of FIG. 6A) being detected as being present in the actual scene (e.g., actual view 60*a* of FIG. 6A).

In the same or alternative implementations, operation 1007 may alternatively or additionally include an operation 1010 for receiving the data that provides the one or more visibility rules including data that provides one or more visibility rules that directs the one or more first augmentations to be at least semi-transparent in an augmented view of an actual scene in order to prevent one or more priority visual items that are present in the actual scene from being completely obfuscated by the one or more first augmentations in the augmented view. For instance, the visibility rule acquiring module 808 (see FIG. 8A) of the AR device 50* of FIG. 7A or 7B (as well as FIG. 5A or 5B) receiving the data (e.g., augmentation data 55 of FIG. 5A or 5B) that provides the one or more visibility rules including data that provides one or more visibility rules that directs the one or more first augmentations (e.g., the augmentation 64*b* of FIG. 6D) to be at least semi-transparent in an augmented view 60*d* (see FIG. 6D) of an actual scene (e.g., actual view 60*c* of FIG. 6C) in order to prevent one or more priority visual items (e.g., visual item 62*b* of FIGS. 6C and 6D) that are present in the actual scene (e.g., actual view 60*c* of FIG. 6C) from being completely obfuscated by the one or more first augmentations 64b in the augmented view 60d (see FIG. 6D). Note that in various embodiments, a "priority visual item," as discussed above, may be in reference to a visual item (e.g., visual item 62b in FIG. 6C) that may have been identified or designated by, for example, one or more visibility rules as having priority, at least visually, over augmentations that may be included in an augmented view of an actual scene. That is, when a priority visual item, such as visual item 62b in FIG. 6C, is detected as being present in an actual scene (e.g., actual view 60c of FIG. 6C) then any augmentations that may be included into an augmented view 60d (see FIG. 6D) of the actual scene (e.g., actual view 60c) may not be allowed to at least entirely obstruct or hide the view of the priority visual item (e.g., visual item 62b of FIG. 6D).

As further illustrated in FIG. 10B, operation 1010 may, in some cases, further include an operation 1011 for receiving the data that provides the one or more visibility rules including data that provides one or more visibility rules that directs the one or more first augmentations to be conditionally transparent in the augmented view of the actual scene so long as the one or more priority visual items are detected as being present in the actual scene. For instance, the visibility rule acquiring module 808 (see FIG. 8A) of the AR device 50* of FIG. 7A or 7B (as well as FIG. 5A or 5B) receiving the data that provides the one or more visibility rules including data (e.g., augmentation data 55 of FIG. 5A or 5B) that provides one or more visibility rules that directs the one or more first augmentations (e.g., augmentation 64a of FIG. 6A) to be conditionally transparent (e.g., completely invisible) in the augmented view (e.g., augmented view 60e of FIG. 6E in which the augmentation 64a of FIG. 6A is replaced with a functional augmentation 64c) of the actual scene (e.g., actual view 60c of FIG. 6C) so long as the one or more priority visual items (e.g., visual item 62b of FIG. 6C) are detected as being present in the actual scene (e.g., actual view 60c of FIG. 6C).

In the same or different implementations, operation 1007 may additionally or alternatively include an operation 1012 for receiving the data that provides the one or more visibility rules including data that provides one or more visibility rules that directs the one or more first augmentations to be one or more informational augmentations that provide information related to one or more visual items present in the augmented view and/or in the actual scene. For instance, the visibility rule acquiring module 808 (see FIG. 8A) of the AR device 50* of FIG. 7A or 7B (as well as FIG. 5A or 5B) receiving the data (e.g., augmentation data 55 of FIG. 5A or 5B) that provides the one or more visibility rules including data that provides one or more visibility rules that directs the one or more first augmentations (e.g., augmentation 64a, 64b, and 64d of FIGS. 6B, 6D, and 6F) to be one or more informational augmentations (e.g., augmentation that provide content information in textual form) that provide information related to one or more visual items (e.g., visual item 62a of FIGS. 6A to 6F) present in the augmented view (e.g., augmented views 60b, 60d, and 60f of FIGS. 6B, 6D, and 6F) and/or in the actual scene (e.g., actual view 60a of FIG. 6A).

Figure 10C:
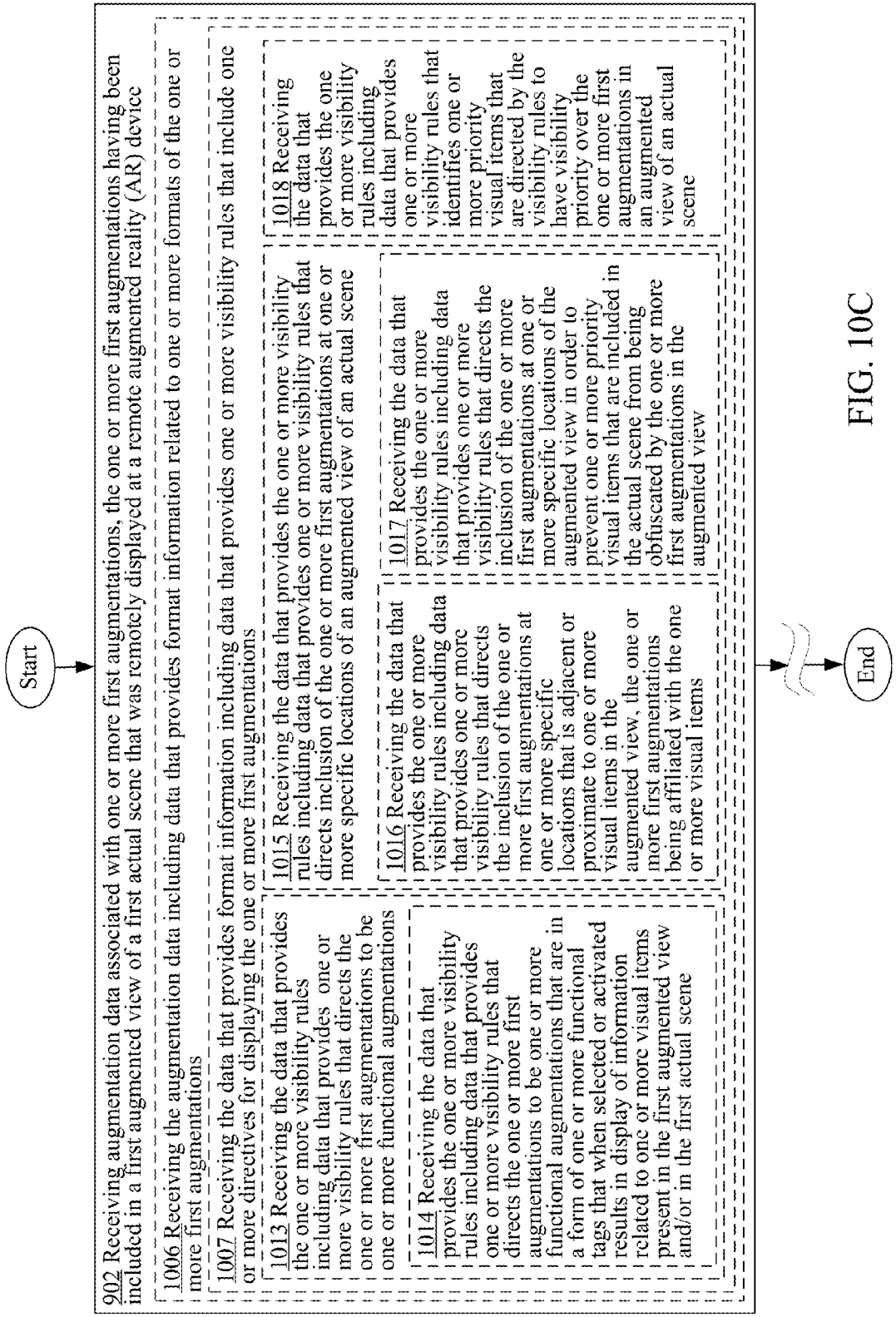
FIG. 10C is a high-level logic flowchart of a process depicting alternate implementations of the augmentation data receiving operation 902 of FIG. 9.

In the same or alternative implementations, operation 1007 may additionally or alternatively include an operation 1013 for receiving the data that provides the one or more visibility rules including data that provides one or more visibility rules that directs the one or more first augmentations to be one or more functional augmentations as illustrated in FIG. 10C. For instance, the visibility rule acquiring module 808 (see FIG. 8A) of the AR device 50* of FIG. 7A or 7B (as well as FIG. 5A or 5B) receiving the data (e.g., the augmentation data 55 of FIG. 5A or 5B) that provides the one or more visibility rules including data that provides one or more visibility rules that directs the one or more first augmentations (e.g., augmentation 64c of FIG. 6E) to be one or more functional augmentations (e.g., an augmentation that is interactive and that can be used to, for example, retrieve additional information). For example, in FIG. 6E, augmentation 64c may be selected by a user (e.g., user 51 of FIGS. 5A and 5B) in order to retrieve and display information related to the visual item 62a.

As further illustrated in FIG. 10C, operation 1013 may additionally include or involve an operation 1014 for receiving the data that provides the one or more visibility rules including data that provides one or more visibility rules that directs the one or more first augmentations to be one or more functional augmentations that are in a form of one or more functional tags that when selected or activated results in display of information related to one or more visual items present in the first augmented view and/or in the first actual scene. For instance, the visibility rule acquiring module 808 (see FIG. 8A) of the AR device 50* of FIG. 7A or 7B (as well as FIG. 5A or 5B) receiving the data (e.g., the augmentation data 55 of FIG. 5A or 5B) that provides the one or more visibility rules including data that provides one or more visibility rules that directs the one or more first augmentations (e.g., the augmentation 64c of FIG. 6E) to be one or more functional augmentations that are in a form of one or more functional tags that when selected or activated results in display of information related to one or more visual items (e.g., visual item 62a in FIG. 6E) present in the first augmented view (e.g., augmented view 60e of FIG. 6E) and/or in the first actual scene (e.g. actual view 60c of FIG. 6C).

In the same or alternative implementations, operation 1007 may additionally or alternatively include an operation 1015 for receiving the data that provides the one or more visibility rules including data that provides one or more visibility rules that directs inclusion of the one or more first augmentations at one or more specific locations of an augmented view of an actual scene. For instance, the visibility rule acquiring module 808 (see FIG. 8A) of the AR device 50* of FIG. 7A or 7B (as well as FIG. 5A or 5B) receiving the data (e.g., the augmentation data 55 of FIG. 5A or 5B) that provides the one or more visibility rules including data that provides one or more visibility rules that directs inclusion of the one or more first augmentations (e.g., augmentation 64a of FIG. 6B) at one or more specific locations of an augmented view (e.g., locating the augmentation 64a to the right of the visual item 62a in the augmented view 60b of FIG. 6B) of an actual scene (e.g., actual view 60a of FIG. 6A).

As further illustrated in FIG. 10C, operation 1015 may include one or more additional operations including in some cases an operation 1016 for receiving the data that provides the one or more visibility rules including data that provides one or more visibility rules that directs the inclusion of the one or more first augmentations at one or more specific locations that is adjacent or proximate to one or more visual items in the augmented view, the one or more first augmentations being affiliated with the one or more visual items. For instance, the visibility rule acquiring module 808 (see FIG. 8A) of the AR device 50* of FIG. 7A or 7B (as well as FIG. 5A or 5B) receiving the data (e.g., the augmentation data 55 of FIG. 5A or 5B) that provides the one or more visibility rules including data that provides one or more visibility rules that directs the inclusion of the one or more first augmentations (e.g., augmentation 64a of FIG. 6B) at one or more specific locations that is adjacent or proximate to one or more visual items (e.g., visual item 62a of FIG. 6B) in the augmented view (e.g., augmented view 60*b* of FIG. 6B), the one or more first augmentations 64*a* being affiliated with the one or more visual items 62*a*.

In the same or alternative implementations, operation 1015 may additionally or alternatively include an operation 1017 for receiving the data that provides the one or more visibility rules including data that provides one or more visibility rules that directs the inclusion of the one or more first augmentations at one or more specific locations of the augmented view in order to prevent one or more priority visual items that are included in the actual scene from being obfuscated by the one or more first augmentations in the augmented view. For instance, the visibility rule acquiring module 808 (see FIG. 8A) of the AR device 50* of FIG. 7A or 7B (as well as FIG. 5A or 5B) receiving the data (e.g., the augmentation data 55 of FIG. 5A or 5B) that provides the one or more visibility rules including data that provides one or more visibility rules that directs the inclusion of the one or more first augmentations (e.g., augmentation 64*d* of FIG. 6F) at one or more specific locations of the augmented view (e.g., augmented view 60*f* of FIG. 6F) in order to prevent one or more priority visual items (e.g., visual item 62*b* in FIGS. 6C and 6F) that are included in the actual scene (e.g., actual view 60*c* of FIG. 6C) from being obfuscated by the one or more first augmentations 64*d* in the augmented view 60*f*.

In various implementations, operation 1007 for receiving the data that provides format information including data that provides one or more visibility rules that include one or more directives for displaying the one or more first augmentations may include an operation 1018 for receiving the data that provides the one or more visibility rules including data that provides one or more visibility rules that identifies one or more priority visual items that are directed by the visibility rules to have visibility priority over the one or more first augmentations in an augmented view of an actual scene. For instance, the visibility rule acquiring module 808 (see FIG. 8A) of the AR device 50* of FIG. 7A or 7B (as well as FIG. 5A or 5B) receiving the data (e.g., the augmentation data 55 of FIG. 5A or 5B) that provides the one or more visibility rules including data that provides one or more visibility rules that identifies one or more priority visual items (e.g., visual item 62*b* of FIGS. 6C, 6D, 6E, and 6F) that are directed by the visibility rules to have visibility priority over the one or more first augmentations (e.g., augmentation 64*b*, 64*c*, or 64*d* of FIG. 6D, 6E, or 6F) in an augmented view (e.g., augmented view 60*d*, 60*e*, or 60*f* of FIG. 6D, 6E, or 6F) of an actual scene (e.g., actual view 60*c* of FIG. 6C).

Figure 10D:
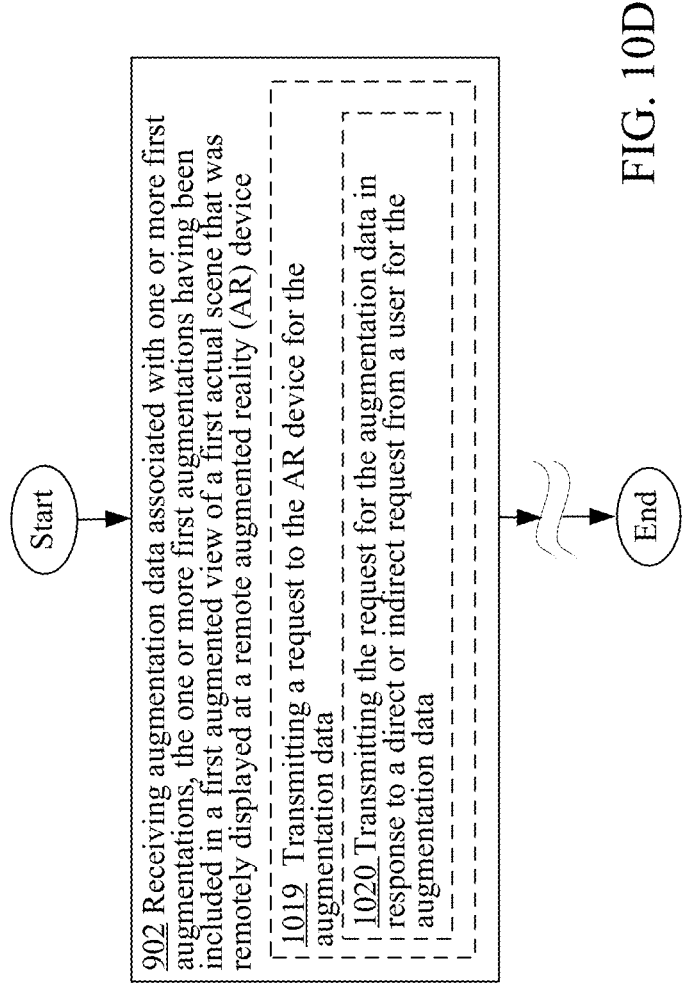
FIG. 10D is a high-level logic flowchart of a process depicting alternate implementations of the augmentation data receiving operation 902 of FIG. 9.

Turning now to FIG. 10D, in various implementations, the augmentations data receiving operation 902 of FIG. 9 may actually include or involve an initial operation 1019 for transmitting a request to the AR device for the augmentation data. For instance, the request transmitting module 810 (see FIG. 8A) of the AR device 50* of FIG. 7A or 7B (as well as FIG. 5A or 5B) transmitting a request (e.g., a command or directive) to the AR device 70 for the augmentation data 55.

As further illustrated in FIG. 10D, in some implementations, operation 1019 may further include an operation 1020 for transmitting the request for the augmentation data in response to a direct or indirect request from a user for the augmentation data. For instance, the request transmitting module 810 (see FIG. 8A) of the AR device 50* of FIG. 7A or 7B (as well as FIG. 5A or 5B) transmitting the request for the augmentation data 55 in response to a direct or indirect request from a user 51 for the augmentation data 55 (see, for example, FIG. 5A or 5B).

Figure 11A:
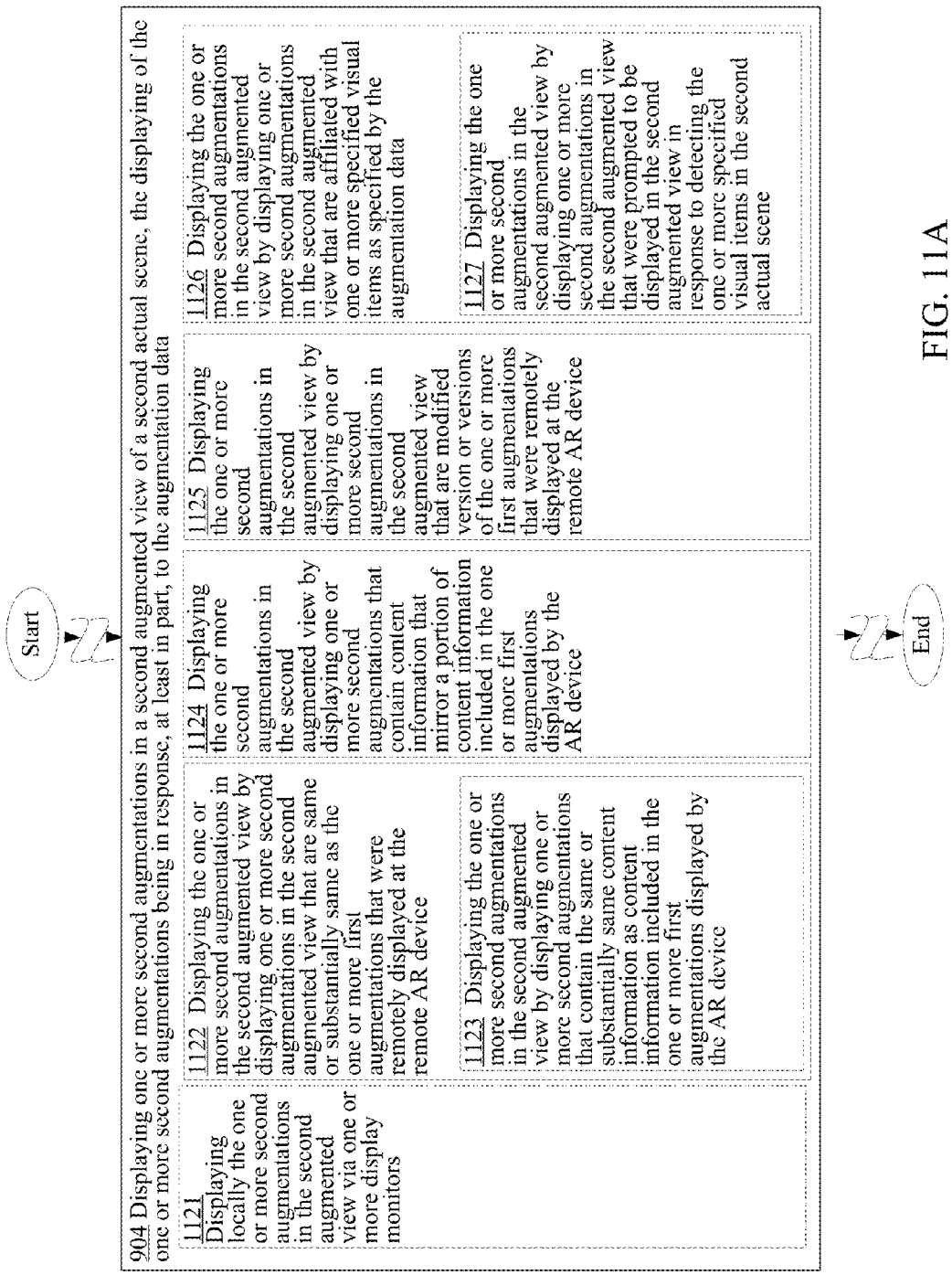
FIG. 11A is a high-level logic flowchart of a process depicting alternate implementations of the augmentation displaying operation 904 of FIG. 9.

Referring back to the FIG. 9, the augmentation displaying operation 904 similar to the augmentation data receiving operation 902 of FIG. 9 may be executed in a number of different ways in various alternative implementations as illustrated in FIGS. 11A, 11B, 11C, 11D, and 11E. For example, in some implementations, the augmentation displaying operation 904 of FIG. 9 may include an operation 1121 for displaying locally the one or more second augmentations in the second augmented view via one or more display monitors as illustrated in FIG. 11A. For instance, the augmentation presenting module 104* of the AR device 50* of FIG. 7A or 7B (as well as FIG. 5A or 5B) displaying locally at, for example, the AR device 50* of FIG. 5A or 5B the one or more second augmentations (e.g., the augmentation 64*e* illustrated in FIG. 6H) in the second augmented view (e.g., the augmented view 60*d* of FIG. 6H) via one or more display monitors 852 (see FIG. 8D).

In the same or different implementations, the augmentation displaying operation 904 of FIG. 9 may additionally or alternatively include an operation 1122 for displaying the one or more second augmentations in the second augmented view by displaying one or more second augmentations in the second augmented view that are same or substantially same as the one or more first augmentations that were remotely displayed at the remote AR device as further illustrated in FIG. 11. For instance, the augmentation presenting module 104* of the AR device 50* of FIG. 7A or 7B (as well as FIG. 5A or 5B) displaying the one or more second augmentations in the second augmented view by displaying one or more second augmentations (e.g., the augmentation 64*f* of FIG. 6J) in the second augmented view (e.g., augmented view 60*j* of FIG. 6J) that are same or substantially same as the one or more first augmentations (e.g., the augmentation 64*a* of FIG. 6B) that were remotely displayed at the remote AR device 70.

In some cases, operation 1122 may further include an operation 1123 for displaying the one or more second augmentations in the second augmented view by displaying one or more second augmentations that contain the same or substantially same content information as content information included in the one or more first augmentations displayed by the AR device. For instance, the augmentation presenting module 104* of the AR device 50* of FIG. 7A or 7B (as well as FIG. 5A or 5B) displaying the one or more second augmentations in the second augmented view by displaying (e.g., visually presenting) one or more second augmentations (e.g., the augmentation 64*f* of FIG. 6J) that contain the same or substantially same content information as content information included in the one or more first augmentations (e.g., the augmentation 64*a* of FIG. 6B) displayed by the AR device 70.

As further illustrated in FIG. 11A, the augmentation displaying operation 904 of FIG. 9, in some implementations, may additionally or alternatively include an operation 1124 for displaying the one or more second augmentations in the second augmented view by displaying one or more second augmentations that contain content information that mirror a portion of content information included in the one or more first augmentations displayed by the AR device. For instance, the augmentation presenting module 104* of the AR device 50* of FIG. 7A or 7B (as well as FIG. 5A or 5B) displaying the one or more second augmentations in the second augmented view by displaying (e.g., visually presenting) one or more second augmentations (e.g., the augmentation 64*e* of FIG. 6H, which is a shorter version of augmentation 64*a* of FIG. 6B) that contain content information that mirror a portion of content information (e.g., textual information) included in the one or more first augmentations (e.g., the augmentation 64*a* of FIG. 6A) displayed by the AR device 70.

In the same or different implementations, the augmentation displaying operation 904 may additionally or alternatively include an operation 1125 for displaying the one or more second augmentations in the second augmented view by displaying one or more second augmentations in the second augmented view that are modified version or versions of the one or more first augmentations that were remotely displayed at the remote AR device. For instance, the augmentation presenting module 104* including the modified augmentation presenting module 812 (see FIG. 8B) of the AR device 50* of FIG. 7A or 7B (as well as FIG. 5A or 5B) displaying the one or more second augmentations in the second augmented view when the modified augmentation presenting module 812 displays one or more second augmentations (e.g., the augmentation 64e of FIG. 6H or the augmentation 64g of FIG. 6K) in the second augmented view (e.g., the augmented view 60h or the augmented 60k of FIG. 6H or 6K) that are modified version or versions of the one or more first augmentations (e.g., the augmentation 64a of FIG. 6A) that were remotely displayed at the remote AR device 70.

In the same or different implementations, the augmentation displaying operation 904 may additionally or alternatively include an operation 1126 for displaying the one or more second augmentations in the second augmented view by displaying one or more second augmentations in the second augmented view that are affiliated with one or more specified visual items as specified by the augmentation data. For instance, the augmentation presenting module 104* including the affiliated augmentation presenting module 814 (see FIG. 8B) of the AR device 50* of FIG. 7A or 7B (as well as FIG. 5A or 5B) displaying the one or more second augmentations in the second augmented view when the affiliated augmentation presenting module 814 displays (e.g., visually presents) one or more second augmentations (e.g., augmentation 64e of FIG. 6H) in the second augmented view (e.g., the augmented view 60h of FIG. 6H) that are affiliated with one or more specified visual items (e.g., the visual item 62c of FIG. 6H) as specified by the augmentation data 55 (see FIG. 5A or 5B).

As further illustrated in FIG. 11A, operation 1126 may, in some cases, further include or involve an operation 1127 for displaying the one or more second augmentations in the second augmented view by displaying one or more second augmentations in the second augmented view that were prompted to be displayed in the second augmented view in response to detecting the one or more specified visual items in the second actual scene. For instance, the affiliated augmentation presenting module 814 including the visual item sensing module 816 (see FIG. 8B) of the AR device 50* of FIG. 7A or 7B (as well as FIG. 5A or 5B) displaying the one or more second augmentations in the second augmented view by displaying one or more second augmentations (e.g., the augmentation 64e of FIG. 6H) in the second augmented view (e.g., the augmented view 60h of FIG. 6H) that were prompted to be displayed in the second augmented view in response to detecting by the visual item sensing module 816 of the presence of the one or more specified visual items (e.g., visual item 62c) in the second actual scene (e.g., actual view 60g of FIG. 6G).

Figure 11B:
FIG. 11B is a high-level logic flowchart of a process depicting alternate implementations of the augmentation displaying operation 904 of FIG. 9.

Referring now to FIG. 11B, in some implementations, the augmentation displaying operation 904 of FIG. 9 may actually involve or include an operation 1128 for displaying the one or more second augmentations in the second augmented view by displaying the one or more second augmentations at one or more specific locations in the second augmented view. For instance, the augmentation presenting module 104* including the location specific augmentation presenting module 818 (see FIG. 8B) of the AR device 50* of FIG. 7A or 7B (as well as FIG. 5A or 5B) displaying the one or more second augmentations in the second augmented view when the location specific augmentation presenting module 818 displays the one or more second augmentations (e.g., augmentation 64e of FIG. 6H) at one or more specific locations (e.g., adjacent to visual item 62c in FIG. 6H) in the second augmented view 60h (see FIG. 6H).

As further illustrated in FIG. 11B, operation 1128 may include or involve one or more additional operations including, for example, an operation 1129 for displaying the one or more second augmentations in the second augmented view by displaying the one or more second augmentations at one or more specific locations in the second augmented view that are adjacent to or proximate to one or more locations of one or more specified visual items as specified by the augmentation data. For instance, the augmentation presenting module 104* including the location specific augmentation presenting module 818 of the AR device 50* of FIG. 7A or 7B (as well as FIG. 5A or 5B) displaying the one or more second augmentations in the second augmented view when the location specific augmentation presenting module 818 displays the one or more second augmentations (e.g., augmentation 64e of FIG. 6H) at one or more specific locations in the second augmented view 60h (see FIG. 6H) that are adjacent to or proximate to one or more locations in the augmented view 60h of one or more specified visual items (e.g., visual item 62c) as specified by the augmentation data 55.

In the same or different implementations, operation 1128 may additionally or alternatively include an operation 1130 for displaying the one or more second augmentations in the second augmented view by displaying the one or more second augmentations at one or more specific locations in the second augmented view in order to prevent one or more priority visual items that are present in the second actual scene from being obfuscated by the one or more second augmentations in the second augmented view. For instance, the augmentation presenting module 104* including the location specific augmentation presenting module 818 of the AR device 50* of FIG. 7A or 7B (as well as FIG. 5A or 5B) displaying the one or more second augmentations in the second augmented view when the location specific augmentation presenting module 818 displays the one or more second augmentations (e.g., augmentation 64i of FIG. 6N) at one or more specific locations in the second augmented view (e.g., augmented view 60n of FIG. 6N) in order to prevent one or more priority visual items (e.g., visual item 62d of FIG. 6N) that are present in the second actual scene (e.g., actual view 60g of FIG. 6G) from being obfuscated by the one or more second augmentations 64i in the second augmented view 60n (see FIG. 6N).

In various implementations, the augmentation display operation 904 may include or involve an operation 1131 for displaying the one or more second augmentations in the second augmented view by displaying one or more second augmentations that are at least semi-transparent in the second augmented view in order to prevent one or more priority visual items that are present in the second actual scene from being fully obfuscated by the one or more second augmentations in the second augmented view. For instance, the augmentation presenting module 104* including the semi-transparent augmentation presenting module 820 (see FIG. 8B) of the AR device 50* of FIG. 7A or 7B (as well as FIG. 5A or 5B) displaying the one or more second augmentations in the second augmented view when the semi-transparent augmentation presenting module 820 displays one or more second augmentations (e.g., the augmentation 64g of FIG. 6K) that are at least semi-transparent in the second augmented view (e.g., augmented view 60k of FIG. 6K) in order to prevent one or more priority visual items (e.g., visual item 62d of FIG.

6K) that are present in the second actual scene (e.g., actual view 60g of FIG. 6G) from being fully obfuscated by the one or more second augmentations 64g in the second augmented view 60k.

In some cases operation 1131 may further include an operation 1132 for displaying the one or more second augmentations in the second augmented view by displaying one or more second augmentations that are conditionally transparent in the second augmented view so long as the one or more priority visual items are detected as being present in the actual second scene. For instance, the augmentation presenting module 104* including the conditionally transparent augmentation presenting module 822 (see FIG. 8B) of the AR device 50* of FIG. 7A or 7B (as well as FIG. 5A or 5B) displaying the one or more second augmentations in the second augmented view when the conditionally transparent augmentation presenting module 822 displays one or more second augmentations (e.g., augmentation 64f of FIG. 6J) that are conditionally transparent in the second augmented view (e.g., augmented view 60m of FIG. 6M) so long as the one or more priority visual items 62d (see FIG. 6M) are detected as being present in the actual second scene (e.g., actual view 60g of FIG. 6G). In such cases where an augmentation (e.g., augmentation 64f of FIG. 6J) is conditionally transparent, the second augmented view (e.g., augmented view 60m of FIG. 6M) may include an augmentation 64h (see FIG. 6M) that may be functional and that may be selected or activated (e.g., "clicked") in order to retrieve and display the augmentation 64f (see, FIG. 6J).

In some implementations, the augmentation display operation 904 of FIG. 9 may involve or include an operation 1133 for displaying the one or more second augmentations in the second augmented view by displaying one or more second augmentations that are one or more functional augmentations. For instance, the augmentation presenting module 104* including the functional augmentation presenting module 824 (see FIG. 8B) of the AR device 50* of FIG. 7A or 7B (as well as FIG. 5A or 5B) displaying the one or more second augmentations in the second augmented view when the functional augmentation presenting module 824 displays one or more second augmentations (e.g., the augmentation 64h of FIG. 6M) that are one or more functional augmentations (e.g., an augmentation that can be selected or activated by a user in order to retrieve and display, for example, an informational augmentation).

As further illustrated in FIG. 11B, operation 1133 may further include an operation 1134 for displaying the one or more second augmentations in the second augmented view by displaying one or more second augmentations that are one or more functional augmentations that are in a form of one or more functional tags that when selected or activated by a user results in display of information related to one or more specified visual items. For instance, the augmentation presenting module 104* including the functional augmentation presenting module 824 of the AR device 50* of FIG. 7A or 7B (as well as FIG. 5A or 5B) displaying the one or more second augmentations in the second augmented view when the functional augmentation presenting module 824 displays one or more second augmentations (e.g., augmentation 64h of FIG. 6M or augmentation 64k of FIG. 6Q) that are one or more functional augmentations that are in a form of one or more functional tags (e.g., note that augmentation 64h of FIG. 6M is a functional augmentation that is shaped like a tab while augmentation 64kk of FIG. 6Q is another functional augmentation that is shaped like a book or page marker) that when selected or activated by a user (e.g., user 51 of FIG. 5A or 5B) results in display of information related to one or more specified visual items (e.g., visual item 62c of FIG. 6M).

In some cases, operation 1234 may, in turn, include an operation 1135 for displaying the one or more second augmentations that are one or more functional augmentations that are in the form of one or more functional tags that when selected or activated by a user results in display of information related to one or more specified visual items, the one or more second augmentations in the form of the one or more functional tags, prior to being selected or activated, being devoid of information related to the one or more specified visual items. For instance, the functional augmentation presenting module 824 of the AR device 50* of FIG. 7A or 7B (as well as FIG. 5A or 5B) displaying the one or more second augmentations that are one or more functional augmentations (e.g., augmentation 64h of FIG. 6M) that are in the form of one or more functional tags that when selected or activated by a user (e.g., the user 51 of FIG. 5A or 5B) results in display of information related to one or more specified visual items (e.g., visual item 62c of FIG. 6M), the one or more second augmentations 64h in the form of the one or more functional tags, prior to being selected or activated, being devoid of information related to the one or more specified visual items 62c.

Figure 11C:
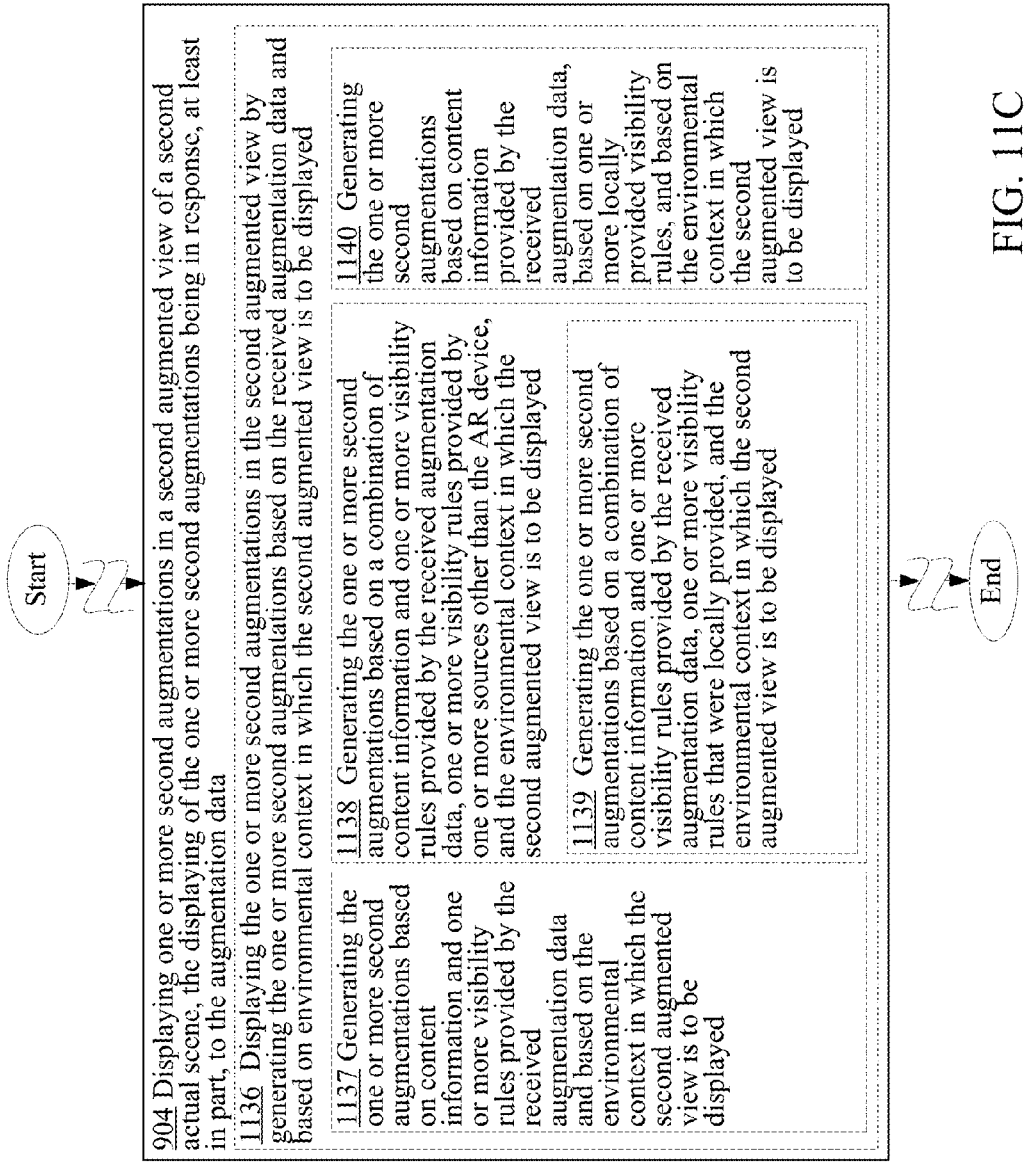
FIG. 11C is a high-level logic flowchart of a process depicting alternate implementations of the augmentation displaying operation 904 of FIG. 9.
Figure 11D:
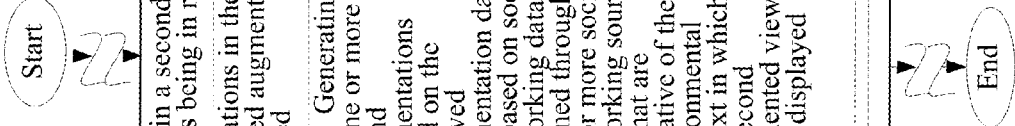
FIG. 11D is a high-level logic flowchart of a process depicting alternate implementations of the augmentation displaying operation 904 of FIG. 9.

Referring now to FIG. 11C, in various implementations, the augmentation displaying operation 904 may include an operation 1136 for displaying the one or more second augmentations in the second augmented view by generating the one or more second augmentations based on the received augmentation data and based on environmental context in which the second augmented view is to be displayed. For instance, the augmentation presenting module 104* including the augmentation data and context based augmentation providing module 826 (see FIG. 8B) of the AR device 50* of FIG. 7A or 7B (as well as FIG. 5A or 5B) displaying the one or more second augmentations in the second augmented view by having the context based augmentation providing module 826 generate the one or more second augmentations (e.g., the augmentation 64e, 64f, 64g, 64h, 64i, or 64k of FIG. 6H, 6J, 6K, 6M, 6N, or 6Q) based on the received augmentation data 55 and based on environmental context (e.g., the environment surrounding the AR device 50* in FIG. 5A or 5B) in which the second augmented view (e.g., the augmented view 60h, 60j, 60k, 60m, 60n, or 6q of FIG. 6H, 6J, 6K, 6M, 6N, or 6Q) is to be displayed.

As further illustrated in FIG. 11C, operation 1136 may include one or more additional operations including, in some cases, an operation 1137 for generating the one or more second augmentations based on content information and one or more visibility rules provided by the received augmentation data and based on the environmental context in which the second augmented view is to be displayed. For instance, the augmentation data and context based augmentation providing module 826 of the AR device 50* of FIG. 7A or 7B (as well as FIG. 5A or 5B) generating the one or more second augmentations (e.g., the augmentation 64e, 64f, 64g, 64h, 64i, or 64k of FIG. 6H, 6J, 6K, 6M, 6N, or 6Q) based on content information (e.g., textual information) and one or more visibility rules (e.g., directives that instructs or commands when and how augmentations are to be displayed) provided by the received augmentation data 55 and based on the environmental context (e.g., the activities of the user 51 employing the AR device 51) in which the second augmented view (e.g., the augmented view 60h, 60j, 60k, 60m, 60n, or 6q of FIG. 6H, 6J, 6K, 6M, 6N, or 6Q) is to be displayed.

In the same or different implementations, operation 1136 may additionally or alternatively an operation 1138 for generating the one or more second augmentations based on a combination of content information and one or more visibility rules provided by the received augmentation data, one or more visibility rules provided by one or more sources other than the AR device, and the environmental context in which the second augmented view is to be displayed. For instance, the augmentation data and context based augmentation providing module 826 of the AR device 50\* of FIG. 7A or 7B (as well as FIG. 5A or 5B) generating the one or more second augmentations (e.g., the augmentation 64*e*, 64*f*, 64*g*, 64*h*, 64*i*, or 64*k* of FIG. 6H, 6J, 6K, 6M, 6N, or 6Q) based on a combination of content information and one or more visibility rules provided by the received augmentation data 55, one or more visibility rules provided by one or more sources (e.g., one or more third party sources such as one or more third party network servers) other than the AR device 52, and the environmental context in which the second augmented view (e.g., the augmented view 60*h*, 60*j*, 60*k*, 60*m*, 60*n*, or 6*q* of FIG. 6H, 6J, 6K, 6M, 6N, or 6Q) is to be displayed.

Figure 12A:
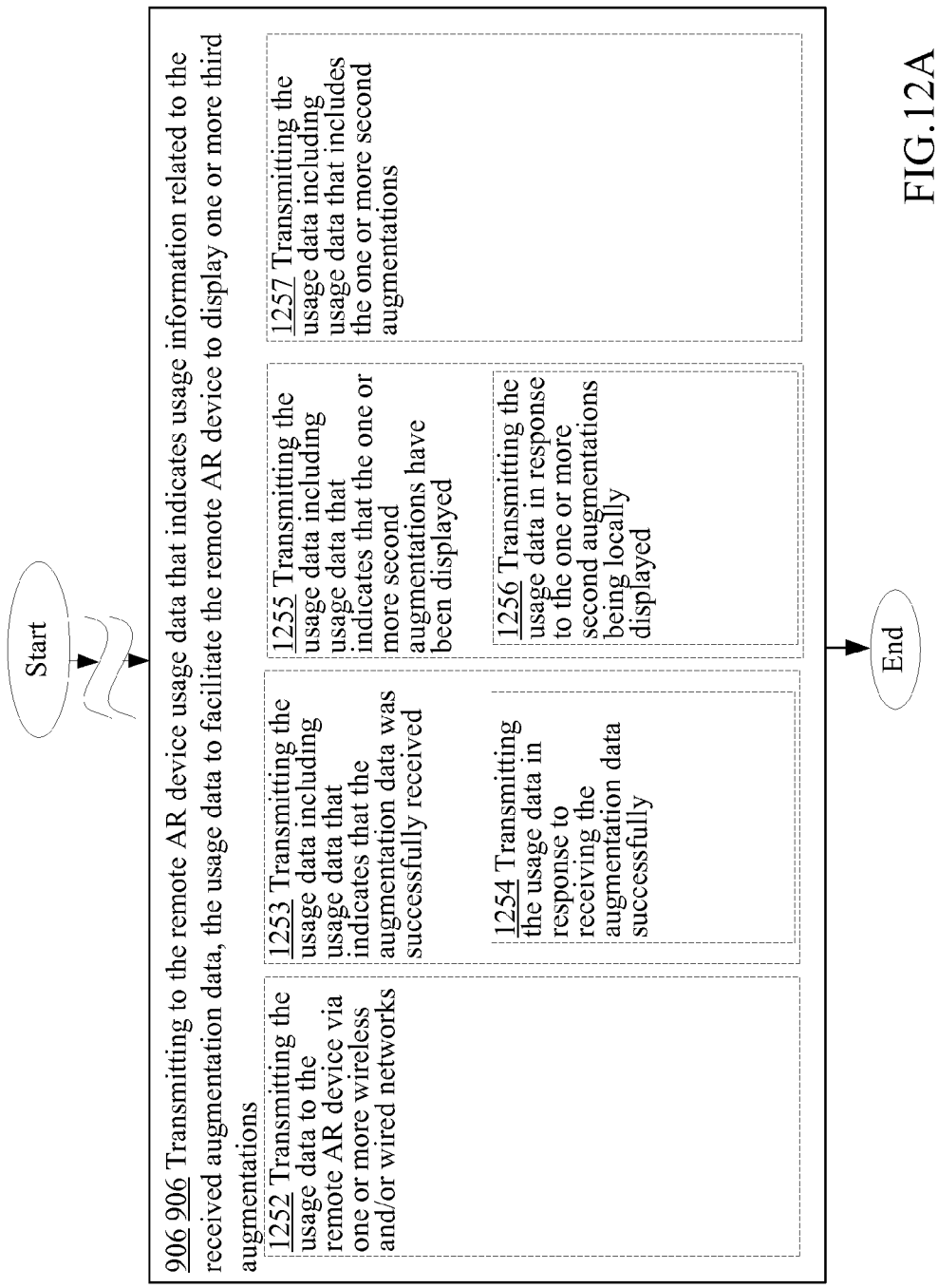
FIG. 12A is a high-level logic flowchart of a process depicting alternate implementations of the usage data transmitting operation 906 of FIG. 9.
Figure 12B:
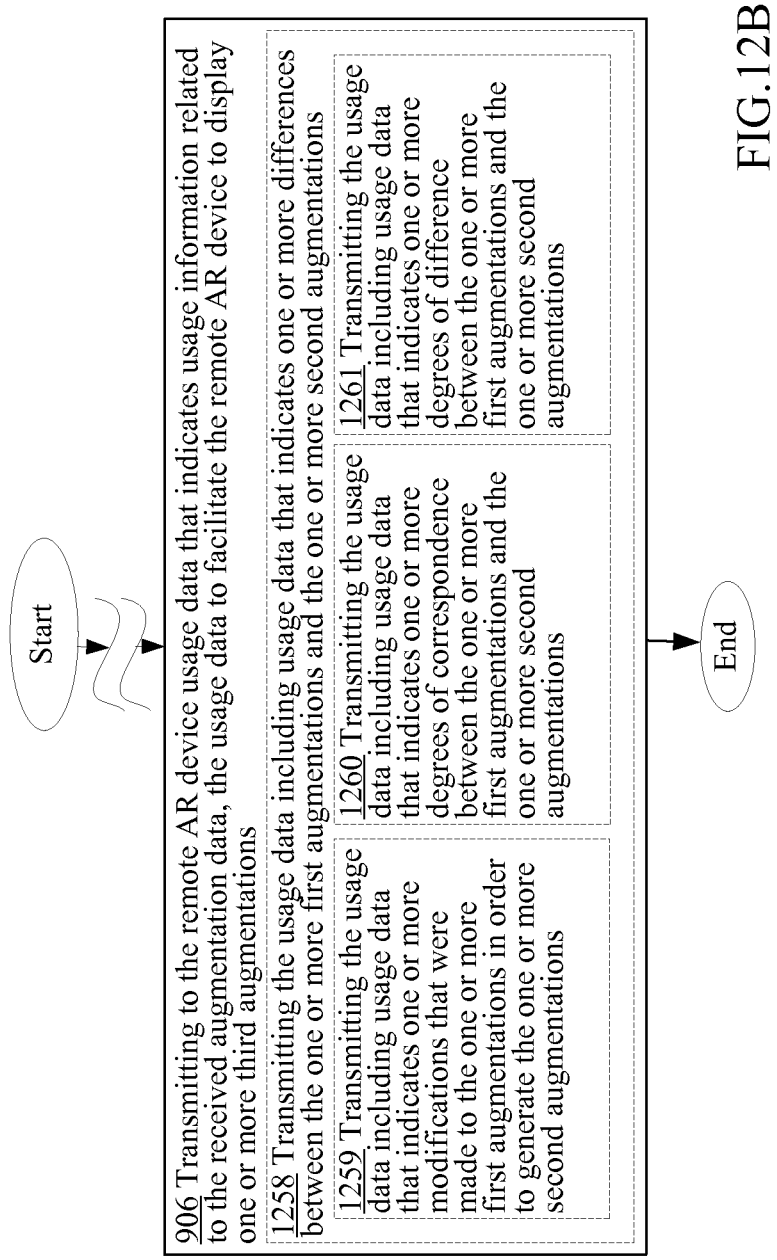
FIG. 12B is a high-level logic flowchart of a process depicting alternate implementations of the usage data transmitting operation 906 of FIG. 9.
Figure 12C:
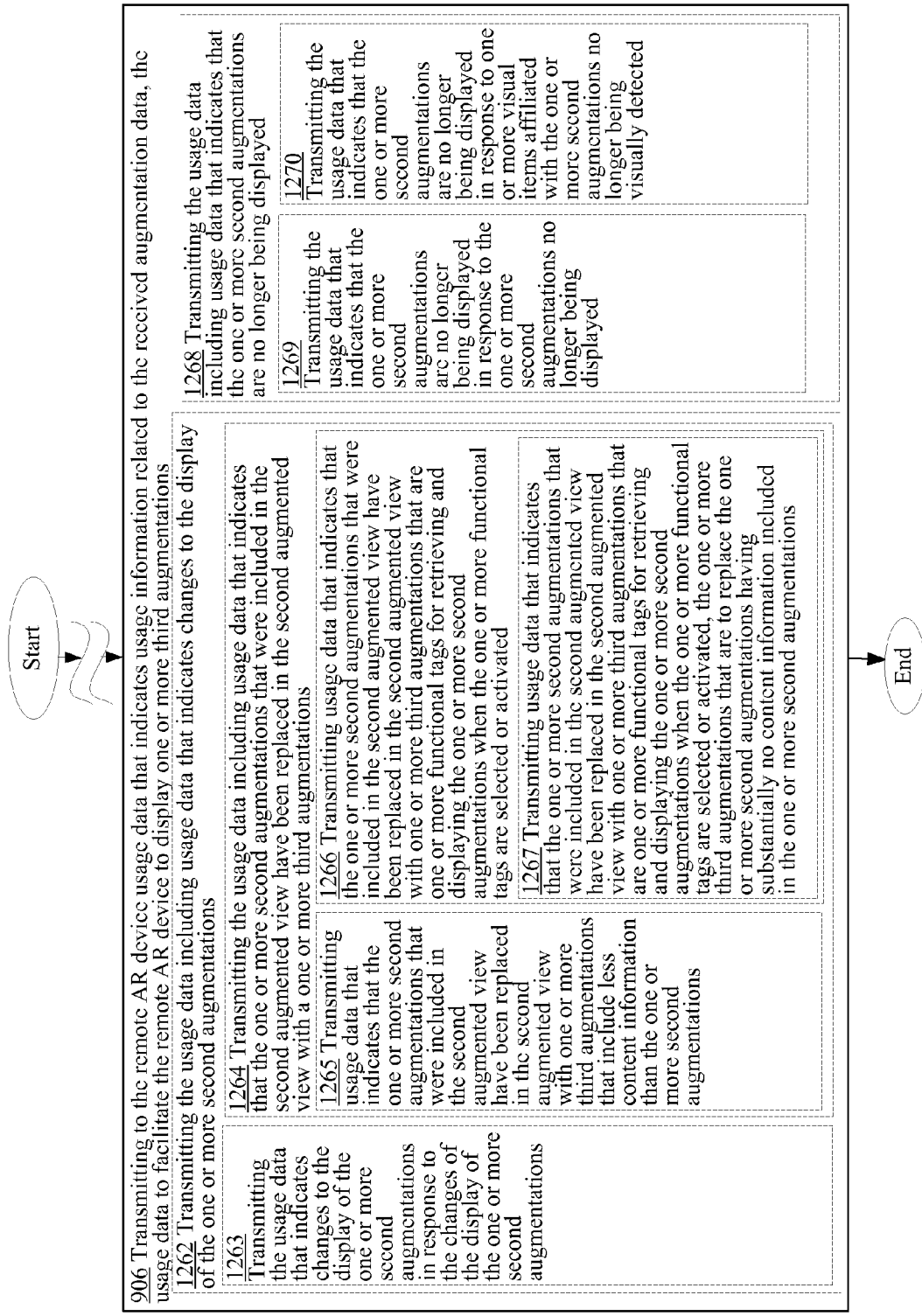
FIG. 12C is a high-level logic flowchart of a process depicting alternate implementations of the usage data transmitting operation 906 of FIG. 9.

Referring now to FIG. 12C, in various implementations the augmentation data transmitting operation 906 of FIG. 9 may additionally or alternatively include an operation 1139 for generating the one or more second augmentations based on a combination of content information and one or more visibility rules provided by the received augmentation data, one or more visibility rules that were locally provided, and the environmental context in which the second augmented view is to be displayed. For instance, the augmentation data and context based augmentation providing module 826 of the AR device 50\* of FIG. 7A or 7B (as well as FIG. 5A or 5B) generating the one or more second augmentations (e.g., the augmentation 64*e*, 64*f*, 64*g*, 64*h*, 64*i*, or 64*k* of FIG. 6H, 6J, 6K, 6M, 6N, or 6Q) based on a combination of content information and one or more visibility rules provided by the received augmentation data 55, one or more visibility rules that were locally provided by the AR device 50\*, and the environmental context in which the second augmented view (e.g., the augmented view 60*h*, 60*j*, 60*k*, 60*m*, 60*n*, or 6*q* of FIG. 6H, 6J, 6K, 6M, 6N, or 6Q) is to be displayed. That is, the AR device 50\* may generate or provide the one or more second augmentations (e.g., the augmentation 64*e*, 64*f*, 64*g*, 64*h*, 64*i*, or 64*k* of FIG. 6H, 6J, 6K, 6M, 6N, or 6Q) for visual presentation through one or more display monitors 852 based on the environmental context (e.g., whether the user 51 is exercising, driving an automobile, shopping, or performing other activities) surrounding the AR device 50\* and based on a combination of one or more visibility rules provided by the received augmentation data 55 (as provided by the remote AR device 70) and one or more visibility rules provided by the AR device 50\* (e.g., visibility rules 114 as provided from memory 114). When locally provided visibility rules, as provided for example by the AR device 50\*, conflict with the visibility rules provided by a remote AR device 70 then one way such conflict can be resolve is to make, for example, the locally provided visibility rules be superseding visibility rules that supersedes the visibility rules provided by a remote source or sources. Of course, in alternative implementations, visibility rules that are provided by remote sources may supersede visibility rules provided locally by the AR device 50\*.

In some implementations, operation 1136 may additionally or alternatively include an operation 1140 for generating the one or more second augmentations based on content information provided by the received augmentation data, based on one or more locally provided visibility rules, and based on the environmental context in which the second augmented view is to be displayed. For instance, the augmentation data and context based augmentation providing module 826 of the AR device 50\* of FIG. 7A or 7B (as well as FIG. 5A or 5B) generating the one or more second augmentations (e.g., the augmentation 64*e*, 64*f*, 64*g*, 64*h*, 64*i*, or 64*k* of FIG. 6H, 6J, 6K, 6M, 6N, or 6Q) based on content information provided by the received augmentation data 55, based on one or more locally provided visibility rules, and based on the environmental context in which the second augmented view (e.g., the augmented view 60*h*, 60*j*, 60*k*, 60*m*, 60*n*, or 6*q* of FIG. 6H, 6J, 6K, 6M, 6N, or 6Q) is to be displayed.

In the same or alternative implementations, operation 1136 may additionally or alternatively include an operation 1141 for generating the one or more second augmentations based on the received augmentation data and based on location data indicative of the environmental context in which the second augmented view is to be displayed. For instance, the augmentation data and context based augmentation providing module 826 of the AR device 50\* of FIG. 7A or 7B (as well as FIG. 5A or 5B) generating the one or more second augmentations based on the received augmentation data 55 and based on location data (e.g., locational data provided by a GPS 875 or another type of location sensor 874) indicative of the environmental context in which the second augmented view is to be displayed. That is, the determined location of the user 51, as well as the AR device 50\*, may infer or indicate the type of environment/activities that the user 51 may be participating in.

In the same or alternative implementations, operation 1136 may additionally or alternatively include an operation 1142 for generating the one or more second augmentations based on the received augmentation data and based on visual data indicative of the environmental context in which the second augmented view is to be displayed. For instance, the augmentation data and context based augmentation providing module 826 of the AR device 50\* of FIG. 7A or 7B (as well as FIG. 5A or 5B) generating the one or more second augmentations (e.g., the augmentation 64*e*, 64*f*, 64*g*, 64*h*, 64*i*, or 64*k* of FIG. 6H, 6J, 6K, 6M, 6N, or 6Q) based on the received augmentation data 55 and based on visual data indicative of the environmental context (e.g., visual data that indicates the presence of one or more visual items in the surrounding environment of the AR device 50\*, which when detected infers or suggests the activities of the user 51) in which the second augmented view (e.g., the augmented view 60*h*, 60*j*, 60*k*, 60*m*, 60*n*, or 6*q* of FIG. 6H, 6J, 6K, 6M, 6N, or 6Q) is to be displayed.

In the same or alternative implementations, operation 1136 may additionally or alternatively include an operation 1143 for generating the one or more second augmentations based on the received augmentation data and based on social networking data obtained through one or more social networking sources and that are indicative of the environmental context in which the second augmented view is to be displayed. For instance, the augmentation data and context based augmentation providing module 826 of the AR device 50\* of FIG. 7A or 7B (as well as FIG. 5A or 5B) generating the one or more second augmentations (e.g., the augmentation 64*e*, 64*f*, 64*g*, 64*h*, 64*i*, or 64*k* of FIG. 6H, 6J, 6K, 6M, 6N, or 6Q) based on the received augmentation data 55 and based on social networking data (e.g., social networking data as provided by, for example, micro-blogs or status reports that indicates that the user 51 is traveling, at a business meeting, at a sporting event, shopping, or other activities) obtained through one or more social networking sources (e.g., Twitter, Facebook, Friendster, etc.) and that are indicative of the environmental context in which the second augmented view (e.g., the augmented view 60*h*, 60*j*, 60*k*, 60*m*, 60*n*, or 6*q* of FIG. 6H, 6J, 6K, 6M, 6N, or 6Q) is to be displayed.

In the same or alternative implementations, operation 1136 may additionally or alternatively include an operation 1144 for generating the one or more second augmentations based on the received augmentation data and based on audio data indicative of the environmental context in which the second augmented view is to be displayed. For instance, the augmentation data and context based augmentation providing module 826 of the AR device 50* of FIG. 7A or 7B (as well as FIG. 5A or 5B) generating the one or more second augmentations (e.g., the augmentation 64e, 64f, 64g, 64h, 64i, or 64k of FIG. 6H, 6J, 6K, 6M, 6N, or 6Q) based on the received augmentation data 55 and based on audio data (e.g., audio recording of ocean waves breaking, street noise, heavy breathing, unrecognizable or recognizable voices, and so forth) indicative of the environmental context in which the second augmented view (e.g., the augmented view 60h, 60j, 60k, 60m, 60n, or 6q of FIG. 6H, 6J, 6K, 6M, 6N, or 6Q) is to be displayed.

In the same or alternative implementations, operation 1136 may additionally or alternatively include an operation 1145 for generating the one or more second augmentations based on the received augmentation data and based on movement data indicative of the environmental context in which the second augmented view is to be displayed. For instance, the augmentation data and context based augmentation providing module 826 of the AR device 50* of FIG. 7A or 7B (as well as FIG. 5A or 5B) generating the one or more second augmentations (e.g., the augmentation 64e, 64f, 64g, 64h, 64i, or 64k of FIG. 6H, 6J, 6K, 6M, 6N, or 6Q) based on the received augmentation data 55 and based on movement data (e.g., data collected using, for example, one or more accelerometers 877, one or more gyroscope 878, and so forth) indicative of the environmental context in which the second augmented view (e.g., the augmented view 60h, 60j, 60k, 60m, 60n, or 6q of FIG. 6H, 6J, 6K, 6M, 6N, or 6Q) is to be displayed. For example, the format of the one or more second augmentations to be displayed may be adjusted (e.g., reducing the size of the one or more second augmentations or moving the one or more second augmentations to the edge or corner of the augmented view) in order to reduce the visual obstruction caused by the one or more second augmentations if it appears that based on movement data the user 51 appears to be driving a car or riding a bicycle.

Figure 11E:
FIG. 11E is a high-level logic flowchart of a process depicting alternate implementations of the augmentation displaying operation 904 of FIG. 9.

Referring now to FIG. 11E, in the same or alternative implementations, augmentation displaying operation 904 of FIG. 9 may additionally or alternatively include an operation 1146 for displaying the one or more second augmentations in the second augmented view including displaying one or more indicators that directly or indirectly indicate differences between the one or more first augmentations and the one or more second augmentations. For instance, the augmentation presenting module 104* including the difference indicator presenting module 828 (see FIG. 8B) of the AR device 50* of FIG. 7A or 7B (as well as FIG. 5A or 5B) displaying the one or more second augmentations in the second augmented view when the difference indicator presenting module 828 displays one or more indicators (see augmentation 64m of FIG. 6R) that directly or indirectly indicate differences between the one or more first augmentations (e.g., the augmentation 64a of FIG. 6B) and the one or more second augmentations (e.g., the augmentation 64e of FIG. 6R). For example, FIG. 6R illustrates an augmented view 60r that may be displayed by the AR device 50* of FIG. 5A or 5B that includes an augmentation 64m (e.g., a functional augmentation that can be selected or "clicked" by the user 51 in order to retrieve) that indirectly indicates the difference (e.g., augmentation 64m does have the name of the painting nor the full summary) between the augmentation 64m presented by the AR device 50* and the augmentation 64a (see FIG. 6B) that was presented remotely by the AR device 70.

As further illustrated in FIG. 11E, operation 1146 may include one or more additional operations including in some cases an operation 1147 for displaying the one or more indicators indicating the differences between the one or more first augmentations and the one or more second augmentations by displaying one or more modifications applied to the one or more first augmentations in order to generate the one or more second augmentations as further illustrated in FIG. 14. For instance, the augmentation presenting module 104* including the modification indicator presenting module 830 (see FIG. 8B) of the AR device 50* of FIG. 7A or 7B (as well as FIG. 5A or 5B) displaying the one or more indicators indicating the differences between the one or more first augmentations and the one or more second augmentations when the modification indicator presenting module 830 displays one or more modifications (see disabled tab 65a, which is semi-transparent, in augmentation 64n of FIG. 5) applied to the one or more first augmentations (e.g., augmentation 64a of FIG. 6B) in order to generate the one or more second augmentations (e.g., augmentation 64n of FIG. 6S).

In the same or alternative implementations, operation 1146 may additionally or alternatively include an operation 1148 for displaying the one or more indicators indicating the differences between the one or more first augmentations and the one or more second augmentations by displaying one or more degrees of correspondence between the one or more first augmentations and the one or more second augmentations. For instance, the augmentation presenting module 104* including the degree of correspondence presenting module 832 (see FIG. 8B) of the AR device 50* of FIG. 7A or 7B (as well as FIG. 5A or 5B) displaying the one or more indicators indicating the differences between the one or more first augmentations and the one or more second augmentations when the degree of correspondence presenting module 832 displays one or more degrees of correspondence (e.g., augmentation 64p of FIG. 6T) between the one or more first augmentations (e.g., augmentation 64a of FIG. 6B) and the one or more second augmentations (e.g., augmentation 64e of FIG. 6T).

In the same or alternative implementations, operation 1146 may additionally or alternatively include an operation 1149 for displaying the one or more indicators indicating the differences between the one or more first augmentations and the one or more second augmentations by displaying one or more degrees of difference between the one or more first augmentations and the one or more second augmentations. For instance, the augmentation presenting module 104* including the degree of difference presenting module 832 (see FIG. 8B) of the AR device 50* of FIG. 7A or 7B (as well as FIG. 5A or 5B) displaying the one or more indicators indicating the differences between the one or more first augmentations and the one or more second augmentations when the degree of difference presenting module 832 displays one or more degrees of difference (e.g., augmentation 64q of FIG. 6U) between the one or more first augmentations (e.g., augmentation 64a of FIG. 6B) and the one or more second augmentations (e.g., augmentation 64e of FIG. 6U).

the same or alternative implementations, operation 1146 may additionally or alternatively include an operation 1150 for displaying one or more second augmentations that displays only a portion of content information that was displayed through the one or more first augmentations that was remotely displayed, the content information that was displayed through the one or more first augmentations having been content information related to one or more visual items, and displaying one or more functional augmentations that can be selected by a user for retrieving and displaying additional content information related to the one or more visual items. For instance, the augmentation presenting module 104* of the AR device 50* of FIG. 7A or 7B (as well as FIG. 5A or 5B) displaying one or more second augmentations (e.g., augmentation 64e of FIG. 6H) that displays only a portion of content information that was displayed through the one or more first augmentations (e.g., augmentation 64a of FIG. 6B) that was remotely displayed, the content information that was displayed through the one or more first augmentations 64b having been content information related to one or more visual (e.g., visual item 62c of FIG. 6H), and displaying one or more functional augmentations (e.g., functional tab 65 of FIG. 6H) that can be selected by a user for retrieving and displaying additional content information related to the one or more visual items (e.g., visual item 62c of FIG. 6H).

In some implementations, operation 1150 may further include or involve an operation 1151 for displaying one or more functional augmentations that can be selected by the user for displaying all content information related to the one or more visual items that was displayed through the one or more first augmentations. For instance, the functional augmentation presenting module 824 of the AR device 50* of FIG. 7A or 7B (as well as FIG. 5A or 5B) displaying the one or more functional augmentations (e.g., functional tab 65 of FIG. 6H) that can be selected by the user for displaying all content information related to the one or more visual items (e.g., visual item 62a of FIGS. 6A and 6B, which visually is essentially the same as the visual item 62c of FIG. 6H) that was displayed through the one or more first augmentations (e.g., augmentation 64a of FIG. 6B).

Similar to the augmentation data receiving operation 902 and the augmentation displaying operation 904 of FIG. 9, the usage data transmitting operation 906 of FIG. 9 for transmitting to the remote AR device usage data that indicates usage information related at least to usage or non-usage of the received augmentation data, the usage data to facilitate the remote AR device to display one or more third augmentations may be executed in a number of different ways in various alternative embodiments as illustrated in FIGS. 12A, 12B, and 12C. In some implementations, for example, the usage data transmitting operation 906 may include an operation 1252 for transmitting the usage data to the remote AR device via one or more wireless and/or wired networks as illustrated in FIG. 12A. For instance, the network relaying module 836 (see FIG. 8C) of the AR device 50* of FIGS. 7A or 7B (as well as FIGS. 5A or 5B) transmitting the usage data 56 to the remote AR device 70 via one or more wireless and/or wired networks 58.

In the same or alternative implementations, the usage data transmitting operation 906 may additionally or alternatively include an operation 1253 for transmitting the usage data including usage data that indicates that the augmentation data was successfully received. For instance, the usage data relaying module 106* of the AR device 50* of FIG. 7A or 7B (as well as FIG. 5A or 5B) transmitting the usage data 56 including usage data 56 that indicates that the augmentation data 55 was successfully received by the AR device 50*.

As further illustrated in FIG. 12A, operation 1253 in various implementations may further include an operation 1254 for transmitting the usage data in response to receiving the augmentation data successfully. For instance, the usage data relaying module 106* of the AR device 50* of FIG. 7A or 7B (as well as FIG. 5A or 5B) transmitting the usage data 56 in response to (e.g., prompted by) reception of the augmentation data 55 successfully by the AR device 50*.

In the same or alternative implementations, the usage data transmitting operation 906 of FIG. 9 may additionally or alternatively include an operation 1255 for transmitting the usage data including usage data that indicates that the one or more second augmentations have been displayed. For instance, the usage data relaying module 106* of the AR device 50* of FIG. 7A or 7B (as well as FIG. 5A or 5B) transmitting the usage data 56 including usage data 56 that indicates that the one or more second augmentations (e.g., the augmentation 64e, 64f, 64g, 64h, 64i, or 64k of FIG. 6H, 6J, 6K, 6M, 6N, or 6Q) have been displayed by the AR device 50*.

In some implementations, operation 1255 may further include or involve an operation 1256 for transmitting the usage data in response to the one or more second augmentations being locally displayed. For instance, the usage data relaying module 106* of the AR device 50* of FIG. 7A or 7B (as well as FIG. 5A or 5B) transmitting the usage data 56 in response to (e.g., prompted by) the one or more second augmentations (e.g., the augmentation 64e, 64f, 64g, 64h, 64i, or 64k of FIG. 6H, 6J, 6K, 6M, 6N, or 6Q) being locally displayed by the AR device 50*.

In the same or alternative implementations, the usage data transmitting operation 906 of FIG. 9 may additionally or alternatively include an operation 1257 for transmitting the usage data including usage data that includes the one or more second augmentations. For instance, the usage data relaying module 106* including the augmentation relaying module 838 (see FIG. 8C) of the AR device 50* of FIG. 7A or 7B (as well as FIG. 5A or 5B) transmitting the usage data 56 when the augmentation relaying module 838 transmits usage data 56 that includes the one or more second augmentations (e.g., the augmentation 64e, 64f, 64g, 64h, 64i, or 64k of FIG. 6H, 6J, 6K, 6M, 6N, or 6Q).

Turning now to FIG. 12B, in various implementations, the usage data transmitting operation 906 of FIG. 9 may additionally or alternatively include an operation 1258 for transmitting the usage data including usage data that indicates one or more differences between the one or more first augmentations and the one or more second augmentations. For instance, the usage data relaying module 106* including the difference indicating data relaying module 840 (see FIG. 8C) of the AR device 50* of FIG. 7A or 7B (as well as FIG. 5A or 5B) transmitting the usage data 56 when the difference indicating data relaying module 840 transmits usage data 56 that indicates one or more differences between the one or more first augmentations (e.g., augmentation 64a, 64b, 64c, and/or 64d of FIGS. 6B, 6D, 6E, and/or 6F) and the one or more second augmentations (e.g., the augmentation 64e, 64f, 64g, 64h, 64i, and/or 64k of FIGS. 6H, 6J, 6K, 6M, 6N, and/or 6Q).

As further illustrated in FIG. 12B, operation 1258 may further include one or more additional operations including, in some cases, an operation 1259 for transmitting the usage data including usage data that indicates one or more modifications that were made to the one or more first augmentations in order to generate the one or more second augmentations. For instance, the usage data relaying module 106* including the modification indicating data relaying module 842 (see FIG. 8C) of the AR device 50* of FIG. 7A or 7B (as well as FIG. 5A or 5B) transmitting the usage data 56 when the modification indicating data relaying module 842 transmits usage data 56 that indicates one or more modifications that were made to the one or more first augmentations (e.g., augmentation 64a, 64b, 64c, and/or 64d of FIGS. 6B, 6D, 6E, and/or 6F) in order to generate the one or more second augmentations (e.g., the augmentation 64e, 64f, 64g, 64h, 64i, and/or 64k of FIGS. 6H, 6J, 6K, 6M, 6N, and/or 6Q).

In the same or alternative implementations, operation 1258 may additionally or alternatively include an operation 1260 for transmitting the usage data including usage data that indicates one or more degrees of correspondence between the one or more first augmentations and the one or more second augmentations. For instance, the usage data relaying module 106\* including the degree of correspondence indicating data relaying module 844 (see FIG. 8C) of the AR device 50\* of FIG. 7A or 7B (as well as FIG. 5A or 5B) transmitting the usage data 56 when the degree of correspondence indicating data relaying module 844 transmits usage data 56 that indicates one or more degrees of correspondence between the one or more first augmentations (e.g., augmentation 64*a*, 64*b*, 64*c*, and/or 64*d* of FIGS. 6B, 6D, 6E, and/or 6F) and the one or more second augmentations (e.g., the augmentation 64*e*, 64*f*, 64*g*, 64*h*, 64*i*, and/or 64*k* of FIGS. 6H, 6J, 6K, 6M, 6N, and/or 6Q).

In the same or alternative implementations, operation 1258 may additionally or alternatively include an operation 1261 for transmitting the usage data including usage data that indicates one or more degrees of difference between the one or more first augmentations and the one or more second augmentations. For instance, the usage data relaying module 106\* including the degree of difference indicating data relaying module 846 (see FIG. 8C) of the AR device 50\* of FIG. 7A or 7B (as well as FIG. 5A or 5B) transmitting the usage data 56 when the degree of difference indicating data relaying module 846 transmits usage data 56 that indicates one or more degrees of difference between the one or more first augmentations (e.g., augmentation 64*a*, 64*b*, 64*c*, and/or 64*d* of FIGS. 6B, 6D, 6E, and/or 6F) and the one or more second augmentations (e.g., the augmentation 64*e*, 64*f*, 64*g*, 64*h*, 64*i*, and/or 64*k* of FIGS. 6H, 6J, 6K, 6M, 6N, and/or 6Q).

Turning now to FIG. 12C, in various implementations, the usage data transmitting operation 906 of FIG. 9 may additionally or alternatively include an operation 1262 for transmitting the usage data including usage data that indicates changes to the display of the one or more second augmentations. For instance, the usage data relaying module 106\* including the augmentation change indicating data relaying module 848 (see FIG. 8C) of the AR device 50\* of FIG. 7A or 7B (as well as FIG. 5A or 5B) transmitting the usage data 56 when the augmentation change indicating data relaying module 848 transmits usage data 56 that indicates changes to the display of the one or more second augmentations (e.g., the augmentation 64*e*, 64*f*, 64*g*, 64*h*, 64*i*, and/or 64*k* of FIGS. 6H, 6J, 6K, 6M, 6N, and/or 6Q). For example, if the one or more second augmentations presented by the AR device 50\* are one or more functional augmentations and if the user 51 elects to view an expanded version of the one or more second augmentations with additional supplemental content information, than the usage data 56 transmitted to the AR device 70 by the AR device 50\* may indicate that the one or more second augmentations displayed by the AR device e50\* are the expanded version or versions of the one or more second augmentations.

As further illustrated in FIG. 12C, in some implementations, operation 1262 may further include an operation 1263 for transmitting the usage data that indicates changes to the display of the one or more second augmentations in response to the changes of the display of the one or more second augmentations. For instance, the augmentation change indicating data relaying module 848 of the AR device 50\* of FIG. 7A or 7B (as well as FIG. 5A or 5B) transmitting the usage data 56 that indicates changes to the display of the one or more second augmentations transmitting the usage data that indicates changes to the display of the one or more second augmentations in response to the changes of the display of the one or more second augmentations in response to (e.g. prompted by) changes of the display of the one or more second augmentations (e.g., the augmentation 64*e*, 64*f*, 64*g*, 64*h*, 64*i*, and/or 64*k* of FIGS. 6H, 6J, 6K, 6M, 6N, and/or 6Q).

In the same or alternative implementations, operation 1262 may additionally or alternatively include an operation 1264 for transmitting the usage data including usage data that indicates that the one or more second augmentations that were included in the second augmented view have been replaced in the second augmented view with a one or more third augmentations. For instance, the usage data relaying module 106\* including the augmentation change indicating data relaying module 848 of the AR device 50\* of FIG. 7A or 7B (as well as FIG. 5A or 5B) transmitting the usage data 56 when the augmentation change indicating data relaying module 848 transmits usage data 56 that indicates that the one or more second augmentations (e.g., augmentation 64*e* of FIG. 6H) that were included in the second augmented view 60*h* (see FIG. 6H) have been replaced in the second augmented view 60*h* with a one or more third augmentations (e.g., augmentation 63*h* of FIG. 6M).

As further illustrated in FIG. 2C, operation 1264 may include one or more additional operations in various alternative implementations including in some cases an operation 1265 for transmitting usage data that indicates that the one or more second augmentations that were included in the second augmented view have been replaced in the second augmented view with one or more third augmentations that include less content information than the one or more second augmentations. For instance, the augmentation change indicating data relaying module 848 of the AR device 50\* of FIG. 7A or 7B (as well as FIG. 5A or 5B) transmitting usage 56 data that indicates that the one or more second augmentations 64*f* (see FIG. 6J) that were included in the second augmented view 60*j* (se FIG. 6J) have been replaced in the second augmented view 60*j* with one or more third augmentations 64 (see FIG. 6H) that include less content information than the one or more second augmentations 64*f* (see FIG. 6J).

In the same or different implementations, operation 1264 may additionally or alternatively include an operation 1266 for transmitting usage data that indicates that the one or more second augmentations that were included in the second augmented view have been replaced in the second augmented view with one or more third augmentations that are one or more functional tags for retrieving and displaying the one or more second augmentations when the one or more functional tags are selected or activated. For instance, the augmentation change indicating data relaying module 848 of the AR device 50\* of FIG. 7A or 7B (as well as FIG. 5A or 5B) transmitting usage data that indicates that the one or more second augmentations 64*e* (see FIG. 6H) that were included in the second augmented view 60*h* (see FIG. 6H) have been replaced in the second augmented view 60*h* (see FIG. 6H) with one or more third augmentations 64*h* (see FIG. 6M) that are one or more functional tags for retrieving and displaying the one or more second augmentations 64*e* (see FIG. 6H) when the one or more functional tags are selected or activated (e.g., "clicked" using, for example, voice command or eye focus or gaze application, or if employing a touchscreen such as when the AR device 50\* is in the form of a smartphone 10 or a tablet computer 20, touching the one or more functional tags displayed on the touchscreen).

In some cases, operation 1266 may further include or involve an operation 1267 for transmitting usage data that indicates that the one or more second augmentations that were included in the second augmented view have been replaced in the second augmented view with one or more third augmentations that are one or more functional tags for retrieving and displaying the one or more second augmentations when the one or more functional tags are selected or activated, the one or more third augmentations that are to replace the one or more second augmentations having substantially no content information included in the one or more second augmentations. For instance, the augmentation change indicating data relaying module 848 of the AR device 50* of FIG. 7A or 7B (as well as FIG. 5A or 5B) transmitting usage data 56 that indicates that the one or more second augmentations 64e (see FIG. 6H) that were included in the second augmented view 60h (see FIG. 6H) have been replaced in the second augmented view 60h with one or more third augmentations 64h (see FIG. 6M) that are one or more functional tags for retrieving and displaying the one or more second augmentations 64e (see FIG. 6H) when the one or more functional tags are selected or activated, the one or more third augmentations 64h (see FIG. 6M) that are to replace the one or more second augmentations 64e (see FIG. 6H) having substantially no content information (note that in the augmentation 64h of FIG. 6M, there is no information related to visual item 62c or information included in the augmentation 64e of FIG. 6H) included in the one or more second augmentations 64e (see FIG. 6H).

Referring back to FIG. 12C, the usage data transmitting operation 906 of FIG. 9 may additionally or alternatively include an operation 1268 for transmitting the usage data including usage data that indicates that the one or more second augmentations are no longer being displayed. For instance, the usage data relaying module 106* including the augmentation change indicating data relaying module 848 of the AR device 50* of FIG. 7A or 7B (as well as FIG. 5A or 5B) transmitting the usage data 56 when the augmentation change indicating data relaying module 848 transmits usage data 56 that indicates that the one or more second augmentations 64e (see FIG. 6H) are no longer being displayed. For example, FIG. 6Q illustrates how augmentation 64e (see FIG. 6H) is no longer being displayed when the art book 66 is closed, thus removing the visual item 62c (see FIG. 6H) that the augmentation 64de is affiliated with from the augmented view 60h, thus causing the augmentation 64e from being displayed in the augmented view 60q (see FIG. 6Q).

In some implementations, operation 1268 may further include or involve an operation 1269 for transmitting the usage data that indicates that the one or more second augmentations are no longer being displayed in response to the one or more second augmentations no longer being displayed. For instance, the usage data relaying module 106* including the augmentation change indicating data relaying module 848 of the AR device 50* of FIG. 7A or 7B (as well as FIG. 5A or 5B) transmitting the usage data 56 that indicates that the one or more second augmentations 64e (see FIG. 6H) are no longer being displayed in response to (e.g., prompted by) the one or more second augmentations 64e no longer being displayed.

In the same or different implementations, operation 1268 may additionally or alternatively include an operation 1270 for transmitting the usage data that indicates that the one or more second augmentations are no longer being displayed in response to one or more visual items affiliated with the one or more second augmentations no longer being visually detected. For instance, the usage data relaying module 106* including the augmentation change indicating data relaying module 848 of the AR device 50* of FIG. 7A or 7B (as well as FIG. 5A or 5B) transmitting the usage data 56 that indicates that the one or more second augmentations 64e (see FIG. 6H) are no longer being displayed in response to one or more visual items 62c (see FIGS. 6G and 6H) affiliated with the one or more second augmentations 64e (see FIG. 6H) no longer being visually detected.

Referring now to FIG. 12D, in various implementations, the usage data transmitting operation 906 of FIG. 9 may additionally or alternatively include an operation 1271 for transmitting to the remote AR device the usage data, the usage data to facilitate the remote AR device to display one or more third augmentations that directly or indirectly indicate that the transmitted augmentation data was successfully received. For instance, the usage data relaying module 106* of the AR device 50* of FIGS. 7A or 7B (as well as FIGS. 5A or 5B) transmitting or relaying to the remote AR device 70 the usage data56, the usage data 56 to facilitate the remote AR device 70 to display one or more third augmentations that directly or indirectly indicate that the transmitted augmentation data 55 was successfully received. For example, the one or more third augmentations having flashing or particularly colored margin/border to indicate that the transmitted augmentation data 55 was successfully received (or alternatively the one or more third augmentations that is/are text or icons that directly indicate that the augmentation data 55 was successfully received).

In the same or alternative implementations, the usage data transmitting operation 906 may additionally or alternatively include an operation 1272 for transmitting to the remote AR device the usage data, the usage data to facilitate the remote AR device to display one or more third augmentations that directly or indirectly indicate that the one or more second augmentations was displayed. For instance, the usage data relaying module 106* of the AR device 50* of FIGS. 7A or 7B (as well as FIGS. 5A or 5B) transmitting or relaying to the remote AR device 70 the usage datan56, the usage data 56 to facilitate the remote AR device 70 to display one or more third augmentations that directly or indirectly indicate that the one or more second augmentations was displayed by the AR device 10*.

In the same or alternative implementations, the usage data transmitting operation 906 may additionally or alternatively include an operation 1272 for transmitting to the remote AR device the usage data, the usage data to facilitate the remote AR device to display one or more third augmentations that directly or indirectly indicate one or more differences between the one or more first augmentations and the one or more second augmentations. For instance, the usage data relaying module 106* of the AR device 50* of FIGS. 7A or 7B (as well as FIGS. 5A or 5B) transmitting or relaying to the remote AR device 70 the usage data 56, the usage data 56 to facilitate the remote AR device 70 to display one or more third augmentations that directly or indirectly indicate one or more differences (e.g., size difference, percentage difference, etc/) between the one or more first augmentations and the one or more second augmentations.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
    an augmentation data acquiring module configured to acquire from a remote augmented reality (AR) device via one or more wireless and/or networks augmentation data associated with one or more first augmentations that were remotely displayed at the remote AR device, the one or more first augmentations having been included in a first augmented view of a first actual scene that was displayed by the remote AR device;
    an augmentation presenting module configured to present locally one or more second augmentations in response, at least in part, to the acquired augmentation data, the one or more second augmentations to be presented through a second augmented view of a second actual scene; and
    a usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations.

2. The system of claim 1, wherein said augmentation data acquiring module configured to acquire from a remote augmented reality (AR) device via one or more wireless and/or networks augmentation data associated with one or more first augmentations that were remotely displayed at the remote AR device, the one or more first augmentations having been included in a first augmented view of a first actual scene that was displayed by the remote AR device comprises:
    an augmentation content information acquiring module configured to acquire data that provides content information related to the one or more first augmentations.

3. The system of claim 1, wherein said augmentation data acquiring module configured to acquire from a remote augmented reality (AR) device via one or more wireless and/or networks augmentation data associated with one or more first augmentations that were remotely displayed at the remote AR device, the one or more first augmentations having been included in a first augmented view of a first actual scene that was displayed by the remote AR device comprises:
    a visual item information acquiring module configured to acquire data that provides information related to one or more visual items that are affiliated with the one or more first augmentations and that were present in the first actual scene.

4. The system of claim 1, wherein said augmentation data acquiring module configured to acquire from a remote augmented reality (AR) device via one or more wireless and/or networks augmentation data associated with one or more first augmentations that were remotely displayed at the remote AR device, the one or more first augmentations having been included in a first augmented view of a first actual scene that was displayed by the remote AR device comprises:
    an augmentation format information acquiring module configured to acquire data that provides format information related to one or more formats of the one or more first augmentations.

5. The system of claim 4, wherein said augmentation format information acquiring module configured to acquire data that provides format information related to one or more formats of the one or more first augmentations comprises:
    a visibility rule acquiring module configured to acquire data that provides one or more visibility rules that include one or more directives for displaying the one or more first augmentations.

6. The system of claim 5, wherein said visibility rule acquiring module configured to acquire data that provides one or more visibility rules that include one or more directives for displaying the one or more first augmentations comprises:
    a visibility rule acquiring module configured to acquire data that provides one or more visibility rules that directs the one or more first augmentations to be affiliated with one or more specified visual items and that directs inclusion of the one or more first augmentations in an augmented view of an actual scene.

7. The system of claim 5, wherein said visibility rule acquiring module configured to acquire data that provides one or more visibility rules that include one or more directives for displaying the one or more first augmentations comprises:
    a visibility rule acquiring module configured to acquire data that provides one or more visibility rules that directs the one or more first augmentations to be at least semi-transparent in an augmented view of an actual scene in order to prevent one or more priority visual items that are present in the actual scene from being at least completely obfuscated by the one or more first augmentations in the augmented view.

8. The system of claim 7, wherein said visibility rule acquiring module configured to acquire data that provides one or more visibility rules that directs the one or more first augmentations to be at least semi-transparent in an augmented view of an actual scene in order to prevent one or more priority visual items that are present in the actual scene from being at least completely obfuscated by the one or more first augmentations in the augmented view comprises:
    a visibility rule acquiring module configured to acquire data that provides one or more visibility rules that directs the one or more first augmentations to be conditionally transparent in the augmented view of the actual scene so long as the one or more priority visual items are detected as being present in the actual scene.

9. The system of claim 5, wherein said visibility rule acquiring module configured to acquire data that provides one or more visibility rules that include one or more directives for displaying the one or more first augmentations comprises:
    a visibility rule acquiring module configured to acquire one or more visibility rules that direct display of one or more functional augmentations.

10. The system of claim 9, wherein said visibility rule acquiring module configured to acquire one or more visibility rules that direct display of one or more functional augmentations comprises:

a visibility rule acquiring module configured to acquire data that provides one or more visibility rules that direct display of one or more functional augmentations that are in a form of one or more functional tags that when selected or activated results in display of information related to one or more visual items present in an augmented view and/or in an actual scene.

11. The system of claim 5, wherein said visibility rule acquiring module configured to acquire data that provides one or more visibility rules that include one or more directives for displaying the one or more first augmentations comprises:

a visibility rule acquiring module configured to acquire data that provides one or more visibility rules that directs one or more identified priority visual items to have visibility priority over the one or more first augmentations in an augmented view of an actual scene.

12. The system of claim 1, wherein said augmentation data acquiring module configured to acquire from a remote augmented reality (AR) device via one or more wireless and/or networks augmentation data associated with one or more first augmentations that were remotely displayed at the remote AR device, the one or more first augmentations having been included in a first augmented view of a first actual scene that was displayed by the remote AR device comprises:

a request transmitting module configured to transmit a request to the remote AR device for the augmentation data.

13. The system of claim 1, wherein said augmentation presenting module configured to present locally one or more second augmentations in response, at least in part, to the acquired augmentation data, the one or more second augmentations to be presented through a second augmented view of a second actual scene comprises:

an augmentation presenting module configured to present locally by presenting the one or more second augmentations in the second augmented view via one or more display monitors.

14. The system of claim 1, wherein said augmentation presenting module configured to present locally one or more second augmentations in response, at least in part, to the acquired augmentation data, the one or more second augmentations to be presented through a second augmented view of a second actual scene comprises:

an augmentation presenting module configured to present one or more second augmentations in the second augmented view that are same or substantially same as the one or more first augmentations that were remotely displayed at the remote AR device.

15. The system of claim 1, wherein said augmentation presenting module configured to present locally one or more second augmentations in response, at least in part, to the acquired augmentation data, the one or more second augmentations to be presented through a second augmented view of a second actual scene comprises:

a modified augmentation presenting module configured to present one or more second augmentations in the second augmented view that is or are modified version or versions of the one or more first augmentations that were remotely displayed at the remote AR device.

16. The system of claim 1, wherein said augmentation presenting module configured to present locally one or more second augmentations in response, at least in part, to the acquired augmentation data, the one or more second augmentations to be presented through a second augmented view of a second actual scene comprises:

an augmentation data and context based augmentation providing module configured to provide the one or more second augmentations based on the received augmentation data and based on environmental context in which the second augmented view is to be displayed.

17. The system of claim 16, wherein said augmentation data and context based augmentation providing module configured to provide the one or more second augmentations based on the received augmentation data and based on environmental context in which the second augmented view is to be displayed comprises:

an augmentation data and context based augmentation providing module configured to provide the one or more second augmentations based on content information and one or more visibility rules provided by the received augmentation data and based on the environmental context in which the second augmented view is to be displayed.

18. The system of claim 16, wherein said augmentation data and context based augmentation providing module configured to provide the one or more second augmentations based on the received augmentation data and based on environmental context in which the second augmented view is to be displayed comprises:

an augmentation data and context based augmentation providing module configured to provide the one or more second augmentations based on content information and one or more visibility rules provided by the received augmentation data, based on one or more visibility rules provided by one or more sources other than the remote AR device, and based on the environmental context in which the second augmented view is to be displayed.

19. The system of claim 18, wherein said augmentation data and context based augmentation providing module configured to provide the one or more second augmentations based on content information and one or more visibility rules provided by the received augmentation data, based on one or more visibility rules provided by one or more sources other than the remote AR device, and based on the environmental context in which the second augmented view is to be displayed comprises:

an augmentation data and context based augmentation providing module configured to provide the one or more second augmentations based on content information and one or more visibility rules provided by the received augmentation data, based on one or more visibility rules that were locally provided, and based on the environmental context in which the second augmented view is to be displayed.

20. The system of claim 16, wherein said augmentation data and context based augmentation providing module configured to provide the one or more second augmentations based on the received augmentation data and based on environmental context in which the second augmented view is to be displayed comprises:

an augmentation data and context based augmentation providing module configured to provide the one or more second augmentations based on content information provided by the received augmentation data, based on one or more locally provided visibility rules, and based on the environmental context in which the second augmented view is to be displayed.

21. The system of claim 16, wherein said augmentation data and context based augmentation providing module configured to provide the one or more second augmentations based on the received augmentation data and based on environmental context in which the second augmented view is to be displayed comprises:
- an augmentation data and context based augmentation providing module configured to provide the one or more second augmentations based on the received augmentation data and based on social networking data that indicates the environmental context in which the second augmented view is to be displayed and that were obtained through one or more social networking sources.

22. The system of claim 16, wherein said augmentation data and context based augmentation providing module configured to provide the one or more second augmentations based on the received augmentation data and based on environmental context in which the second augmented view is to be displayed comprises:
- an augmentation data and context based augmentation providing module configured to provide the one or more second augmentations based on the received augmentation data and based on audio data indicative of the environmental context in which the second augmented view is to be displayed.

23. The system of claim 16, wherein said augmentation data and context based augmentation providing module configured to provide the one or more second augmentations based on the received augmentation data and based on environmental context in which the second augmented view is to be displayed comprises:
- an augmentation data and context based augmentation providing module configured to provide the one or more second augmentations based on the received augmentation data and based on movement data indicative of the environmental context in which the second augmented view is to be displayed.

24. The system of claim 1, wherein said augmentation presenting module configured to present locally one or more second augmentations in response, at least in part, to the acquired augmentation data, the one or more second augmentations to be presented through a second augmented view of a second actual scene comprises:
- a difference indicator presenting module configured to present one or more indicators that indicate differences between the one or more first augmentations and the one or more second augmentations.

25. The system of claim 24, wherein said difference indicator presenting module configured to present one or more indicators that indicate differences between the one or more first augmentations and the one or more second augmentations comprises:
- a modification indicator presenting module configured to present one or more modifications that were applied to the one or more first augmentations in order to generate the one or more second augmentations.

26. The system of claim 17, wherein said difference indicator presenting module configured to present one or more indicators that indicate differences between the one or more first augmentations and the one or more second augmentations comprises:
- a degree of correspondence presenting module configured to present one or more degrees of correspondence between the one or more first augmentations and the one or more second augmentations.

27. The system of claim 17, wherein said difference indicator presenting module configured to present one or more indicators that indicate differences between the one or more first augmentations and the one or more second augmentations comprises:
- a degree of difference presenting module configured to present one or more degrees of difference between the one or more first augmentations and the one or more second augmentations.

28. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
- a usage data relaying module configured to relay back to the remote AR device usage data that indicates that the augmentation data was successfully received.

29. The system of claim 28, wherein said usage data relaying module configured to relay back to the remote AR device usage data that indicates that the augmentation data was successfully received comprises:
- a usage data relaying module configured to relay the usage data back to the remote AR device in response to receiving the augmentation data successfully.

30. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
- a usage data relaying module configured to relay back to the remote AR device usage data that indicates that the one or more second augmentations have been displayed.

31. The system of claim 30, wherein said usage data relaying module configured to relay back to the remote AR device usage data that indicates that the one or more second augmentations have been displayed comprises:
- a usage data relaying module configured to relay back to the remote AR device the usage data in response to the one or more second augmentations being locally displayed.

32. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
- an augmentation relaying module configured to relay back to the remote AR device usage data that includes the one or more second augmentations.

33. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
- a difference indicating data relaying module configured to relay back to the remote AR device usage data that indicates one or more differences between the one or more first augmentations and the one or more second augmentations.

34. The system of claim 33, wherein said difference indicating data relaying module configured to relay back to the remote AR device usage data that indicates one or more differences between the one or more first augmentations and the one or more second augmentations comprises:
   a modification indicating data relaying module configured to relay back to the remote AR device usage data that indicates one or more modifications that were made to the one or more first augmentations in order to generate the one or more second augmentations.

35. The system of claim 33, wherein said difference indicating data relaying module configured to relay back to the remote AR device usage data that indicates one or more differences between the one or more first augmentations and the one or more second augmentations comprises:
   a degree of correspondence indicating data relaying module configured to relay back to the remote AR device usage data that indicates one or more degrees of correspondence between the one or more first augmentations that was presented by the remote AR device and the one or more second augmentations that was presented locally.

36. The system of claim 33, wherein said difference indicating data relaying module configured to relay back to the remote AR device usage data that indicates one or more differences between the one or more first augmentations and the one or more second augmentations comprises:
   a degree of difference indicating data relaying module configured to relay back to the remote AR device usage data that indicates one or more degrees of difference between the one or more first augmentations that was presented by the remote AR device and the one or more second augmentations that was presented locally.

37. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
   an augmentation change indicating data relaying module configured to relay back to the remote AR device usage data that indicates changes to the display of the one or more second augmentations.

38. The system of claim 37, wherein said augmentation change indicating data relaying module configured to relay back to the remote AR device usage data that indicates changes to the display of the one or more second augmentations comprises:
   an augmentation change indicating data relaying module configured to relay back to the remote AR device usage data that indicates that one or more third augmentations have replaced in the second augmented view the one or more second augmentations.

39. The system of claim 38, wherein said augmentation change indicating data relaying module configured to relay back to the remote AR device usage data that indicates that one or more third augmentations have replaced in the second augmented view the one or more second augmentations comprises:
   an augmentation change indicating data relaying module configured to relay back to the remote AR device usage data that indicates that one or more third augmentations that include less content information than the one or more second augmentations have replaced the one or more second augmentations in the second augmented view.

40. The system of claim 38, wherein said augmentation change indicating data relaying module configured to relay back to the remote AR device usage data that indicates that one or more third augmentations have replaced in the second augmented view the one or more second augmentations comprises:
   an augmentation change indicating data relaying module configured to relay back to the remote AR device usage data that indicates that one or more third augmentations that are one or more functional tags for retrieving and displaying the one or more second augmentations have replaced the one or more second augmentations in the second augmented view.

41. The system of claim 40, wherein said augmentation change indicating data relaying module configured to relay back to the remote AR device usage data that indicates that one or more third augmentations that are one or more functional tags for retrieving and displaying the one or more second augmentations have replaced the one or more second augmentations in the second augmented view comprises:
   an augmentation change indicating data relaying module configured to relay back to the remote AR device usage data that indicates that one or more third augmentations that are one or more functional tags for retrieving and displaying the one or more second augmentations have replaced the one or more second augmentations in the second augmented view, the one or more third augmentations that are to replace the one or more second augmentations having substantially no content information included in the one or more second augmentations.

42. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
   an augmentation change indicating data relaying module configured to relay back to the remote AR device usage data that indicates that the one or more second augmentations are no longer being locally presented.

43. The system of claim 42, wherein said augmentation change indicating data relaying module configured to relay back to the remote AR device usage data that indicates that the one or more second augmentations are no longer being locally presented comprises:
   an augmentation change indicating data relaying module configured to relay back to the remote AR device the usage data that indicates that the one or more second augmentations are no longer being locally presented, the relaying back to the remote AR device of the usage data being in response to one or more visual items affiliated with the one or more second augmentations no longer being visually detected.

44. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:

a usage data relaying module configured to relay back to the remote AR device the usage data, the usage data to facilitate the remote AR device to display one or more third augmentations that directly or indirectly indicate that the transmitted augmentation data was successfully received.

45. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
 a usage data relaying module configured to relay back to the remote AR device the usage data, the usage data to facilitate the remote AR device to display one or more third augmentations that directly or indirectly indicate that the one or more second augmentations was displayed.

46. The system of claim 1, wherein said usage data relaying module configured to relay back to the remote AR device, via the one or more wireless and/or networks, usage data, the usage data to be relayed back to the remote AR device indicating usage information related at least to usage or non-usage, by the system, of the received augmentation data, the usage data to facilitate the remote AR device to display one or more third augmentations comprises:
 a usage data relaying module configured to relay back to the remote AR device the usage data, the usage data to facilitate the remote AR device to display one or more third augmentations that directly or indirectly indicate one or more differences between the one or more first augmentations and the one or more second augmentations.

47. An article of manufacture, comprising:
 a non-transitory storage medium bearing:
 one or more instructions for acquiring from a remote augmented reality (AR) device via one or more wireless and/or networks augmentation data associated with one or more first augmentations that were remotely displayed at a the remote AR device, the one or more first augmentations having been included in a first augmented view of a first actual scene that was displayed by the remote AR device;
 one or more instructions for presenting locally one or more second augmentations in response, at least in part, to the acquired augmentation data, the one or more second augmentations to be presented through a second augmented view of a second actual scene; and
 one or more instructions for relaying via the one or more wireless and/or networks usage data to the remote AR device, the usage data to be relayed back to the AR device indicating usage information related at least to usage or non-usage of the received augmentation data, the usage data to facilitate the remote AR device to display one or more third augmentations.

48. A wearable augmented reality (AR) device, comprising:
 a coupling device for coupling the wearable AR device to a user's head;
 one or more display monitors;
 an augmentation data acquiring module configured to acquire from a remote augmented reality (AR) device via one or more wireless and/or networks augmentation data associated with one or more first augmentations that were remotely displayed at a the remote AR device, the one or more first augmentations having been included in a first augmented view of a first actual scene that was displayed by the remote AR device;
 an augmentation presenting module configured to present locally one or more second augmentations in response, at least in part, to the acquired augmentation data, the one or more second augmentations to be presented through a second augmented view of a second actual scene; and
 a usage data relaying module configured to relay back to the remote AR device, via the one or more wireless and/or networks, usage data, the usage data to be relayed back to the remote AR device indicating usage information related at least to usage or non-usage, by the wearable AR device, of the received augmentation data, the usage data to facilitate the remote AR device to display one or more third augmentations.

* * * * *

UNITED STATES PATENT AND TRADEMARK OFFICE
CERTIFICATE OF CORRECTION

PATENT NO.       : 9,111,384 B2
APPLICATION NO.  : 13/711095
DATED            : August 18, 2015
INVENTOR(S)      : Gene Fein et al.

Page 1 of 1

It is certified that error appears in the above-identified patent and that said Letters Patent is hereby corrected as shown below:

Claims:

Column 57, Line 57, Claim 26

"26. The system of claim 17, wherein said difference. . ."

Should be: --26. The system of claim 24 , wherein said difference. . . .--

Column 57, Line 66, Claim 27

"27. The system of claim 17, wherein said difference. . ."

Should be: --27. The system of claim 24, wherein said difference. . .--

Signed and Sealed this
Twenty-eighth Day of June, 2016

Michelle K. Lee
*Director of the United States Patent and Trademark Office*